(12) United States Patent
Ueki et al.

(10) Patent No.: US 8,922,724 B2
(45) Date of Patent: Dec. 30, 2014

(54) ACTIVE SHUTTER GLASSES AND THREE-DIMENSIONAL IMAGE RECOGNITION UNIT

(75) Inventors: Shun Ueki, Osaka (JP); Kozo Nakamura, Osaka (JP); Takahiro Nakahara, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 203 days.

(21) Appl. No.: 13/808,796

(22) PCT Filed: Apr. 8, 2011

(86) PCT No.: PCT/JP2011/058894
§ 371 (c)(1),
(2), (4) Date: Jan. 7, 2013

(87) PCT Pub. No.: WO2012/005036
PCT Pub. Date: Jan. 12, 2012

(65) Prior Publication Data
US 2013/0107145 A1 May 2, 2013

(30) Foreign Application Priority Data
Jul. 8, 2010 (JP) ................................. 2010-155942

(51) Int. Cl.
| | | |
|---|---|---|
| G02F 1/1335 | (2006.01) | |
| G02C 7/10 | (2006.01) | |
| G02B 27/22 | (2006.01) | |
| G03B 35/26 | (2006.01) | |
| H04N 13/04 | (2006.01) | |

(52) U.S. Cl.
CPC ............ *G02C 7/101* (2013.01); *G02B 27/2264* (2013.01); *G03B 35/26* (2013.01); *H04N 13/0438* (2013.01); *H04N 2213/008* (2013.01)
USPC ........................................................ 349/13

(58) Field of Classification Search
USPC ........................................................ 349/13
See application file for complete search history.

(56) References Cited

U.S. PATENT DOCUMENTS

| | | | |
|---|---|---|---|
| 6,266,106 B1 * | 7/2001 | Murata et al. .................. | 349/15 |
| 2013/0063670 A1 * | 3/2013 | Ueki et al. ....................... | 349/7 |

FOREIGN PATENT DOCUMENTS

| | | |
|---|---|---|
| GB | 2 442 035 A | 3/2008 |
| JP | 61-227498 | 10/1986 |
| WO | WO 2009/037940 | 3/2009 |

OTHER PUBLICATIONS

International Search Report for PCT/JP2011/058894, mailed May 24, 2011.
Written Opinion for PCT/JP2011/058894, mailed May 24, 2011.

* cited by examiner

*Primary Examiner* — Timothy L Rude
(74) *Attorney, Agent, or Firm* — Nixon & Vanderhye, P.C.

(57) ABSTRACT

Disclosed are active shutter glasses and a three-dimensional image recognition unit capable of visually recognizing a three-dimensional image with excellent display quality. The active shutter glasses are active shutter glasses for three-dimensional image recognition. The active shutter glasses comprise a right temple, a left temple, a right-eye lens, and a left-eye lens. The right-eye lens and the left-eye lens comprise liquid crystal cells. The right-eye lens and the left-eye lens have an inclination with respect to a state where the right-eye lens and the left-eye lens are arranged on the same plane, and are arranged on a surface orthogonal to a horizontal surface including the top surfaces of the right temple and the left temple. The direction of inclination of the right-eye lens is the direction in which the outer edge of the right-eye lens approaches an observer side at an azimuth angle $\phi_2$ in a range of ±45° with respect to an azimuth angle $\phi_1$, at which a contrast ratio has a maximum value, at a polar angle $\theta_1$ having an angle difference in a range of 2 to 17° from a line normal to the surface of the right-eye lens when not inclined. The direction of inclination of the left-eye lens is the direction in which the outer edge of the left-eye lens approaches the observer side at an azimuth angle $\phi_4$ in a range of ±45° with respect to an azimuth angle $\phi_3$, at which a contrast ratio has a maximum value, at a polar angle $\theta_2$ having an angle difference in a range of 2 to 17° from a line normal to the surface of the left-eye lens when not inclined.

20 Claims, 21 Drawing Sheets

ACTIVE SHUTTER GLASSES AND THREE-DIMENSIONAL IMAGE RECOGNITION UNIT

This application is the U.S. national phase of International Application No. PCT/JP2011/058894 filed 8 Apr. 2011 which designated the U.S. and claims priority to JP Patent Application No. 2010-155942 filed 8 Jul. 2010, the entire contents of each of which are hereby incorporated by reference.

TECHNICAL FIELD

The present invention relates to active shutter glasses and a three-dimensional image recognition unit. In particular, the present invention relates to active shutter glasses which express a 3D image through opening and closing of a shutter using liquid crystal cells, and a three-dimensional image recognition unit including the active shutter glasses.

BACKGROUND ART

As a type of a three-dimensional image recognition unit using glasses, an anaglyph type, a passive type, an active type, and the like are known. In the anaglyph type, display quality is exceptionally poor bad and so-called crosstalk occurs. Both the passive and active types use polarized glasses.

In the passive type, while the polarized glasses can be manufactured lightweight at low cost, in order to generate a left-eye image and a right-eye image, it is necessary to separately provide right-eye and left-eye pixels. Since three-dimensional image display requires a spatial resolution twice that of normal two-dimensional image display, in general, the resolution of a three-dimensional image is low. The display quality is low compared to the active type. It is also necessary to pattern and form a polarizing element, such as a λ/2 plate, for each pixel, resulting in an increase in cost of an image display device.

The active type has excellent display performance. For example, when the spatial resolution of an image display device (hereinafter, referred to as a 3D display device) for a three-dimensional image recognition unit is full high-definition (1920×1080), stereoscopic display can be performed with the resolution of full high-definition. The primary performance which is required for a 3D display device of an active type is high frame rate and high-performance image processing capability, and these can be satisfied in an existing high-end image display device. That is, the image display device can be developed as a 3D display device before the widespread use of 3D content without providing a special member in the image display device itself.

Hereinafter, polarized glasses which are used in the active type are referred to as active shutter glasses. As the active type of three-dimensional image recognition unit, for example, a technique using liquid crystal shutter lens-type active shutter glasses, which have a pair of polarizing plates and a liquid crystal layer interposed between the pair of polarizing plates is disclosed (for example, see Patent Literature 1).

CITATION LIST

Patent Literature

Patent Literature 1: JP-A-61-227498

SUMMARY OF INVENTION

Technical Problem

However, the inventors have studied that, when the polarized glasses are of a liquid crystal shutter lens type, after each lens surface of the polarized glasses and the display screen of the image display device are arranged in parallel, the observer looks into through the polarized glasses and visually recognizes the image display device, it becomes obvious that the front direction (the direction orthogonal to the front surface of each lens of the polarized glasses) does not always have the maximum display characteristics. Specifically, when comparing the front direction and a different visual angle direction, degradation in the contrast (CR) ratio, degradation in transmittance, change in color, an increase in crosstalk amount, and the like are found in the front direction.

The invention has been accomplished in consideration of the present situation, and an object of the invention is to provide active shutter glasses and a three-dimensional image recognition unit capable of visually recognizing a three-dimensional image with excellent display quality.

Solution to Problem

The inventors have studied various active shutter glasses capable of visually recognizing a three-dimensional image with excellent display quality, and have first focused on visual angle dependency of the contrast characteristics of active shutter glasses having liquid crystal cells.

In studying the characteristics of the active shutter glasses, the inventors have arranged the left and right lens surfaces of the active shutter glasses in parallel to the display surface of the image display device in the front direction of the display surface of the image display device, and have measured the contrast ratio from the observer side, that is, the side opposite to the image display device.

FIG. 42 is a schematic perspective view showing a mode in which the display characteristics of the active shutter glasses of the related art are verified. As shown in FIG. 42, first, a lens 521 including an observer-side polarizing element 522, a viewing angle compensation film 525, a liquid crystal cell 523, a viewing angle compensation film 526, and a display-side polarizing element 524 in this order has been prepared, and a measuring device 527 has been arranged lateral to the display-side polarizing element 522. The observer-side polarizing element 522 and the display-side polarizing element 524 are all linearly polarizing elements.

A double-headed arrow in FIG. 42 represents the transmission axis of the linearly polarizing element. The transmission axis 522t of the observer-side polarizing element 522 and the transmission axis 524t of the display-side polarizing element 524 are in a cross-Nichol relation. The transmission axis 522t of the observer-side polarizing element 522 is arranged along a line which passes through 0° azimuth and 180° azimuth, and the transmission axis 524t of the display-side polarizing element 524 is arranged along a line which passes through 90° azimuth and 270° azimuth.

The viewing angle compensation films 525 and 526 are negative C plates which have a function of compensating for the viewing angle during light blocking of each lens.

The liquid crystal cell 523 is a TN-mode liquid crystal cell (TN cell). The liquid crystal cell 523 includes a pair of substrates and a liquid crystal layer interposed between the pair of substrates. The pair of substrates include transparent electrodes. The liquid crystal layer includes nematic liquid crystal molecules having positive anisotropy of dielectric constant. The liquid crystal molecule group in the liquid crystal layer is aligned in the alignment treatment direction near the surfaces of the pair of substrates during no voltage application, and is aligned to be twisted at about 90° in the thickness direction of the liquid crystal layer.

The direction of twist of the liquid crystal molecule group is consistent between the right-eye liquid crystal cell and the left-eye liquid crystal cell, and is twisted in a counterclockwise direction from the observer-side substrate toward the display-side substrate.

A single-headed arrow in FIG. 42 represents the alignment treatment (for example, rubbing) direction. The alignment treatment direction with respect to the substrate surface of the liquid crystal cell 523 is consistent between the right-eye liquid crystal cell and the left-eye liquid crystal cell. The alignment treatment direction with respect to the display-side substrate is from 90° azimuth to 270° azimuth when viewed from the observer side, and the alignment treatment direction with respect to the observer-side substrate is from 180° azimuth to 0° azimuth when viewed from the observer side.

FIG. 43 is a graph showing the result of the contrast characteristics by the measurement method shown in FIG. 42 when the image display device is viewed through the lenses of the active shutter glasses of the related art. When a line which extends from the center of a circle in FIG. 43 to the outer circumference is assumed, the direction of the line represents azimuth, and the azimuth angle of right azimuth is defined as 0°, the azimuth angle of the upper direction is defined as 90°, the azimuth angle of the left direction is defined as 180°, and the azimuth angle of the lower direction is defined as 270°. The length of the line which extends from the center of the circle in FIG. 43 to the outer circumference corresponds to the magnitude of a polar angle, and the farther from the center of the circle, the greater the polar angle.

As shown in FIG. 43, the farther from the center, that is, the greater the polar angle, the smaller the value of the contrast ratio as a whole. Meanwhile, the tendency of degradation in contrast varies at the respective azimuth angles. For this reason, change in the value of the contrast ratio in FIG. 43 is not even at respective azimuth.

As shown in FIG. 43, a location where the value of the contrast ratio is maximal is not the center (polar angle θ°) of the graph, and is a location where inclination is made by an azimuth angle and a polar angle having given magnitude from the center.

The inventors have focused on this point and have conducted further studies.

FIG. 44 is a schematic view of a display device and active shutter glasses constituting a three-dimensional image recognition unit of the related art when viewed from the above. As shown in FIG. 44, active shutter glasses 520 are arranged in the front direction of the display surface of an image display device 510 such that the surfaces of left and right lenses 521 of the active shutter glasses 520 are in parallel to the display surface of the image display device 510.

A broken-line arrow in FIG. 44 represents the front direction with respect to the surface of each lens 521 of the active shutter glasses, and a solid-line arrow represents the direction in which each lens 521 of the active shutter glasses has the maximum contrast ratio. In the example of FIG. 44, the left and right lenses 521 of the active shutter glasses have the same configuration, and the direction having the optimum contrast ratio is identical. The direction having the maximum contrast ratio is the right direction with respect to the direction as the vertical direction with respect to the display surface when viewed from the above, and is not consistent with the front direction.

Accordingly, in the active shutter glasses, it cannot be said that sufficient contrast characteristics are obtained.

In contrast, the inventors have found that the direction of each of the left and right lenses of the active shutter glasses is appropriately adjusted, thereby efficiently improving the contrast characteristics and obtaining a three-dimensional image with excellent display quality. Basically, the contrast characteristics are improved by a method of inclining the left and right lens surfaces of the active shutter glasses toward the observer side at an azimuth angle with higher contrast. However, the direction of each lens and the magnitude of inclination of each lens differ depending on the characteristics of the liquid crystal cell of each lens of the active shutter glasses. The direction of the azimuth angle representing the maximum contrast ratio differs depending on the magnitude of the polar angle.

The inventors have assumed the angle when the observer views the target image display device, and has found that the contrast ratio when viewed from 2 to 17° with respect to the vertical direction of the lens surface, that is, when viewed in the direction of the polar angle 2 to 17° is preferably used as reference. While the optimum azimuth angle when a certain polar angle is specified is specified for one azimuth, it has been found that, even when there is a shift of ±45° from the azimuth angle, the display characteristics can be improved in the same manner.

It has been found that the effect of improving the display characteristics may not be obtained by appropriately adjusting one lens, and it is not possible to obtain a satisfactory three-dimensional image unless the angles of both of the right-eye lens and the left-eye lens are appropriately adjusted.

The inventors have also found that not only the contrast ratio but also the display characteristics having visual angle dependency, such as degradation in transmittance, change in color, and an increase in crosstalk amount, can be improved through adjustment to an appropriate direction in the same manner, and a three-dimensional image can be displayed with excellent display quality.

In this way, the inventors have conceived an appropriate solution to the above problems and have attained the invention.

That is, according to an aspect of the invention, there are provided active shutter glasses for three-dimensional image recognition (hereinafter, referred to as first active shutter glasses for contrast ratio countermeasures). The active shutter glasses include a right temple, a left temple, a right-eye lens, and a left-eye lens, wherein the right-eye lens and the left-eye lens include liquid crystal cells, the right-eye lens and the left-eye lens have an inclination with respect to a state where the right-eye lens and the left-eye lens are arranged on the same plane, and are arranged on a surface orthogonal to a horizontal surface including the top surfaces of the right temple and the left temple, the direction of inclination of the right-eye lens is the direction in which the outer edge of the right-eye lens approaches an observer side at an azimuth angle $\phi_2$ in a range of ±45° with respect to an azimuth angle $\phi_1$, at which a contrast ratio has a maximum value, at a polar angle $\theta_1$ having an angle difference in a range of 2 to 17° from a line normal to the surface of the right-eye lens when not inclined, and the direction of inclination of the left-eye lens is the direction in which the outer edge of the left-eye lens approaches the observer side at an azimuth angle $\phi_4$ in a range of ±45° with respect to an azimuth angle $\phi_2$, at which a contrast ratio has a maximum value, at a polar angle $\theta_2$ having an angle difference in a range of 2 to 17° from a line normal to the surface of the left-eye lens when not inclined.

With this, both of the right-eye lens and the left-eye lens are adjusted such that the contrast ratio has the maximum value, making it possible to visually recognize an excellent 3D image.

According to another aspect of the invention, there are provided active shutter glasses (hereinafter, referred to as active shutter glasses for tinge change countermeasures) for three-dimensional image recognition. The active shutter glasses include a right temple, a left temple, a right-eye lens, and a left-eye lens, wherein the right-eye lens and the left-eye lens include liquid crystal cells, the right-eye lens and the left-eye lens have an inclination with respect to a state where the right-eye lens and the left-eye lens are arranged on the same plane, and are arranged on a surface orthogonal to a horizontal surface including the top surfaces of the right temple and the left temple, the direction of inclination of the right-eye lens is the direction in which the outer edge of the right-eye lens approaches an observer side at an azimuth angle $\phi_{10}$ in a range of ±45° with respect to an azimuth angle $\phi_9$, at which change in tinge based on tinge in a front direction is smallest, at a polar angle $\theta_3$ in a range of 2 to 17° with a direction orthogonal to the surface of the right-eye lens when not inclined as a polar angle 0°, the azimuth angle $\phi_9$ is one of azimuth angles corresponding to a number selected from at least one integer equal to or greater than 4 equally divided in an omniazimuth, the direction of inclination of the left-eye lens is the direction in which the outer edge of the left-eye lens approaches the observer side at an azimuth angle $\phi_{12}$ in a range of ±45° with respect to an azimuth angle $\phi_{11}$, at which change in tinge based on tinge in the front direction is smallest, at a polar angle $\phi_4$ in a range of 2 to 17° with a direction orthogonal to the surface of the left-eye lens when not inclined as a polar angle 0°, and the azimuth angle $\phi_{11}$ is one of azimuth angles corresponding to a number selected from at least one integer equal to or greater than 4 equally divided in an omniazimuth.

With this, both of the right-eye lens and the left-eye lens are adjusted such that change in tinge is minimized, thereby visually recognizing an excellent 3D image.

According to a further aspect of the invention, there are provided active shutter glasses (hereinafter, referred to as active shutter glasses for transmittance countermeasures) for three-dimensional image recognition. The active shutter glasses include a right temple, a left temple, a right-eye lens, and a left-eye lens, wherein the right-eye lens and the left-eye lens include liquid crystal cells, the right-eye lens and the left-eye lens have an inclination with respect to a state where the right-eye lens and the left-eye lens are arranged on the same plane, and are arranged on a surface orthogonal to a horizontal surface including the top surfaces of the right temple and the left temple, the direction of inclination of the right-eye lens is the direction in which the outer edge of the right-eye lens approaches an observer side at an azimuth angle $\phi_{14}$ in a range of ±45° with respect to an azimuth angle $\phi_{13}$, at which change in transmittance based on transmittance in a front direction is smallest, when the right-eye lens is in a light blocking state at a polar angle $\theta_5$ in a range of 2 to 17° with a direction orthogonal to the surface of the right-eye lens when not inclined as a polar angle 0°, the azimuth angle $\phi_{13}$ is one of azimuth angles corresponding to a number selected from at least one integer equal to or greater than 4 equally divided in an omniazimuth, the direction of inclination of the left-eye lens is the direction in which the outer edge of the left-eye lens approaches the observer side at an azimuth angle $\phi_{16}$ in a range of ±45° with respect to an azimuth angle $\phi_{15}$, at which change in transmittance based on transmittance in the front direction is smallest, when the left-eye lens is in a light blocking state at a polar angle $\theta_6$ in a range of 2 to 17° with a direction orthogonal to the surface of the left-eye lens when not inclined as a polar angle 0°, and the azimuth angle $\phi_{15}$ is one of azimuth angles corresponding to a number selected from at least one integer equal to or greater than 4 equally divided in an omniazimuth.

With this, both of the right-eye lens and the left-eye lens are adjusted such that change in transmittance is minimized, thereby visually recognizing an excellent 3D image.

According to still another aspect of the invention, there are provided active shutter glasses (hereinafter, referred to as active shutter glasses for crosstalk countermeasures) for three-dimensional image recognition. The active shutter glasses include a right temple, a left temple, a right-eye lens, and a left-eye lens, wherein the right-eye lens and the left-eye lens include liquid crystal cells, the right-eye lens and the left-eye lens have an inclination with respect to a state where the right-eye lens and the left-eye lens are arranged on the same plane, and are arranged on a surface orthogonal to a horizontal surface including the top surfaces of the right temple and the left temple, the direction of inclination of the right-eye lens is the direction in which the outer edge of the right-eye lens approaches an observer side at an azimuth angle $\phi_{18}$ in a range of ±45° with respect to an azimuth angle $\phi_{17}$, at which a crosstalk amount of the right-eye lens based on a crosstalk amount in a front direction is smallest, at a polar angle $\theta_7$ in a range of 2 to 17° with a direction orthogonal to the surface of the left-eye lens when not inclined as a polar angle 0°, the azimuth angle $\phi_{17}$ is one of azimuth angles corresponding to a number selected from at least one integer equal to or greater than 4 equally divided in an omniazimuth, the direction of inclination of the left-eye lens is the direction in which the outer edge of the left-eye lens approaches the observer side at an azimuth angle $\phi_{20}$ in a range of ±45° with respect to an azimuth angle $\phi_{18}$, at which a crosstalk amount of the left-eye lens based on a crosstalk amount in the front direction is smallest, at a polar angle $\theta_8$ in a range of 2 to 17° with a direction orthogonal to the surface of the left-eye lens when not inclined as a polar angle 0°, and the azimuth angle $\phi_{19}$ is one of azimuth angles corresponding to a number selected from at least one integer equal to or greater than 4 equally divided in an omniazimuth.

With this, both of the right-eye lens and the left-eye lens are adjusted such that the crosstalk amount (the amount of light for the left eye entering the right eye and the amount of light for the right eye entering the left eye) is minimized, thereby visually recognizing an excellent 3D image.

The inventors have found that, when a liquid crystal cell in active shutter glasses is in a TN alignment mode or an STN alignment mode, the optimum azimuth angle is specified by the direction of alignment of liquid crystal molecules in an initial alignment state. Specifically, a liquid crystal molecule (hereinafter, referred to as center molecule) at the center in the thickness direction of the liquid crystal cell is a liquid crystal molecule at the center of twist of the liquid crystal molecule group when the liquid crystal cell is viewed in front view, and an azimuth angle having optimum contrast characteristics is specified by the direction of the liquid crystal molecules.

With this method, the inventors have found that the contrast ratio can be improved, have conceived a solution to the above problems, and have attained the invention.

That is, according to still another aspect of the invention, there are provided active shutter glasses (hereinafter, referred to as second active shutter glasses for contrast ratio countermeasures) for three-dimensional image recognition. The active shutter glasses include a right temple, a left temple, a right-eye lens, and a left-eye lens, wherein the right-eye lens and the left-eye lens include liquid crystal cells, the right-eye lens and the left-eye lens have an inclination with respect to a state where the right-eye lens and the left-eye lens are arranged on the same plane, and are arranged on a surface orthogonal to a horizontal surface including the top surfaces of the right temple and the left temple, when the right-eye lens is viewed in front view, a liquid crystal molecule group in the liquid crystal cell is aligned so as to be twisted at about 90° or about 270°, when the left-eye lens is viewed in front view, a liquid crystal molecule group in the liquid crystal cell is aligned so as to be twisted at about 90° or about 270°, the direction of inclination of the right-eye lens is the direction in which the outer edge of the right-eye lens approaches an observer side at an azimuth angle $\phi_5$ in a range of ±45° with respect to an azimuth angle $\phi_5$ of a liquid crystal molecule at the center of twist in the liquid crystal cell, and the direction of inclination of the left-eye lens is the direction in which the outer edge of the left-eye lens approaches an observer side at an azimuth angle $\phi_8$ in a range of ±45° with respect to an azimuth angle $\phi_7$ of a liquid crystal molecule at the center of twist in the liquid crystal cell.

That is, in the second active shutter glasses for contrast ratio countermeasures, it is assumed that a TN cell or an STN cell is used as a liquid crystal cell, and the direction in which the lens is inclined is specified focusing on the correlation between the azimuth of the center molecules in the thickness direction of the liquid crystal cell and the visual angle characteristics.

With this, the contrast ratio is improved in both of the right-eye lens and the left-eye lens, thereby visually recognizing an excellent 3D image.

According to still another aspect of the invention, there is provided a three-dimensional image recognition unit including the above-described active shutter glasses and an image display device.

That is, according to still another aspect of the invention, a three-dimensional image recognition unit (hereinafter, also referred to as a first three-dimensional image recognition unit for contrast ratio countermeasures) includes active shutter glasses and an image display device, wherein the active shutter glasses include a right-eye lens and a left-eye lens, the right-eye lens and the left-eye lens include liquid crystal cells, the right-eye lens and the left-eye lens have an inclination with respect to a state where the right-eye lens and the left-eye lens are arranged in parallel to the display surface of the image display device, the direction of inclination of the right-eye lens is the direction in which the outer edge of the right-eye lens approaches an observer side at an azimuth angle $\phi_2$ in a range of ±45° with respect to an azimuth angle $\phi_1$, at which a contrast ratio has a maximum value, at a polar angle $\theta_1$ having an angle difference in a range of 2 to 17° from a line normal to the surface of the right-eye lens when not inclined, and the direction of inclination of the left-eye lens is the direction in which the outer edge of the left-eye lens approaches the observer side at an azimuth angle $\phi_4$ in a range of ±45° with respect to an azimuth angle $\phi_3$, at which a contrast ratio has a maximum value, at a polar angle $\theta_2$ having an angle difference in a range of 2 to 17° from a line normal to the surface of the left-eye lens when not inclined.

With this, both of the right-eye lens and the left-eye lens are adjusted such that the contrast ratio has the maximum value, making it possible to visually recognize an excellent 3D image.

According to still another aspect of the invention, a three-dimensional image recognition unit (hereinafter, also referred to as a second three-dimensional image recognition unit for contrast ratio countermeasures) includes active shutter glasses and an image display device, wherein the active shutter glasses include a right-eye lens and a left-eye lens, the right-eye lens and the left-eye lens include liquid crystal cells, the right-eye lens and the left-eye lens have an inclination with respect to a state where the right-eye lens and the left-eye lens are arranged in parallel to the display surface of the image display device, when the right-eye lens is viewed in front view, a liquid crystal molecule group in the liquid crystal cell is aligned so as to be twisted at about 90° or about 270°, when the left-eye lens is viewed in front view, a liquid crystal molecule group in the liquid crystal cell is aligned so as to be twisted at about 90° or about 270°, the direction of inclination of the right-eye lens is the direction in which the outer edge of the right-eye lens approaches an observer side at an azimuth angle $\phi_6$ in a range of ±45° with respect to an azimuth angle $\phi_5$ of a liquid crystal molecule at the center of twist in the liquid crystal cell, and the direction of inclination of the left-eye lens is the direction in which the outer edge of the left-eye lens approaches the observer side at an azimuth angle $\phi_8$ in a range of ±45° with respect to an azimuth angle $\phi_7$ of a liquid crystal molecule at the center of twist in the liquid crystal cell.

That is, in the active shutter glasses which is used in the second three-dimensional image recognition unit for contrast ratio countermeasures, it is assumed that a TN cell or an STN cell is used as a liquid crystal cell, and the direction in which the lens is inclined is specified focusing on the correlation between the azimuth of the center molecules in the thickness direction of the liquid crystal cell and visual angle characteristics.

With this, the contrast ratio is improved in both of the right-eye lens and the left-eye lens, thereby visually recognizing an excellent 3D image.

According to still another aspect of the invention, a three-dimensional image recognition unit (hereinafter, also referred to as a three-dimensional image recognition unit for tinge change countermeasures) includes active shutter glasses and an image display device, wherein the active shutter glasses include a right-eye lens and a left-eye lens, the right-eye lens and the left-eye lens include liquid crystal cells, the right-eye lens and the left-eye lens have an inclination with respect to a state where the right-eye lens and the left-eye lens are arranged in parallel to the display surface of the image display device, the direction of inclination of the right-eye lens is the direction in which the outer edge of the right-eye lens approaches an observer side at an azimuth angle $\phi_{10}$ in a range of ±45° with respect to an azimuth angle $\phi_9$, at which change in tinge during practical driving of the right-eye lens based on tinge in a front direction is smallest, at a polar angle $\theta_3$ in a range of 2 to 17° with a direction orthogonal to the surface of the left-eye lens when not inclined as a polar angle 0°, the azimuth angle $\phi_3$ is one of azimuth angles corresponding to a number selected from at least one integer equal to or greater than 4 equally divided in an omniazimuth, the direction of inclination of the left-eye lens is the direction in which the outer edge of the left-eye lens approaches the observer side at an azimuth angle $\phi_{12}$ in a range of ±45° with respect to an azimuth angle $\phi_{11}$, at which change in tinge based on tinge in the front direction is smallest, at a polar angle $\theta_4$ in a range of 2 to 17° with a direction orthogonal to the surface of the left-eye lens when not inclined as a polar angle 0°, and the azimuth angle $\phi_{11}$ is one of azimuth angles corresponding to a number selected from at least one integer equal to or greater than 4 equally divided in an omniazimuth.

With this, both of the right-eye lens and the left-eye lens are adjusted such that change in tinge is minimized, thereby visually recognizing an excellent 3D image.

According to still another aspect of the invention, a three-dimensional image recognition unit (hereinafter, also referred to as a three-dimensional image recognition unit for transmittance change countermeasures) includes active shutter glasses and an image display device, wherein the active shutter glasses include a right-eye lens and a left-eye lens, the right-eye lens and the left-eye lens include liquid crystal cells, the right-eye lens and the left-eye lens have an inclination with respect to a state where the right-eye lens and the left-eye lens are arranged in parallel to the display surface of the image display device, the direction of inclination of the right-eye lens is the direction in which the outer edge of the right-eye lens approaches an observer side at an azimuth angle $\phi_{14}$ in a range of ±45° with respect to an azimuth angle $\phi_{13}$, at which change in transmittance based on transmittance in a front direction when the right-eye lens is in a light-blocking state is smallest, at a polar angle $\theta_5$ in a range of 2 to 17° with a direction orthogonal to the surface of the left-eye lens when not inclined as a polar angle 0°, the azimuth angle $\phi_{13}$ is one of azimuth angles corresponding to a number selected from at least one integer equal to or greater than 4 equally divided in an omniazimuth, the direction of inclination of the left-eye lens is the direction in which the outer edge of the left-eye lens approaches the observer side at an azimuth angle $\phi_{16}$ in a range of ±45° with respect to an azimuth angle $\phi_{15}$, at which change in transmittance based on transmittance in a front direction when the right-eye lens is in a light-blocking state is smallest, at a polar angle $\theta_6$ in a range of 2 to 17° with a direction orthogonal to the surface of the left-eye lens when not inclined as a polar angle 0°, and the azimuth angle $\phi_{15}$ is one of azimuth angles corresponding to a number selected from at least one integer equal to or greater than 4 equally divided in an omniazimuth.

With this, both of the right-eye lens and the left-eye lens are adjusted such that change in transmittance is minimized, thereby visually recognizing an excellent 3D image.

According to still another aspect of the invention, a three-dimensional image recognition unit (hereinafter, also referred to as a three-dimensional image recognition unit for crosstalk countermeasures) includes active shutter glasses and an image display device, wherein the active shutter glasses include a right-eye lens and a left-eye lens, the right-eye lens and the left-eye lens include liquid crystal cells, the right-eye lens and the left-eye lens have an inclination with respect to a state where the right-eye lens and the left-eye lens are arranged in parallel to the display surface of the image display device, the direction of inclination of the right-eye lens is the direction in which the outer edge of the right-eye lens approaches an observer side at an azimuth angle $\phi_{18}$ in a range of ±45° with respect to an azimuth angle $\phi17$, at which a crosstalk amount of the right-eye lens based on a crosstalk amount in a front direction is smallest, at a polar angle $\theta_7$ in a range of 2 to 17° with a direction orthogonal to the surface of the left-eye lens when not inclined as a polar angle 0°, the azimuth angle $\phi_{17}$ is one of azimuth angles corresponding to a number selected from at least one integer equal to or greater than 4 equally divided in an omniazimuth, the direction of inclination of the left-eye lens is the direction in which the outer edge of the left-eye lens approaches the observer side at an azimuth angle $\phi_{20}$ in a range of ±45° with respect to an azimuth angle $\phi_{10}$, at which a crosstalk amount of the right-eye lens based on a crosstalk amount in a front direction is smallest, at a polar angle $\theta_8$ in a range of 2 to 17° with a direction orthogonal to the surface of the left-eye lens when not inclined as a polar angle 0°, and the azimuth angle $\phi_{20}$ is one of azimuth angles corresponding to a number selected from at least one integer equal to or greater than 4 equally divided in an omniazimuth.

With this, both of the right-eye lens and the left-eye lens are adjusted such that the crosstalk amount (the amount of light for the left eye entering the right eye and the amount of light for the right eye entering the left eye) is minimized, thereby visually recognizing an excellent 3D image.

In each three-dimensional image recognition unit of the invention, it is preferable that the image display device is a liquid crystal display device, and includes a liquid crystal cell, a λ/4 plate, and a linearly polarizing plate toward the observer side. With this, since light which passes between the image display device and the active shutter glasses travels in a state of being circularly polarized, it is possible to visually recognize a 3D image with high brightness regardless of the direction of the active shutter glasses (the face of the observer).

Hereinafter, the common features in the active shutter glasses of the invention will be described in detail.

The active shutter glasses of the invention are used for three-dimensional image recognition. That is, the active shutter glasses are used when the observer visually recognizes a 3D image. The active shutter glasses include a right temple, a left temple, a right-eye lens, and a left-eye lens, and the right-eye lens and the left-eye lens include liquid crystal cells. That is, in the active shutter glasses of the invention, a liquid crystal shutter type can be used, and the light polarization state differs between when no voltage is applied to the liquid crystal cell and when a voltage equal to or higher than a threshold value is applied, and for example, light transmittance and blocking can be adjusted by a pair of polarizing plates attached to both surfaces or one surface of the liquid crystal cell. In order to satisfactorily obtain a 3D image, since it is preferable that the timing of a voltage to the liquid crystal cell is synchronized with the timing at which an image signal is sent to the image display device, a time division type in which the right-eye lens and the left-eye lens are alternately replaced for every given period is preferably used.

As a liquid crystal cell, one of a twisted nematic (TN) cell, a super twisted nematic (STN) cell, an optically compensated birefringence (OCB) cell, a vertical alignment (VA) cell, an in-plane switching (IPS) cell, a field fringe switching (FFS) cell, a ferroelectric liquid crystal (FLC) cell, and the like may be used. Since the invention is preferably used for a type in which the optimum contrast ratio is shifted from the center, a liquid crystal cell which is particularly preferably used for the invention is a TN cell and an STN cell.

The term "temple" of the right temple and the left temple refers to a stretched portion (a portion of a frame) for hanging the active shutter glasses on a portion of the face, such as the ear of the observer, and is also called "arm". A temple which is attached to the side of the right-eye lens is referred to as a right temple, and a temple which is attached to the side of the left-eye lens is referred to as a left temple.

The right-eye lens and the left-eye lens have an inclination with respect to a state where the right-eye lens and the left-eye lens are arranged on the same plane, and are arranged on a plane orthogonal to a horizontal surface including the top surfaces of the right temple and the left temple. That is, the right-eye lens and the left-eye lens in the active shutter glasses of the invention are arranged such that the lens surface is inclined at an angle, instead of being arranged in parallel through the plane orthogonal to the horizontal surface including the top surfaces of the left and right temples.

The configuration of the active shutter glasses of the present invention is not especially limited by other components as long as it essentially includes such components. The features of the active shutter glasses for problem countermeasures are used in combination, thereby further improving 3D display quality.

In regard to the features of the active shutter glasses which are used in the three-dimensional image recognition unit of the invention, the common portions are the same.

Preferable embodiments of the active shutter glasses of the present invention are mentioned in more detail below. The following embodiments may be employed in combination.

It is preferable that the azimuth angle $\phi_1$, $\phi_5$, $\phi_9$, $\phi_{13}$, or $\phi_{17}$ at which the contrast ratio of the right-eye lens has the maximum value is in a range of 270±90°, and the azimuth angle $\phi_3$, $\phi_7$, $\phi_{11}$, $\phi_{15}$, or $\phi_{19}$ at which the contrast ratio of the left-eye lens has the maximum value is in a range of 270±90°. That is, when the right-eye lens and the left-eye lens are divided equally into four regions on the left, right, top, and bottom, the lower right region or the lower left region is inclined so as to approach the observer side.

It is preferable that the azimuth angle Si, $\phi_5$, $\phi_9$, $\phi_{13}$, or $\phi_{17}$ at which the contrast ratio of the right-eye lens has the maximum value is in a range of 0±90°, and the azimuth angle $\phi_3$, $\phi_7$, $\phi_{11}$, $\phi_{15}$, or $\phi_{19}$ at which the contrast ratio of the left-eye lens has the maximum value is in a range of 180±90°. That is, when the right-eye lens is divided equally into four regions on the left, right, top, and bottom, the upper right region or the lower right region of the right-eye lens is inclined toward the observer side, and when the left-eye lens is divided equally into four regions on the left, right, top, and bottom, the upper left region or the lower left region of the left-eye lens is inclined so as to approach the observer side.

It is preferable that azimuth angle $\phi_1$, $\phi_5$, $\phi_9$, $\phi_{13}$, or $\phi_{17}$ at which the contrast ratio of the right-eye lens has the maximum value is in a range of 315±45°, and the azimuth angle $\phi_3$, $\phi_7$, $\phi_{11}$, $\phi_{15}$, or $\phi_{19}$ at which the contrast ratio of the left-eye shutter lens has the maximum value is in a range of 225±45°. That is, when the right-eye lens is divided equally into four regions on the left, right, top, and bottom, the lower right region of the right-eye lens is inclined toward the observer side, and when the left-eye lens is divided equally into four regions on the left, right, top, and bottom, the lower left region of the left-eye lens is inclined so as to approach the observer side.

It is preferable that each of the right-eye lens and the left-eye lens includes a λ/4 plate and a linearly polarizing plate, and the λ/4 plate is arranged in a surface of the linearly polarizing plate opposite to the observer side. If the λ/4 plate is attached to the surface of the linearly polarizing plate opposite to the observer side, the observer can visually recognize a satisfactory 3D image regardless of the polarization state of incident light without relation to the relative positional relationship between the lens surface and the display surface of the active shutter glasses.

It is preferable that the right-eye lens and the left-eye lens substantially have a symmetric structure based on a symmetric surface which bisects the active shutter glasses on the left and right. Therefore, since the balance of visibility of the right-eye lens and the left-eye lens is adjusted, the observer can visually recognize a clear three-dimensional image with little double image.

It is preferable that the liquid crystal alignment in the liquid crystal cell of the right-eye lens and the liquid crystal alignment in the liquid crystal cell of the left-eye lens during no voltage application substantially have symmetric twist based on the symmetric surface which bisects the active shutter glasses on the left and right. Therefore, since the balance of visibility of the right-eye lens and the left-eye lens is adjusted, the observer can visually recognize a clear three-dimensional image with little double image.

It is preferable that the contrast distribution of the right-eye lens and the contrast distribution of the left-eye lens during no voltage application are substantially symmetrical based on the symmetric surface which bisects the active shutter glasses on the left and right. Therefore, since the balance of visibility of the right-eye lens and the left-eye lens is adjusted, the observer can visually recognize a clear three-dimensional image with little double image.

It is preferable that a liquid crystal material in the liquid crystal cell of the right-eye lens and a liquid crystal material in the liquid crystal cell of the left-eye lens are the same. Therefore, since the balance of visibility of the right-eye lens and the left-eye lens is adjusted, the observer can visually recognize a clear three-dimensional image with little double image.

It is preferable that the polar angle $\theta_2$ and the polar angle $\theta_2$ are substantially the same, the polar angle $\theta_3$ and the polar angle $\theta_4$ are substantially the same, the polar angle $\theta_5$ and the polar angle $\theta_6$ are substantially the same, and the polar angle $\theta_7$ and the polar angle $\theta_8$ are substantially the same. Therefore, since the balance of visibility of the right-eye lens and the left-eye lens is adjusted, the observer can visually recognize a clear three-dimensional image with little double image.

It is preferable that the polar angle $\theta_1$, $\theta_2$, $\theta_3$, $\theta_4$, $\theta_5$, $\theta_6$, $\theta_7$, or $\theta_8$ is the angle including the maximum contrast ratio in all directions. Therefore, it is possible to incline each lens of the active shutter glasses in a direction having an excellent contrast ratio, thereby visually recognizing a very excellent 3D image.

It is preferable that, when the right-eye lens and the left-eye lens are viewed in front view during no voltage application, the liquid crystal molecule group in the liquid crystal cell of the right-eye lens is aligned so as to be twisted at about 90° or about 270°, and the liquid crystal molecule group in the liquid crystal cell of the left-eye lens is aligned so as to be twisted at about 90° or about 270°. That is, the liquid crystal cell in each of the right-eye lens and the left-eye lens is a TN cell or an STN cell.

Hereinafter, when the liquid crystal cell in each of the right-eye lens and the left-eye lens is a TN cell or an STN cell, a preferred form will be described.

It is preferable that the alignment azimuth of a liquid crystal molecule at the center in the thickness direction in the liquid crystal cell of the right-eye lens and the alignment azimuth of a liquid crystal molecule at the center in the thickness direction in the liquid crystal cell of the left-eye lens during no voltage application are substantially symmetrical based on the symmetric surface which bisects the active shutter glasses on the left and right. Therefore, since the balance of visibility of the right-eye lens and the left-eye lens is adjusted, the observer can visually recognize a clear three-dimensional image with little double image.

It is preferable that both of the azimuth angle of a liquid crystal molecule at the center in the thickness direction in the liquid crystal cell of the right-eye lens and the azimuth angle of a liquid crystal molecule at the center in the thickness direction in the liquid crystal cell of the left-eye lens during no voltage application are in a range of 270±90°. That is, when each of the right-eye lens and the left-eye lens is divided equally into four regions on the left, right, top, and bottom, the lower right region or the lower left region is inclined toward the observer side.

It is preferable that, during no voltage application, the azimuth angle of a liquid crystal molecule at the center in the thickness direction in the liquid crystal cell of the right-eye lens is in a range of 0±90°, and the azimuth angle of a liquid crystal molecule at the center in the thickness direction in the liquid crystal cell of the left-eye lens is in a range of 90 to 270°.

It is preferable that, during no voltage application, the azimuth angle of a liquid crystal molecule at the center in the thickness direction in the liquid crystal cell of the right-eye lens is in a range of 315±45°, and the azimuth angle of a liquid crystal molecule at the center in the thickness direction in the liquid crystal cell of the left-eye lens is in a range of 225±45°.

It is preferable that each of the right-eye lens and the left-eye lens includes a pair of linearly polarizing plates on both sides of the liquid crystal cell, the transmission axes of the pair of linearly polarizing plates are in a cross-Nichol relation, and both of the average value of the azimuth angles of liquid crystal molecules in the liquid crystal cell of the right-eye lens and the average value of the azimuth angles of liquid crystal molecules in the liquid crystal cell of the left-eye lens during no voltage application are in a range of the 270±90°.

It is preferable that each of the right-eye lens and the left-eye lens includes a pair of linearly polarizing plates on both sides of the liquid crystal cell, the transmission axes of the pair of linearly polarizing plates are in a cross-Nichol relation, the average value of the azimuth angles of liquid crystal molecules in the liquid crystal cell of the right-eye lens during no voltage application is in a range of 0±90°, and the average value of the azimuth angles of liquid crystal molecules in the liquid crystal cell of the left-eye lens during no voltage application is in a range of 180±90°.

It is preferable that each of the right-eye lens and the left-eye lens includes a pair of linearly polarizing plates on both sides of the liquid crystal cell, the transmission axes of the pair of linearly polarizing plates are in a cross-Nichol relation, the average value of the azimuth angles of liquid crystal molecules in the liquid crystal cell of the right-eye lens during no voltage application is in a range of 315±45°, and the average value of the azimuth angles of liquid crystal molecules in the liquid crystal cell of the left-eye lens during no voltage application is in a range of 225±45°.

It is preferable that each of the right-eye lens and the left-eye lens includes a pair of linearly polarizing plates on both sides of the liquid crystal cell, the transmission axes of the pair of linearly polarizing plate are in a cross-Nichol relation, the liquid crystal cell during no voltage application is in a state of white display, and both of the average value of the azimuth angles of liquid crystal molecules in the liquid crystal cell during black display of the right-eye lens and the average value of the azimuth angles of liquid crystal molecules in the liquid crystal cell during black display of the left-eye lens are in a range of 270±90°.

It is preferable that each of the right-eye lens and the left-eye lens includes a pair of linearly polarizing plates on both sides of the liquid crystal cell, the transmission axes of the pair of linearly polarizing plates are in a cross-Nichol relation, the liquid crystal cell during no voltage application is in a state of white display, the average value of the azimuth angles of liquid crystal molecules in the liquid crystal cell during black display of the right-eye lens is in a range of 0±90°, and the average value of the azimuth angles of liquid crystal molecules in the liquid crystal cell during black display of the left-eye lens is in a range of 180±90°.

It is preferable that each of the right-eye lens and the left-eye lens includes a pair of linearly polarizing plates on both sides of the liquid crystal cell, the transmission axes of the pair of linearly polarizing plates are in a cross-Nichol relation, the liquid crystal cell during no voltage application is in a state of white display, the average value of the azimuth angles of liquid crystal molecules in the liquid crystal cell during black display of the right-eye lens is in a range of 315±45°, and the average of the azimuth angles of liquid crystal molecules in the liquid crystal cell during black display of the left-eye lens is in a range of 225±45°.

Advantageous Effects of Invention

According to the active shutter glasses of the invention, an appropriate countermeasure for improving the contrast ratio in both of the right-eye and left-eye lenses is made, thereby visually recognizing a three-dimensional image with excellent display quality.

DESCRIPTION OF EMBODIMENTS

Figure 1:
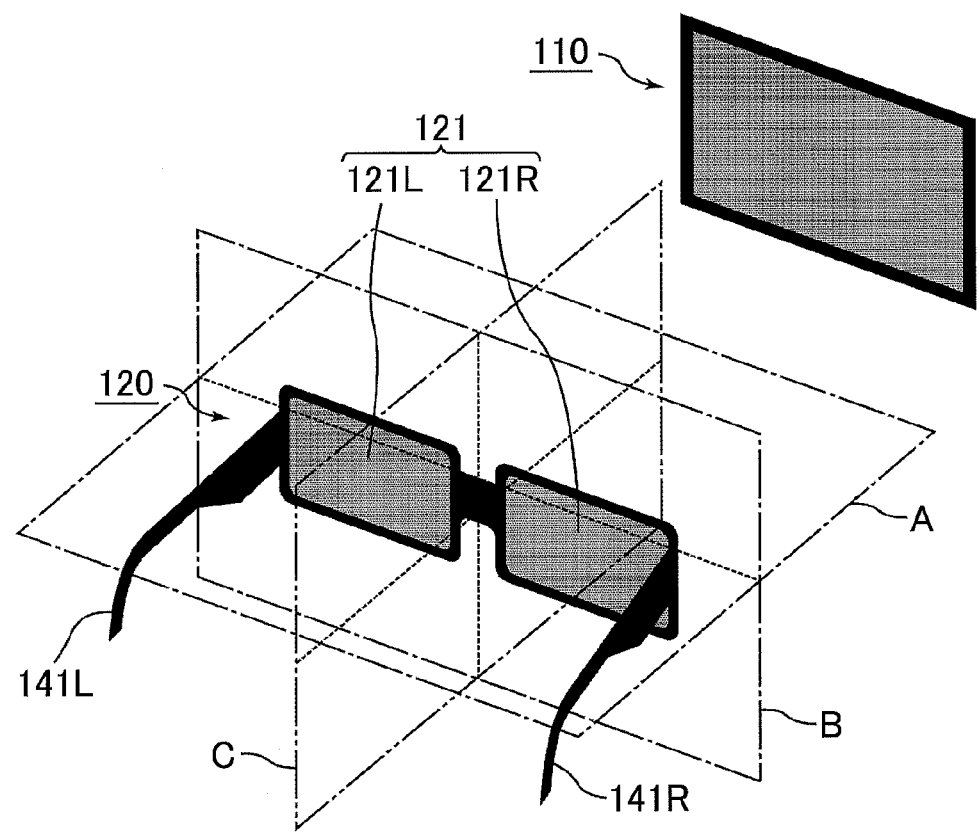
FIG. 1 is a schematic perspective view showing a three-dimensional image recognition unit of Embodiment 1.

In this specification, when an observer puts on active shutter glasses are put on in a general use mode, the right lens when viewed from the observer is referred to as the right-eye lens, and the left lens is referred to as the left-eye lens.

In regard to the viewing angle azimuth of the active shutter glasses, when the right-eye lens and the left-eye lens are arranged so as to be parallel to the display screen of the image display device, the right direction when viewed from the observer is defined as 0° azimuth, the upper direction is defined as 90° azimuth, the left direction is defined as 180° azimuth, and the lower direction is defined as 270° azimuth. In this specification, since the counterclockwise direction is positive, the lower direction may be defined as −90° azimuth, the left direction may be defined as −180° azimuth, and the upper direction may be defined as −270° azimuth.

In this specification, when the upper end of each lens is inclined so as to approach the observer side (that is, the lower end of each lens is inclined toward the display side), the active shutter glasses are inclined in 90° azimuth. When the lower end of each lens is inclined so as to approach the observer side (that is, the upper end of each lens is inclined toward the display side), the active shutter glasses are inclined in 270° azimuth. When the right end of each lens is inclined so as to approach the observer side (that is, the left end of each lens is inclined toward the display side), the active shutter glasses are inclined in 0° azimuth. When the left end of each lens is inclined so as to approach the observer side (that is, the right end of each lens is inclined toward the display side), the active shutter glasses are inclined in 180° azimuth.

Only with the configuration of the active shutter glasses, the top, bottom, left, and right can be specified. In the active shutter glasses of the invention, the azimuth of the side on which the right-eye lens is arranged when the right-eye lens and the left-eye lens are arranged on the same plane is right azimuth, and the azimuth of the side on which the left-eye lens is arranged is left azimuth. When it is assumed that the observer puts on the active shutter glasses based on a surface orthogonal to the length direction (stretch direction) of the right temple and the left temple, the azimuth on the upper side is upper azimuth, and the azimuth on the lower side is lower azimuth.

In regard to the viewing angle azimuth of the image display device, the right direction when the observer views the screen in front view is defined as 0° azimuth, the upper direction is defined as 90° azimuth, the left direction is defined as 180° azimuth, and the lower direction is 270° azimuth. The positive and negative relationship when viewed from the observer is the same as in the active shutter glasses. Accordingly, if it is assumed that the observer puts on the active shutter glasses, and visually recognizes the image display device, the viewing angle azimuth of the active shutter glasses and the viewing angle azimuth of the display device are consistent with each other.

In regard to the viewing angle azimuth of each of the active shutter glasses and the display device, the azimuth of a line passing through 0° azimuth and 180° azimuth may be referred to as transverse azimuth, and the azimuth of a line passing through 90° azimuth and 270° azimuth may be referred to as longitudinal azimuth.

In regard to an azimuth angle (including the azimuth angle of each liquid crystal molecule or the average azimuth angle as a liquid crystal molecule group) relating to liquid crystal molecules, when the liquid crystal cell is viewed from the observer side, the angle which represents the azimuth indicated by the leading end of each liquid crystal molecule toward the observer side is defined as the azimuth angle of the liquid crystal molecule.

The linearly polarizing element has a function of changing natural light to linearly polarized light, and unless otherwise noted, the term "linearly polarizing element" in this specification does not include a protective film and indicates only an element having a polarizing function.

In this specification, the λ/4 plate is a layer which gives a phase difference of about ¼ wavelength to light having a wavelength of 550 nm. While ¼ of 550 nm is accurately 137.5 nm, specifically, the phase difference of the λ/4 plate is equal to or greater than 100 nm and equal to or smaller than 180 nm, preferably, equal to or greater than 120 nm and equal to or smaller than 160 nm, and more preferably, equal to or greater than 130 nm and equal to or smaller than 145 nm.

An in-plane phase difference R is a phase difference (unit: nm) which is defined by R=|nx−ny|×d when the principal indices of refraction in the in-plane direction of a birefringent layer (for example, a liquid crystal cell, a λ/4 plate, a λ/2 plate, or the like) are defined as nx and ny, and the principal index of refraction in an out-of-plane (thickness direction) is defined as nz, and the thickness of the birefringent layer is defined as d. On the other hand, a phase difference Rth in the out-of-plane (thickness direction) direction is a phase difference (unit: nm) which is defined by Rth=(nz−(nx+ny)/2)×d.

The present invention will be mentioned in more detail referring to the drawings in the following embodiments, but is not limited to these embodiments.

Embodiment 1

FIG. 1 is a schematic perspective view showing a three-dimensional image recognition unit of Embodiment 1. The three-dimensional image recognition unit of Embodiment 1 uses an active type. As shown in FIG. 1, the three-dimensional image recognition unit includes a 3D display device (image display device) 110 and active shutter glasses 120. The active shutter glasses 120 have two lenses of a right-eye lens 121R and a left-eye lens 121L. The active shutter glasses 120 of Embodiment 1 have a right temple 141R which is stretched in a direction substantially orthogonal to the lens surface of the right-eye lens 121R with the side of the right-eye lens 121R as a leading end, and a left temple 141L which is stretched in a direction substantially orthogonal to the lens surface of the left-eye lens 121L with the side of the left-eye lens 121L as a leading end. The stretching direction between the right temple 141R and the left temple 141L and the angle between the lens surface of the right-eye lens 121R and the lens surface of the left-eye lens 121L is not limited to a right angle, and there may be a shift of about 2 to 17° from the right angle. The stretching of each temple may be stretched in one direction as a whole, and a curve portion or a cut portion may be partially formed in accordance with functionality or designability.

In Embodiment 1, each of the left and right lens surfaces of the active shutter glasses has an inclination based on a plane orthogonal to a horizontal surface including the top surfaces of the right temple and the left temple. A plane A shown in FIG. 1 is the horizontal surface including the top surfaces of the right temple and the left temple, and a plane B shown in FIG. 1 is a surface orthogonal to the horizontal surface including the top surfaces of the right temple and the left temple. In Embodiment 1, a symmetric surface which bisects the active shutter glasses on the left and right is referred to as a plane C shown in FIG. 1.

Figure 2:
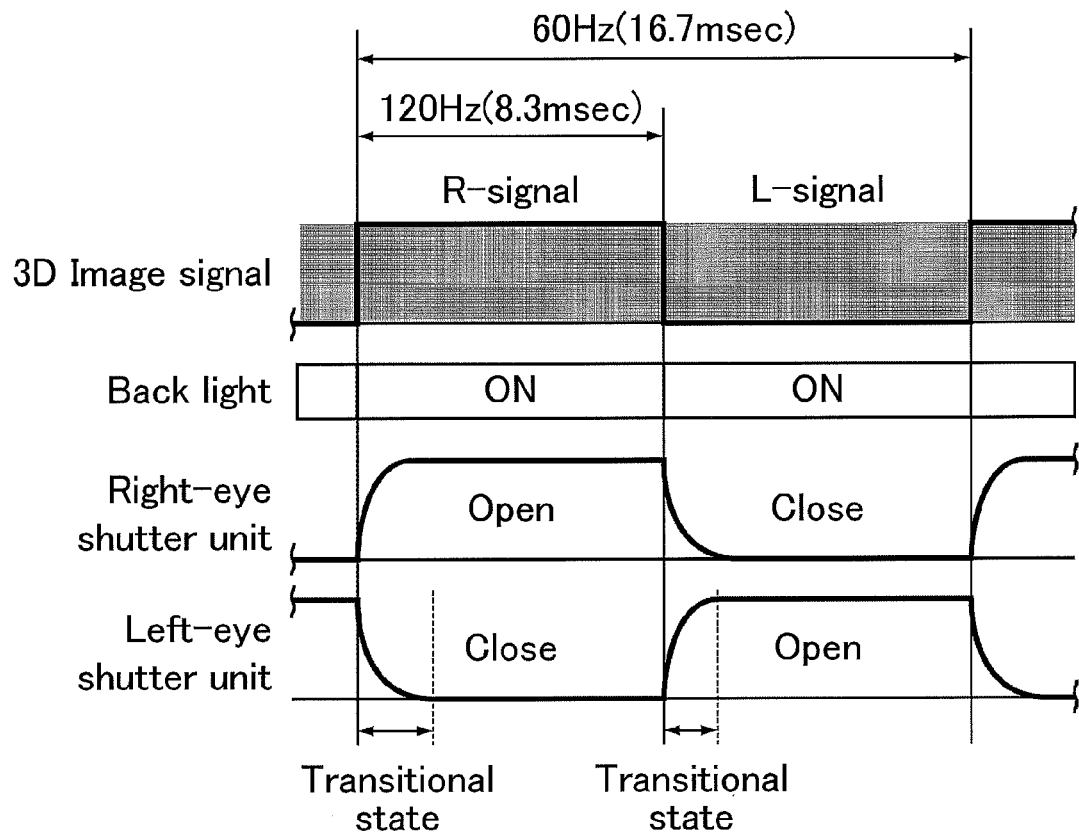
FIG. 2 is a graph showing a signal system which is used in the three-dimensional image recognition unit of Embodiment 1.

FIG. 2 is a graph showing a signal system which is used in the three-dimensional image recognition unit of Embodiment 1. As shown in FIG. 2, a right-eye image signal (R signal) and a left-eye image signal (L signal) are alternately supplied to the 3D display device 110 of Embodiment 1, and a right-eye image and a left-eye image with parallax are alternately displayed on the screen of the 3D display device 110 in a time division manner. When a liquid crystal display device is used as the 3D display device 110, as shown in FIG. 2, a backlight may be constantly turned on.

Each of the right-eye lens 121R and the left-eye lens 121L of the active shutter glasses 120 functions as a liquid crystal shutter. The timing of transmission and blocking of light incident on the right-eye lens 121R and the left-eye lens 121L is alternately switched for every given period. Specifically, as shown in FIG. 2, the switching timing is synchronized with the R signal and the L signal. Accordingly, since the right-eye image is projected onto the right eye of the observer and the left-eye image is projected onto the left eye, the observer can visually recognize a three-dimensional image.

Figure 3:
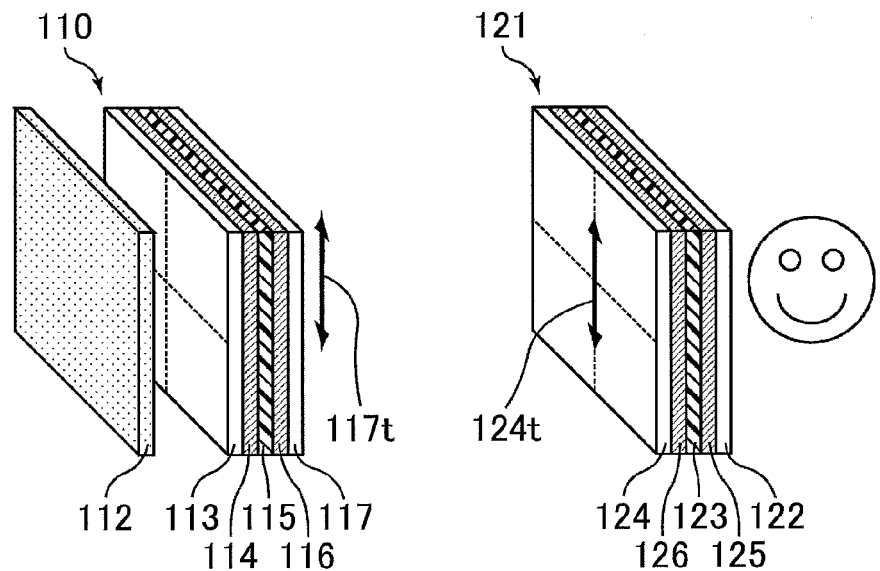
FIG. 3 is a schematic perspective view showing the configuration of the three-dimensional image recognition unit of Embodiment 1.

FIG. 3 is a schematic perspective view showing the configuration of the three-dimensional image recognition unit of Embodiment 1. As shown in FIG. 3, in each of the left and right lenses 121 of the active shutter glasses of Embodiment 1, an observer-side polarizing element 122, a viewing angle compensation film 125, a liquid crystal cell 123, a viewing angle compensation film 126, and a display-side polarizing element 124 are laminated in this order from the observer side. In Embodiment 1, the 3D display device 110 is a liquid crystal display device, and includes a backlight 112, a rear-side polarizing element 113, a viewing angle compensation film 114, a liquid crystal cell 115, a viewing angle compensation film 116, and a front-side polarizing element 117 in this order toward the observer side. The observer-side polarizing element 122, the display-side polarizing element 124, the rear-side polarizing element 113, and the front-side polarizing element 117 are all linearly polarizing elements.

In each of the right-eye lens and the left-eye lens, a transmission axis 124t of the display-side polarizing element 124 is set in the longitudinal direction of the surface of the lens 121. This makes a transmission axis 117t of a front polarizer 117 of the 3D display device 110 and the transmission axis 124t of the display-side polarizing element 124 of the active shutter glasses consistent, thereby securing brightness of images.

Figure 4:
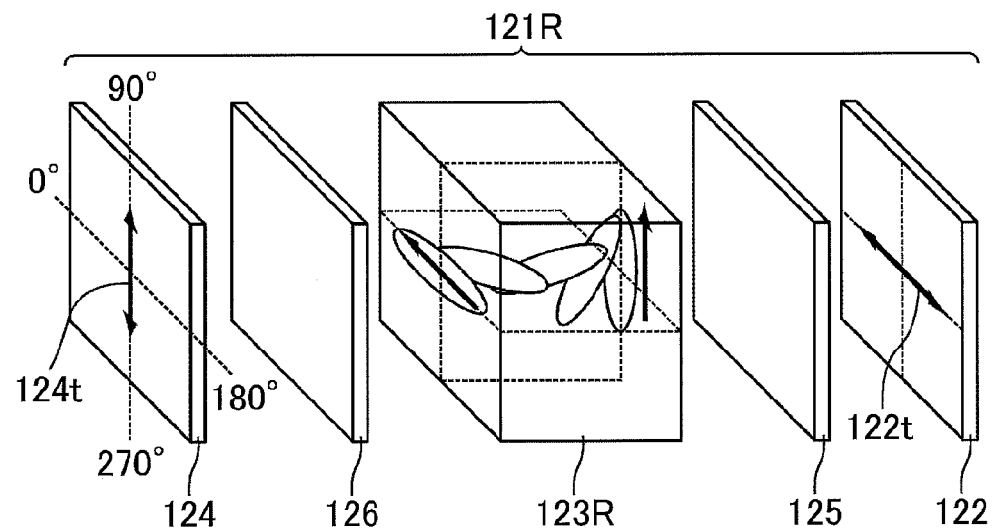
FIG. 4 is an exploded perspective view showing the structure of active shutter glasses of Embodiment 1, and shows the structure of a right-eye lens.
Figure 5:
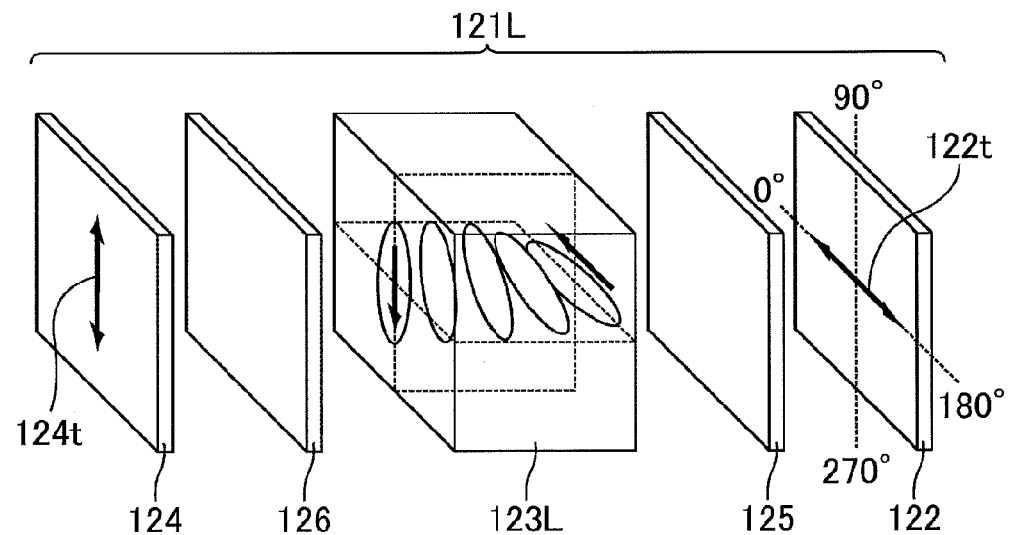
FIG. 5 is an exploded perspective view showing the structure of the active shutter glasses of Embodiment 1, and shows the structure of a left-eye lens.

FIGS. 4 and 5 are exploded perspective views showing the structure of active shutter glasses of Embodiment 1. FIG. 4 shows the structure of the right-eye lens, and FIG. 5 shows the structure of the left-eye lens. The right-eye lens 121R includes an observer-side polarizing element 122, a viewing angle compensation film 125, a right-eye liquid crystal cell 123R, a viewing angle compensation film 126, and a display-side polarizing element 124 in this order from the observer side toward the liquid crystal display device side. The left-eye lens 121L includes an observer-side polarizing element 122, a viewing angle compensation film 125, a left-eye liquid crystal cell 123L, a viewing angle compensation film 126, and a display-side polarizing element 124 in this order from the observer side toward the liquid crystal display device.

A double-headed arrow in FIGS. 4 and 5 represents the transmission axis of the linearly polarizing element. A transmission axis 122t of the observer-side polarizing element 122 and a transmission axis 124t of the display-side polarizing element 124 are in a cross-Nichol relation. Specifically, the cross-Nichol relation means that the angle between the transmission axis 122t of the observer-side polarizing element 122 and the transmission axis 124t of the display-side polarizing element 124 is set in a range of 90°±15° (preferably, ±5°. The transmission axis 122t of the observer-side polarizing element 122 is set in a range of ±15° (preferably, ±5°) from a line passing through 0° azimuth and 180° azimuth, and the transmission axis 124t of the display-side polarizing element 124 is set in a range of ±15° (preferably, ±5°) from a line passing through 90° azimuth and 270° azimuth.

The viewing angle compensation films 125 and 126 have a function of compensating for the viewing angle during light blocking of the lenses 121R and 121L, and for example, a negative C plate, a biaxial film, a multi-view film, or the like may be used. The optical indicatrix of a negative C plate has a disc shape, and the negative C plate satisfies the relationship of $nx \equiv ny > nz$ (z is a beam traveling direction). The viewing angle compensation films 125 and 126 may not be arranged, and may be removed as necessary.

The right-eye liquid crystal cell 123R and the left-eye liquid crystal cell 123L are TN-mode liquid crystal cells (TN cells), and each includes a pair of substrates and a liquid crystal layer interposed between the pair of substrates. The pair of substrates respective include transparent electrodes. The liquid crystal layer includes nematic liquid crystal molecules having positive anisotropy of dielectric constant. In Embodiment 1, during no voltage application, the liquid crystal molecule group is aligned in the alignment treatment direction near the surfaces of the pair of substrates, and is aligned so as to be twisted at about 90° in the thickness direction of the liquid crystal layer. When each of the liquid crystal cells 123R and 123L is an STN cell, the liquid crystal molecule group is aligned so as to be twisted at about 270° in the thickness direction of the liquid crystal layer.

When the liquid crystal cell 123 is viewed from the observer side, the direction of twist of the liquid crystal molecule group is the counterclockwise direction (rotation to the left) in any of the right-eye liquid crystal cell 123R and the left-eye liquid crystal cell 123L, and is consistent in the right-eye liquid crystal cell 123R and the left-eye liquid crystal cell 123L.

A single-headed arrow in FIGS. 4 and 5 represents the alignment treatment (for example, rubbing) direction. The alignment treatment direction for the liquid crystal cell differs between the right-eye liquid crystal cell 123R and the left-eye liquid crystal cell 123L. In the right-eye liquid crystal cell 123R, the alignment treatment direction for the display-side substrate is from 180° azimuth to 0° azimuth when viewed from the observer side, and the alignment treatment direction for the observer-side substrate is from 270° azimuth to 90° azimuth when viewed from the observer side. In the left-eye liquid crystal cell 123L, the alignment treatment direction for the display-side substrate is from 90° azimuth to 270° azimuth when viewed from the observer side, and the alignment treatment direction for the observer-side substrate is from 180° azimuth to 0° azimuth when viewed from the observer side.

Accordingly, the alignment azimuth of a liquid crystal molecule (center molecule) at the center in the thickness direction of the liquid crystal cell 123 differs. While in the right-eye liquid crystal cell 123R, the center molecules are aligned along a line passing through 135° azimuth and 315° azimuth when viewed from the observer side, in the left-eye liquid crystal cell 123L, the center molecules are aligned along a line passing through 45° azimuth and 225° azimuth when viewed from the observer side. That is, the alignment azimuth of the center molecules of the right-eye liquid crystal cell 123R and the alignment azimuth of the center molecules of the left-eye liquid crystal cell 123L are substantially symmetrical based on the symmetric surface which bisects the active shutter glasses on the left and right. On the other hand, the liquid crystal alignment in the right-eye liquid crystal cell 123R and the liquid crystal alignment in the left-eye liquid crystal cell 123L have no symmetric twist based on the symmetric surface which bisects the active shutter glasses 120 on the left and right. For this reason, in this case, there is an advantage in that the same liquid crystal material is used in the right-eye liquid crystal cell 123R and the left-eye liquid crystal cell 123L.

In this way, when comparing the right-eye lens 121R and the left-eye lens 121L, while the right-eye lens 121R and the left-eye lens 121L are different from each other from the viewpoint of the alignment of the liquid crystal molecules, that is, the optical characteristics, other portions are common. As the arrangement configuration of members constituting the right-eye lens 121R and the left-eye lens 121L, a substantially symmetric structure based on a symmetric surface which bisects the active shutter glasses on the left and right is made.

Figure 6:
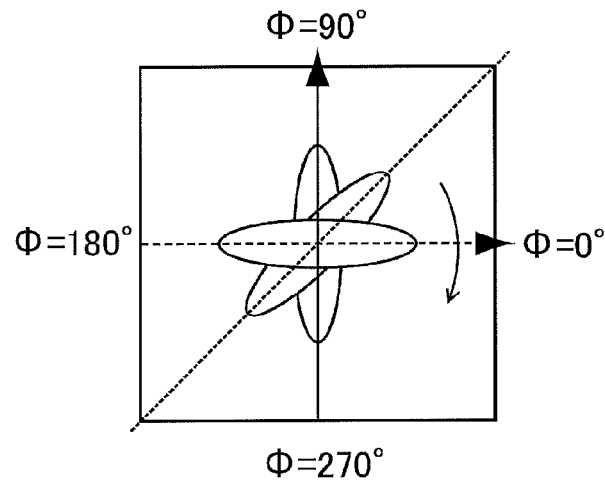
FIG. 6 is a schematic view showing the relationship between an alignment treatment direction and an alignment direction of liquid crystal molecules in the active shutter glasses of Embodiment 1.
Figure 7:
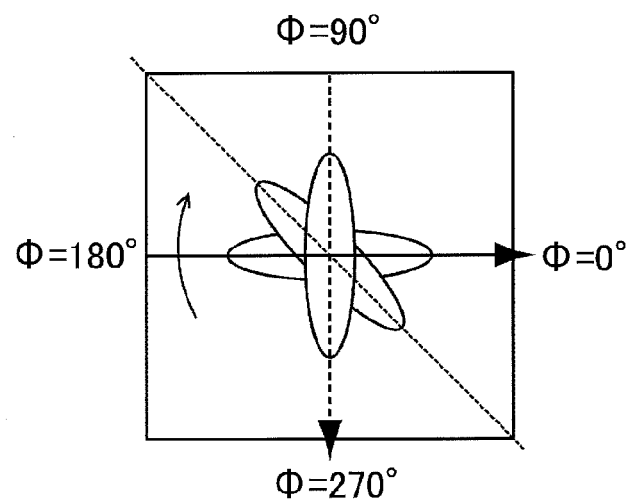
FIG. 7 is a schematic view showing the relationship between an alignment treatment direction and an alignment direction of liquid crystal molecules in the active shutter glasses of Embodiment 1.
Figure 8:
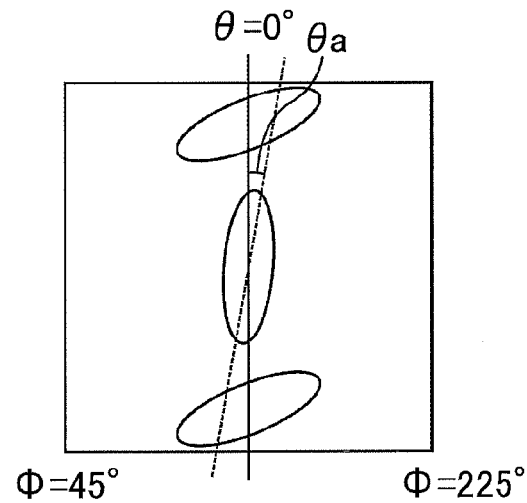
FIG. 8 is a schematic view showing the relationship between an alignment treatment direction and an alignment direction of liquid crystal molecules in the active shutter glasses of Embodiment 1.
Figure 9:
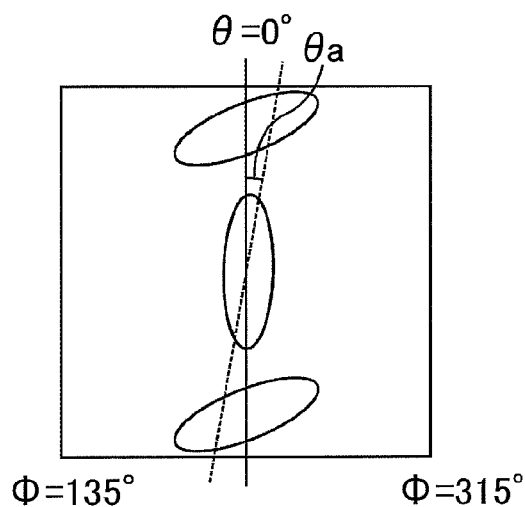
FIG. 9 is a schematic view showing the relationship between an alignment treatment direction and an alignment direction of liquid crystal molecules in the active shutter glasses of Embodiment 1.

FIGS. 6 to 9 are schematic views showing the relationship between an alignment treatment direction and an alignment direction of liquid crystal molecules in the active shutter glasses of Embodiment 1. FIGS. 6 and 8 show the right-eye lens, and FIGS. 7 and 9 show the left-eye lens. FIGS. 6 and 7 are plan view in a state of no voltage application, and show a state when the liquid crystal cell is viewed from the observer side. FIGS. 8 and 9 are sectional views in a state where a voltage equal to or greater than a threshold value is applied. FIG. 8 shows a section taken along a line passing through 135° azimuth and 315° azimuth in FIG. 6, and FIG. 9 shows a section taken along a line passing through 45° azimuth and 225° azimuth in FIG. 7.

As shown in FIGS. 6 and 7, when the liquid crystal cell is viewed in front view, the liquid crystal molecule group is tilted at 90° in the counterclockwise direction (rotation to the left). This is because alignment treatment is performed each of a pair of substrates, and the alignment treatment directions for the substrates are orthogonal to each other.

As shown in FIG. 6, in the right-eye lens, the direction (broken-line arrow) of rubbing display-side substrate is from 180° azimuth to 0° azimuth, and the direction (solid-line arrow) of rubbing of the observer-side substrate is from 270° azimuth to 90° azimuth. As shown in FIG. 7, in the left-eye lens, the direction (broken-line arrow) of rubbing of the display-side substrate is from 90° azimuth to 270° azimuth, and the direction (solid-line arrow) of rubbing of the observer-side substrate is from 180° azimuth to 0° azimuth.

In the right-eye lens, the liquid crystal molecule (center molecule) at the center in the thickness direction of the liquid crystal cell are aligned in the direction of a dotted line of FIG. 6, that is, along a line passing through 45° azimuth and 225° azimuth. In the left-eye lens, the liquid crystal molecule (center molecule) at the center in the thickness direction of the liquid crystal cell are aligned in the direction of a dotted line of FIG. 7, that is, along a line passing through 135° azimuth and 315° azimuth.

The azimuth angle of the liquid crystal molecule (center molecule) at the center in the thickness direction of the liquid crystal cell in the right-eye lens is 225°, and the azimuth angle of the liquid crystal molecule (center molecule) in the thickness direction of the liquid crystal cell in the right-eye lens is 315°.

As shown in FIGS. 8 and 9, in each of the right-eye lens and the left-eye lens, the liquid crystal molecules near the substrate are inclined so as to get up at several degrees with respect to the substrate surface and tilted. As shown in FIG. 8, in the right-eye lens, the center molecules in the liquid crystal cell are aligned substantially vertically with respect to the substrate surface, are aligned so as to be tilted at several degrees as the molecules near the substrate, and are aligned along a line passing through 45° azimuth and 225° azimuth. Here, the azimuth angle is 225°. As shown in FIG. 9, in the left-eye lens, the center molecules in the liquid crystal cell are aligned substantially vertically with respect to the substrate surface, are aligned so as to be tilted at several degrees as the molecules near the substrate, and are aligned along a line passing through 135° azimuth and 315° azimuth. Here, the azimuth angle is 315°.

The average inclination angle $\theta a$ of the liquid crystal molecules during voltage application (during black display) depends on the initial alignment of the liquid crystal molecules during no voltage application and the application voltage to the liquid crystal cell. The average inclination angle $\theta a$ of the liquid crystal molecules affects a contrast distribution described below.

In this way, while the direction of twist of the liquid crystal molecule group is the same in the right-eye liquid crystal cell 123R and the left-eye liquid crystal cell 123L, since the alignment treatment direction which defines the direction of the initial alignment differs, the right-eye liquid crystal cell 123R and the left-eye liquid crystal cell 123L have different optical characteristics.

Figure 10:
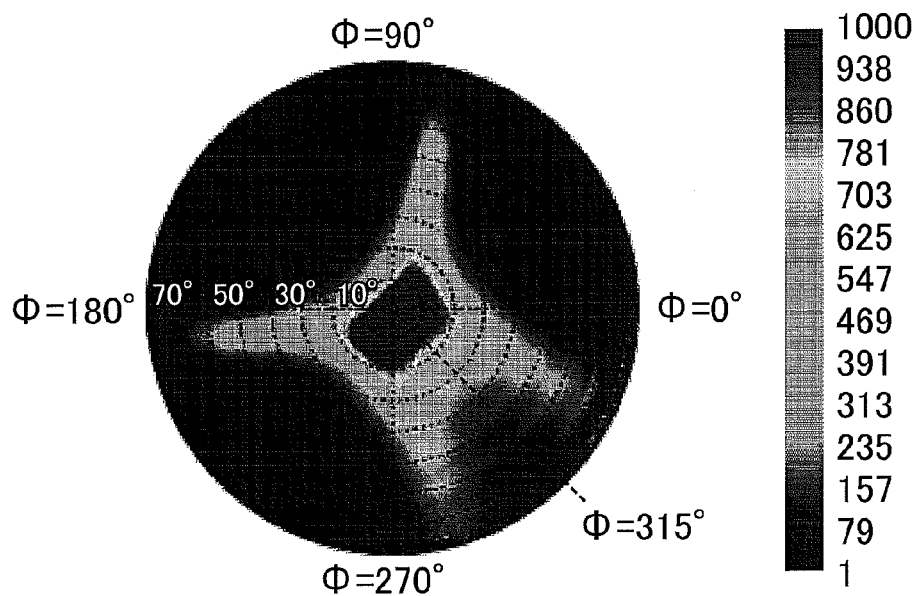
FIG. 10 is a graph showing the result of contrast (CR) characteristics of a TN cell when a TN cell is arranged in a front direction of an image display device, and shows the result of measurement of a right-eye liquid crystal cell.
Figure 11:
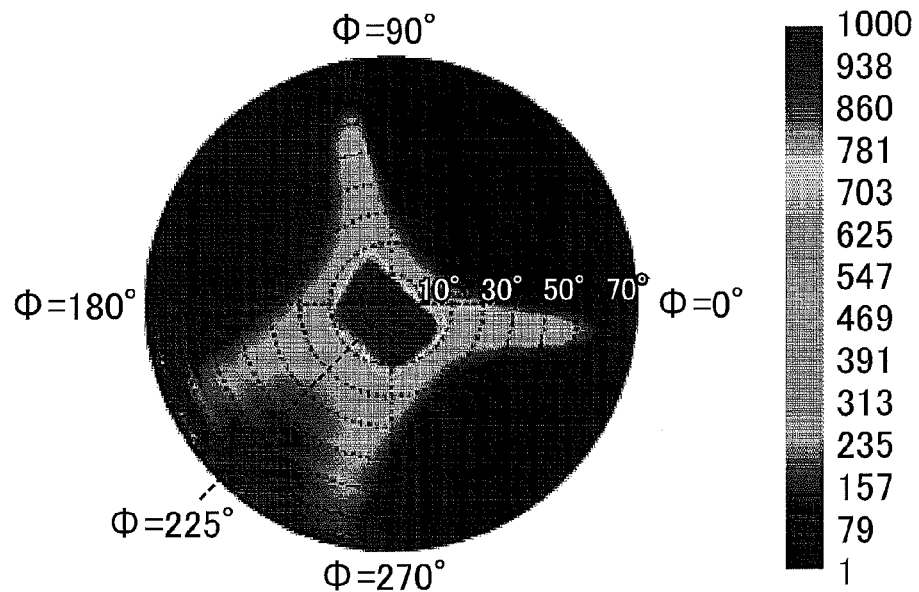
FIG. 11 is a graph showing the result of contrast (CR) characteristics of a TN cell when a TN cell is arranged in a front direction of an image display device, and shows the result of measurement of a left-eye liquid crystal cell.

The visual angle dependency of the active shutter glasses using a TN cell will be described. In a TN cell, the visual angle dependency differs at the respective azimuth angles due to the asymmetry of twist of the liquid crystal alignment. FIGS. 10 and 11 show the result of measurement of the contrast ratio of a TN cell when a TN cell is arranged in the front direction of the image display device. FIG. 10 shows the result of measurement of the right-eye liquid crystal cell, and FIG. 11 shows the result of measurement of the left-eye liquid crystal cell.

The contrast ratio is calculated between during no voltage application and during application of 15 V, and is measured in a state where the active shutter glasses are arranged on a TV backlight in the front direction with respect to the surface of the TV backlight.

As shown in FIGS. 10 and 11, when a TN cell is arranged in the front direction with respect to the surface of the TV backlight, in both of the right-eye lens and the left-eye lens, an asymmetric contrast distribution is formed with a line passing through 0° azimuth and 180° azimuth as an axis, and an asymmetric contrast distribution is formed with a line passing through 90° azimuth and 270° azimuth as an axis. In the right-eye lens, a substantially symmetric contrast distribution is formed with a line passing through 135° azimuth and 315° azimuth as an axis, and in the left-eye lens, a substantially symmetric contrast distribution is formed with a line passing through 45° azimuth and 225° azimuth as an axis.

As shown in FIGS. 10 and 11, when comparing the contrast distribution of the right-eye lens and the contrast distribution of the left-eye lens, a substantially symmetric contrast distribution is formed with a symmetric line of the right-eye lens and the left-eye lens as an axis. The contrast distributions in the right-eye lens and the left-eye lens are symmetrical, thereby obtaining satisfactory three-dimensional display characteristics with good balance.

Figure 12:
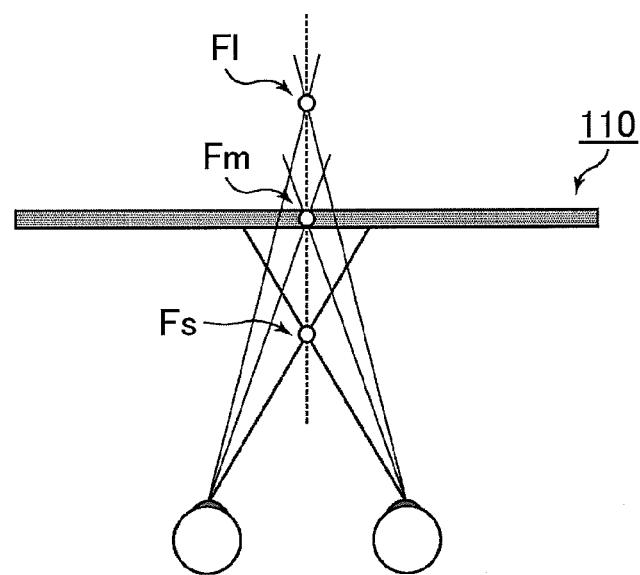
FIG. 12 is a schematic view showing the principle that a person visually recognizes a three-dimensional image.

Hereinafter, the reason will be described. The observer feels a three-dimensional effect from a 3D image to be provided on the basis of a difference in focal distance between both eyes. FIG. 12 is a schematic view showing the principle that a person visually recognizes a three-dimensional image. In a normal 2D image, it is designed such that the focuses of both eyes are consistent in a display surface Fm of the display device. In a 3D image, it is designed such that the focuses of both eyes are consistent in Fs behind the display surface of the 3D display device 110, or it is designed such that the focuses of both eyes are consistent in Fl beyond the display screen. In the former case, it feels like that an image is behind the display surface, and in the latter case, it feels like that an image is beyond the display screen. A person makes observation nearly in the front direction of the face. For this reason, there are many cases where an object to be observed is captured symmetrically with the right eye and the left eye. Accordingly, in the active shutter glasses which are arranged in front of both eyes, the contrast distribution of the right-eye shutter lens and the contrast distribution of the left-eye shutter lens during no voltage application are substantially symmetrical based on the symmetric surface which bisects the active shutter glasses on the left and right.

However, as shown in FIG. 10, when a TN cell is arranged in the front direction with respect to the TV backlight, in the right-eye lens, the position having the maximum contrast ratio is not the center portion in the measurement direction, and is in a direction of an azimuth angle 315° and a polar angle 5°. As shown in FIG. 11, in the left-eye lens, the position having the maximum contrast ratio is not the center portion in the measurement direction, and is in a direction of an azimuth angle 225° and a polar angle 5°.

Accordingly, in the active shutter glasses of Embodiment 1, the directions of the lens surfaces of the right-eye lens 121R and the left-eye lens 121L are inclined such that, when putting on the active shutter glasses 120, the right-eye lens 121R and the left-eye lens 121L have the optimum contrast characteristics.

Figure 13:
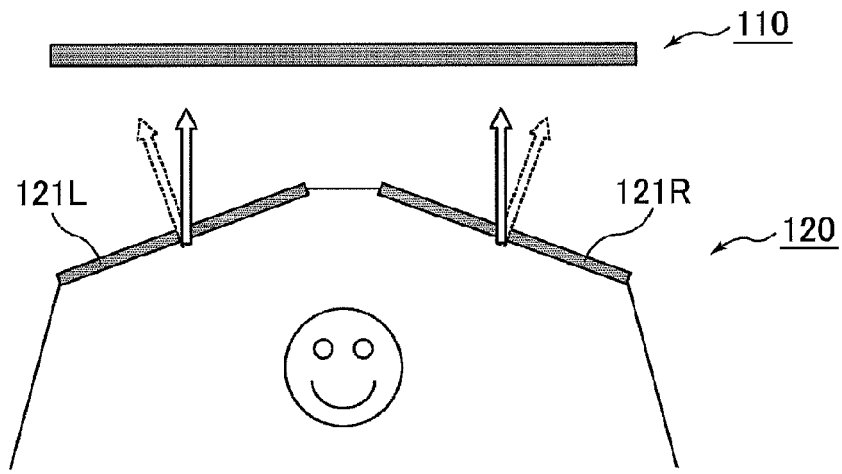
FIG. 13 is a schematic view of a display device and active shutter glasses constituting the three-dimensional image recognition unit of Embodiment 1 when viewed from the above.

FIG. 13 is a schematic view of a display device and active shutter glasses constituting the three-dimensional image recognition unit of Embodiment 1 when viewed from the above. As shown in FIG. 13, the surface of the 3D display device 110 and each of the left and right lens surfaces 121R and 121L of the active shutter glasses 120 are not parallel to each other, and are arranged at an angle. Both of the right-eye lens 121R and the left-eye lens 121L have an inclination with respect to a state where the lenses 121R and 121L are arranged on the same plane. The direction and angle of inclination of the right-eye lens 121R and the direction and angle of inclination of the left-eye lens 121L are set such that a more satisfactory contrast ratio is obtained. These contrast characteristics are determined by the liquid crystal cells in the right-eye lens 121R and the left-eye lens 121L, and the type of the image display device 110 is not particularly limited.

A broken-line arrow in FIG. 13 represents the vertical direction of each of the surfaces of the left and right lenses 121R and 121L of the active shutter glasses 120, and a solid-line arrow represents the direction in which each of the left and right lenses 121R and 121L of the active shutter glasses 120 has the maximum contrast ratio. In Embodiment 1, the alignment treatment direction differs between the liquid crystal cells in the right-eye lens 121R and the left-eye lens 121L of the active shutter glasses 120, and the optimum contrast ratio is obtained in different azimuths. For this reason, in the active shutter glasses 120, the azimuth of inclination of the right-eye lens 121R and the azimuth of inclination of the left-eye lens 121L are different from each other.

Specifically, as shown in FIG. 13, the right-eye lens 121R has the optimum contrast ratio in the left azimuth. For this reason, the right-eye lens 121R is inclined such that the right side of the right-eye lens 121R approaches the observer side. The left-eye lens 121L has the optimum contrast ratio in the right azimuth. For this reason, the left-eye lens 121L is inclined such that the left side of the left-eye lens 121L approaches the observer side.

Figure 14:
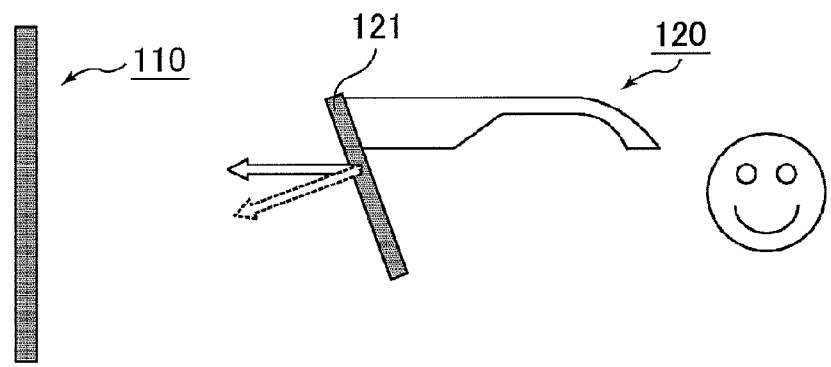
FIG. 14 is a schematic view of a display device and active shutter glasses constituting the three-dimensional image recognition unit of Embodiment 1 when viewed from the side.

FIG. 14 is a schematic view of a display device and active shutter glasses constituting the three-dimensional image recognition unit of Embodiment 1 when viewed from the side. As shown in FIG. 14, the surface of the image display device 110 and the surfaces of both lenses 121 of the active shutter glasses 120 are not parallel to each other, and are arranged at an angle. In the active shutter glasses 120, the azimuth and angle of inclination of the right-eye lens 121 and the azimuth and angle of inclination of the left-eye lens 121 are set such that a satisfactory contrast ratio is obtained.

A broken-line arrow in FIG. 14 represents the vertical direction of each of the surfaces of the left and right lenses 121 of the active shutter glasses 120, and a solid-line arrow represents the direction in which each lens of the active shutter glasses 120 has the maximum contrast ratio. Although in Embodiment 1, the liquid crystal cells in the right-eye lens 121 and the left-eye lens 121 of the active shutter glasses 120 are different from each other, the optimum contrast ratio is obtained in the same azimuth on the top and bottom. For this reason, in the active shutter glasses 120, the azimuth of inclination of the right-eye lens 121 and the azimuth of inclination of the left-eye lens 121 are the same.

Figure 15:
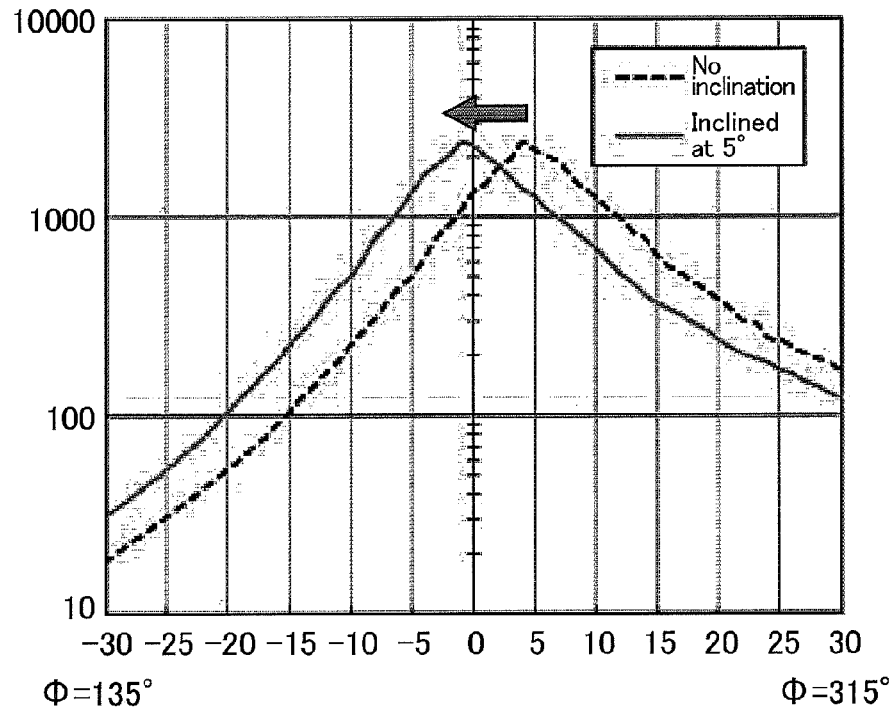
FIG. 15 is a graph showing the contrast characteristics of each of left and right lenses of the active shutter glasses of Embodiment 1, and shows the contrast characteristics of the right-eye lens.
Figure 16:
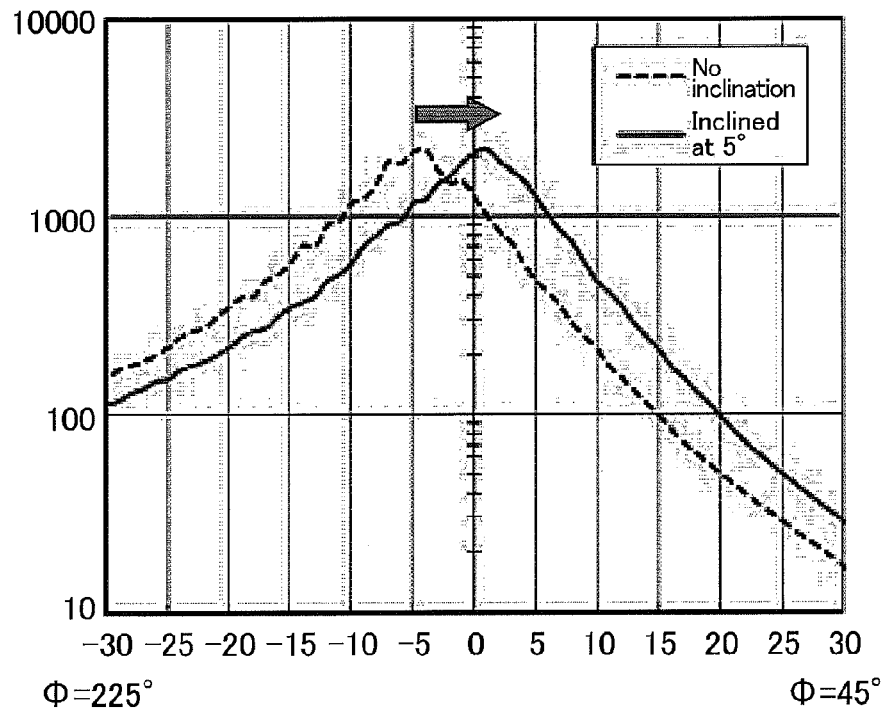
FIG. 16 is a graph showing the contrast characteristics of each of left and right lenses of the active shutter glasses of Embodiment 1, and shows the contrast characteristics of the left-eye lens.

FIGS. 15 and 16 are graphs showing the contrast characteristics of each of the left and right lenses of the active shutter glasses of Embodiment 1. FIG. 15 shows the contrast characteristics of the right-eye lens, and FIG. 16 shows the contrast characteristics of the left-eye lens. A broken line in FIG. 15 represents the contrast characteristics before the right-eye lens is inclined (when the right-eye lens and the left-eye lens are arranged on the same plane), and a solid line represents the contrast characteristics after the right-eye lens is inclined (when the right-eye lens and the left-eye lens are not arranged on the same plane). A broken line in FIG. 16 represents the contrast characteristics before the left-eye lens is inclined (when the left-eye lens and the right-eye lens are arranged on the same plane), and a solid line represents the contrast characteristics after the left-eye lens and the right-eye lens are not arranged on the same plane). The inclination in a polar angle direction of the right-eye lens represented by the solid line in FIG. 15 is 5°, and the inclination in a polar angle direction of the left-eye lens represented by the solid line in FIG. 16 is 5°. FIG. 15 shows the contrast ratio of a section at an azimuth angle 315° at which the right-eye lens has the maximum contrast ratio at a polar angle 5°, and FIG. 16 shows the contrast ratio of a section at an azimuth angle 225° at which the left-eye lens has the maximum contrast ratio at a polar angle 5°.

As shown in FIG. 15, in regard to the right-eye lens, when the right-eye lens is placed horizontally with respect to the surface of the TV backlight and the contrast ratio is measured, while the contrast ratio has the maximum value in a direction inclined at a polar angle 5° in the right azimuth when viewed from the observer, if the right side of the lens when viewed from the observer side is inclined at 5° toward the observer side, the value of the maximum contrast ratio is obtained in the front direction of the observer (the vertical direction of the surface of the TV backlight).

As shown in FIG. 16, in regard to the left-eye lens, when the left-eye lens is placed horizontally with respect to the surface of the TV backlight and the contrast ratio is measured, while the contrast ratio has the maximum value in a direction inclined at a polar angle 5° in the left azimuth when viewed from the observer, if the left side of the lens when viewed from the observer side is inclined at 5° toward the observer side, the value of the maximum contrast ratio is obtained in the front direction of the observer (the vertical direction of the surface of the TV backlight).

In this way, according to the active shutter glasses of Embodiment 1, since the inclination of each of the right-eye lens and the left-eye lens is adjusted such that a higher contrast ratio is obtained, it is possible to visually recognize a 3D image with excellent contrast characteristics.

The liquid crystal cells 123R and 123L are not particularly limited insofar as it is possible to secure a response speed sufficient to be synchronized with the frame rate of the 3D display device 110. The mode of the liquid crystal cell 123 may be, for example, an STN mode, an OCB mode, a VA mode, an IPS mode, an FFS mode, an FLC mode, or the like, in addition to the TN mode.

Although in the above description, an example where the right-eye lens is inclined at the azimuth angle 315° at which the right-eye lens has the maximum contrast ratio at the polar angle 5° has been described, the right-eye lens may be inclined at any azimuth angle insofar as the azimuth angle is in a range of ±45° with respect to the azimuth angle 315°, that is, in a range of 270 to 360°. Although an example where the right-eye lens is inclined at the azimuth angle 225° at which the left-eye lens has the maximum contrast ratio at the polar angle 5° has been described, the right-eye lens may be inclined insofar as the azimuth angle is in a range of ±45° with respect to the azimuth angle 225°, that is, in a range of 180 to 270°.

In the above-described example, the direction of the polar angle 5° and the azimuth angle 315° of the right-eye lens is the direction, in which the maximum contrast ratio is obtained, from among all directions (including any polar angle and azimuth angle), and the direction of the polar angle 5° and the azimuth angle 225° of the left-eye lens is the direction, in which the maximum contrast ratio is obtained, from among all directions (including any polar angles and azimuth angles).

As the 3D display device 110, a plasma display, an organic or inorganic EL display, a CRT display, a device in which a projector and a screen are combined, or the like may be used, in addition to the liquid crystal display device.

Comparative Form 1

Figure 17:
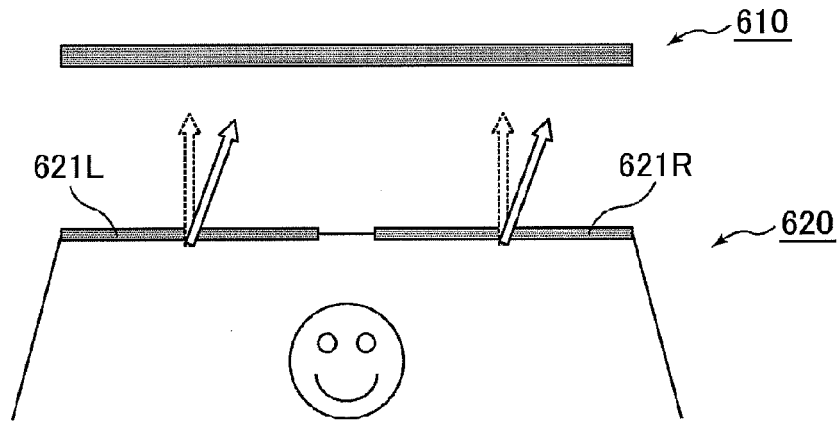
FIG. 17 is a schematic view of a display device and active shutter glasses constituting the three-dimensional image recognition unit of Comparative Form 1 when viewed from the above.

FIG. 17 is a schematic view of a display device and active shutter glasses constituting the three-dimensional image recognition unit of Comparative Form 1 when viewed from the above. As shown in FIG. 17, an arrangement is made such that the surface of a 3D display device 610 and the surfaces of left and right lenses 621R and 621L of active shutter glasses 620 are parallel to each other.

A broken-line arrow in FIG. 17 represents the direction orthogonal to the surfaces of the left and right lenses 621R and 621L of the active shutter glasses 620, and a solid-line arrow represents the direction in which each lens of the active shutter glasses 620 has the maximum contrast ratio. In Comparative Form 1, the surfaces of the left and right lenses 621R and 621L of the active shutter glasses 620 have the same configuration, and the direction in which the optimum contrast ratio is obtained is the same. The direction in which the maximum contrast ratio is obtained is the right direction with respect to the direction which becomes the vertical direction with respect to the display surface, and the directions are not consistent with each other. For this reason, in the active shutter glasses 620, it is difficult to say that sufficiently efficient visual angle characteristics are obtained.

Figure 18:
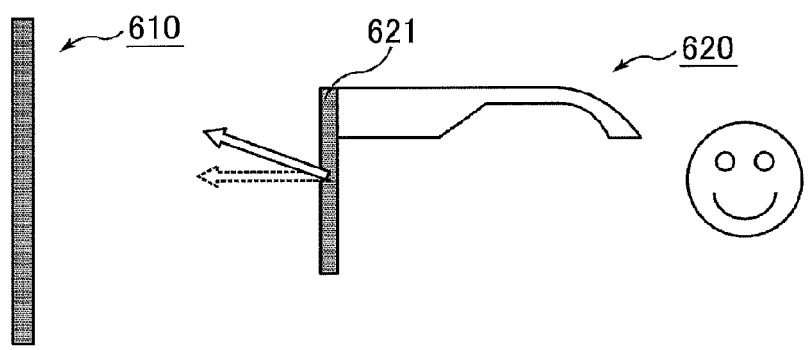
FIG. 18 is a schematic view of a display device and active shutter glasses constituting the three-dimensional image recognition unit of Comparative Form 1 when viewed from the side.

FIG. 18 is a schematic view of a display device and active shutter glasses constituting the three-dimensional image recognition unit of Comparative Form 1 when viewed from the side. As shown in FIG. 18, an arrangement is made such that the surface of the 3D display device 610 and the surfaces of the left and right lenses 621R and 621L of the active shutter glasses 620 are parallel to each other.

A broken-line arrow in FIG. 18 represents the direction orthogonal to the surfaces of the left and right lenses 621R and 621L of the active shutter glasses 620, and a solid-line arrow represents the direction in which each of the left and right lenses 621R and 621L of the active shutter glasses 620 has the maximum contrast ratio. In Comparative Form 1, the direction in which the maximum contrast ratio is obtained is the upper direction with respect to the direction which becomes the vertical direction with respect to the display surface of the 3D display device 610, and the directions are not consistent with each other. For this reason, in the active shutter glasses 620, it is difficult to say that sufficiently efficient visual angle characteristics are obtained.

Comparative Form 2

Figure 19:
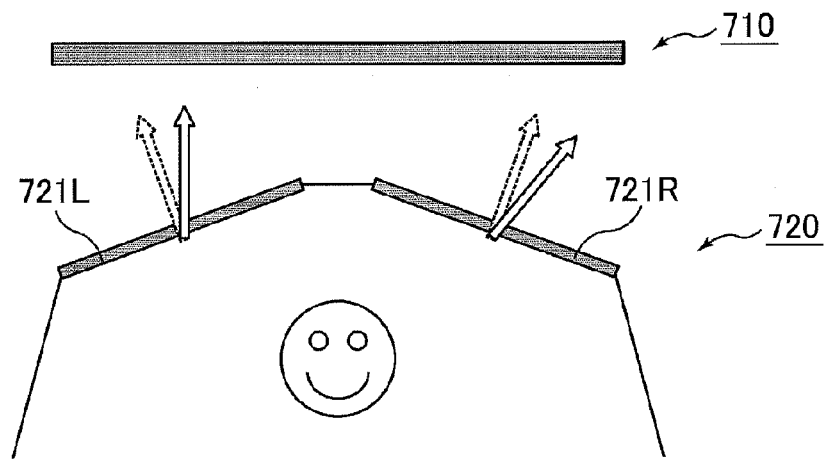
FIG. 19 is a schematic view of a display device and active shutter glasses constituting the three-dimensional image recognition unit of Comparative Form 2 when viewed from the above.

FIG. 19 is a schematic view of a display device and active shutter glasses constituting the three-dimensional image recognition unit of Comparative Form 2 when viewed from the above. As shown in FIG. 19, an arrangement is made such that the surface of a 3D display device 710 and both lens surfaces of active shutter glasses 720 are not parallel to each other, but are at a right angle.

A broken-line arrow in FIG. 19 represents the direction with respect to the surface of each of left and right lenses 721R and 721L of the active shutter glasses 720, and a solid-line arrow represents the direction in which each of the left and right lenses 721R and 721L of the active shutter glasses 720 has the maximum contrast ratio. The left and right lenses 721R and 721L of the active shutter glasses 720 have the same configuration, and the direction in which the optimum contrast ratio is obtained is the same. For this reason, in regard to the left-eye lens 721L of the active shutter glasses 720, the direction orthogonal to the surface of the 3D display device 710 and the direction in which the left-eye lens 721L has the optimum contrast ratio are consistent with each other, and satisfactory contrast characteristics are obtained.

However, the right-eye lens 721R is shifted in the right direction from the direction orthogonal to the surface of the right-eye lens 721R, and as a result, the direction in which the right-eye lens 721R has the optimum contrast ratio is shifted significantly in the right direction from the direction orthogonal to the surface of the display.

Therefore, in the active shutter glasses 720 of Comparative Form 2, it is difficult to say that sufficiently efficient visual angle characteristics are obtained.

Embodiment 2

A three-dimensional image recognition unit of Embodiment 2 has the same configuration as in Embodiment 1 except that the alignment direction and the optical characteristics of the liquid crystal cell of the active shutter glasses are different. In Embodiment 2, the direction of twist of the liquid crystal molecule group in the right-eye liquid crystal cell and the direction of twist of the liquid crystal molecule group in the left-eye liquid crystal cell are different from each other. Specifically, while the direction of twist of the liquid crystal molecule group in the right-eye liquid crystal cell is the counterclockwise direction (rotation to the left) when viewed from the observer side, and the direction of twist of the liquid crystal molecule group of the left-eye liquid crystal cell is the clockwise direction (rotation to the right) when viewed from the observer side.

Figure 20:
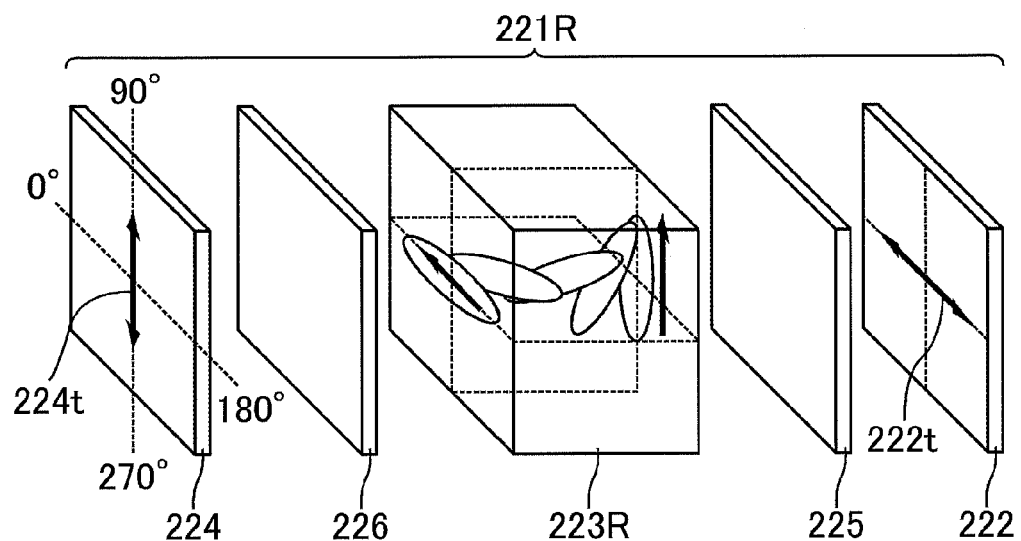
FIG. 20 is an exploded perspective view showing the structure of active shutter glasses of Embodiment 2, and shows the structure of a right-eye lens.
Figure 21:
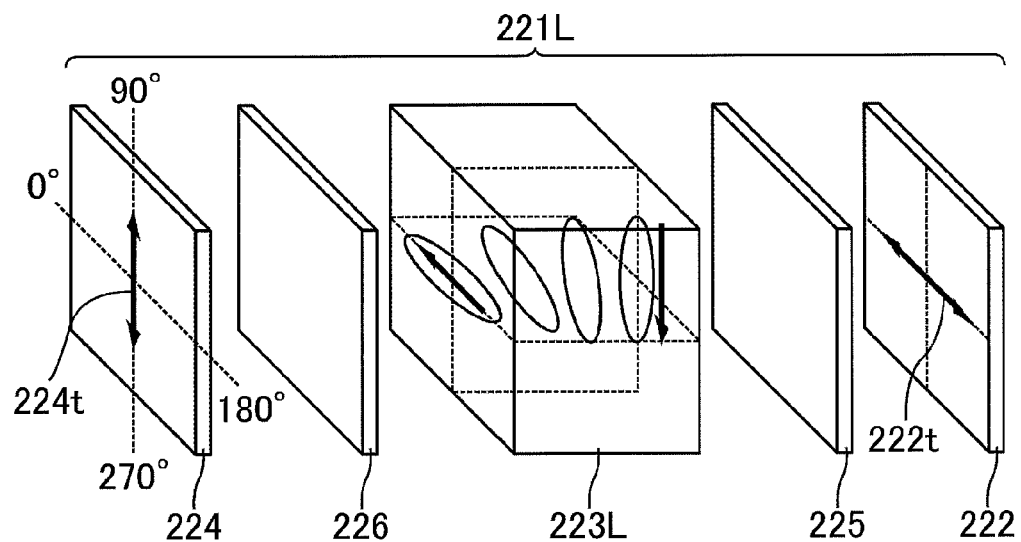
FIG. 21 is an exploded perspective view showing the structure of the active shutter glasses of Embodiment 2, and shows the structure of a left-eye lens.

FIGS. 20 and 21 are exploded perspective views showing the structure of active shutter glasses of Embodiment 2. FIG. 20 shows the structure of the right-eye lens, and FIG. 21 shows the structure of the left-eye lens. The active shutter glasses of Embodiment 2 have a right-eye lens 221R and the left-eye lens 221L. The light transmission and blocking (opening and closing) of the right-eye lens 221R and the left-eye lens 221L are alternately switched. As shown in FIG. 2, the switching timing is synchronized with the R signal and the L signal.

As shown in FIG. 20, the right-eye lens 221R includes an observer-side polarizing element 222, a viewing angle compensation film 225, a liquid crystal cell 223R, a viewing angle compensation film 226, and a display-side polarizing element 224 in this order from the observer side. As shown in FIG. 21, the left-eye lens 221L includes an observer-side polarizing element 222, a viewing angle compensation film 225, a liquid crystal cell 223L, a viewing angle compensation film 226, and a display-side polarizing element 224 in this order from the observer side. The observer-side polarizing element 222 and the display-side polarizing element 224 are all linearly polarizing elements.

A double-headed arrow in FIGS. 20 and 21 represents the transmission axis of the linearly polarizing element. A transmission axis 222*t* of the observer-side polarizing element 222 and a transmission axis 224*t* of the display-side polarizing element 224 are in a cross-Nichol relation. Specifically, the cross-Nichol relation means that the angle of the transmission axis 222*t* of the observer-side polarizing element 222 and the transmission axis 224*t* of the display-side polarizing element 224 is set in a range of 90°±15° (preferably, ±5°). The transmission axis 222*t* of the observer-side polarizing element 222 is set in a range of ±15° (preferably, ±5°) from a line passing through 0° azimuth and 180° azimuth, and the transmission axis 224*t* of the display-side polarizing element 224 is set in a range of ±15° (preferably, ±5°) from a line passing through 90° azimuth and 270° azimuth.

The viewing angle compensation films 225 and 226 have a function of compensating for the viewing angle during light blocking of the lenses 221R and 221L, and for example, a negative C plate, a biaxial film, a multi-view film, or the like may be used. The optical indicatrix of a negative C plate has a disc shape, and the negative C plate satisfies the relationship of nx≅ny>nz. The viewing angle compensation films 225 and 226 may not be arranged, and may be removed as necessary.

The right-eye liquid crystal cell 223R and the left-eye liquid crystal cell 223L are TN-mode liquid crystal cells (TN cells), and each includes a pair of substrates and a liquid crystal layer interposed between the pair of substrates. The pair of substrates respective include transparent electrodes. The liquid crystal layer includes nematic liquid crystal molecules having positive anisotropy of dielectric constant. In Embodiment 2, during no voltage application, the liquid crystal molecule group is aligned in the alignment treatment direction near the surfaces of the pair of substrates, and is aligned so as to be twisted at about 90° in the thickness direction of the liquid crystal layer. When each of the liquid crystal cell 223R and 223L is an STN cell, the liquid crystal molecule group is aligned so as to be tilted at about 270° in the thickness direction of the liquid crystal layer.

The direction of twist of the liquid crystal molecule group differs between the right-eye liquid crystal cell 223R and the left-eye liquid crystal cell 223L when the liquid crystal cell 223 is viewed from the observer side. While the direction of twist of the liquid crystal molecule group in the right-eye liquid crystal cell 223R is the counterclockwise direction (rotation to the left) when viewed from the observer side, and the direction of twist of the liquid crystal molecule group in the left-eye liquid crystal cell is the clockwise direction (rotation to the right) when viewed from the observer side.

A single-headed arrow in FIGS. 20 and 21 represents the alignment treatment (for example, rubbing) direction. The alignment treatment direction for the liquid crystal cell differs between the right-eye liquid crystal cell 223R and the left-eye liquid crystal cell 223L. In the right-eye liquid crystal cell 223R, the alignment treatment direction for the display-side substrate is from 180° azimuth to 0° azimuth when viewed from the observer side, and the alignment treatment direction for the observer-side substrate is from 270° azimuth to 90° azimuth when viewed from the observer side. In the left-eye liquid crystal cell 223L, the alignment treatment direction for the display-side substrate is from 180° azimuth to 0° azimuth when viewed from the observer side, and the alignment treatment direction of the observer-side substrate is from 90° azimuth to 270° azimuth when viewed from the observer side.

Accordingly, there is a difference in the alignment azimuth of the liquid crystal molecule (center molecule) at the center in the thickness of the liquid crystal cell 223. While in the right-eye liquid crystal cell 223R, the center molecules are aligned along a line passing through 135° azimuth and 315° azimuth when viewed from the observer side, in the left-eye liquid crystal cell 223L, the center molecules are aligned along a line passing through 45° azimuth and 225° azimuth when viewed from the observer side. That is, the alignment azimuth of the center molecules of the right-eye liquid crystal cell 223R and the alignment azimuth of the center molecules of the left-eye liquid crystal cell 223L are substantially symmetrical based on the symmetric surface which bisects the active shutter glasses on the left and right. The liquid crystal alignment in the right-eye liquid crystal cell 223R and the liquid crystal alignment in the left-eye liquid crystal cell 223L have symmetric twist based on the symmetric surface which bisects the active shutter glasses 220 on the left and right.

In this way, when comparing the right-eye lens 221R and the left-eye lens 221L, while the right-eye lens 221R and the left-eye lens 221L are different from each other from the viewpoint of the alignment of the liquid crystal molecules, that is, the optical characteristics, other portions are common. As the arrangement configuration of members constituting the right-eye lens 221R and the left-eye lens 221L, a substantially symmetric structure based on a symmetric surface which bisects the active shutter glasses on the left and right is made.

Figure 22:
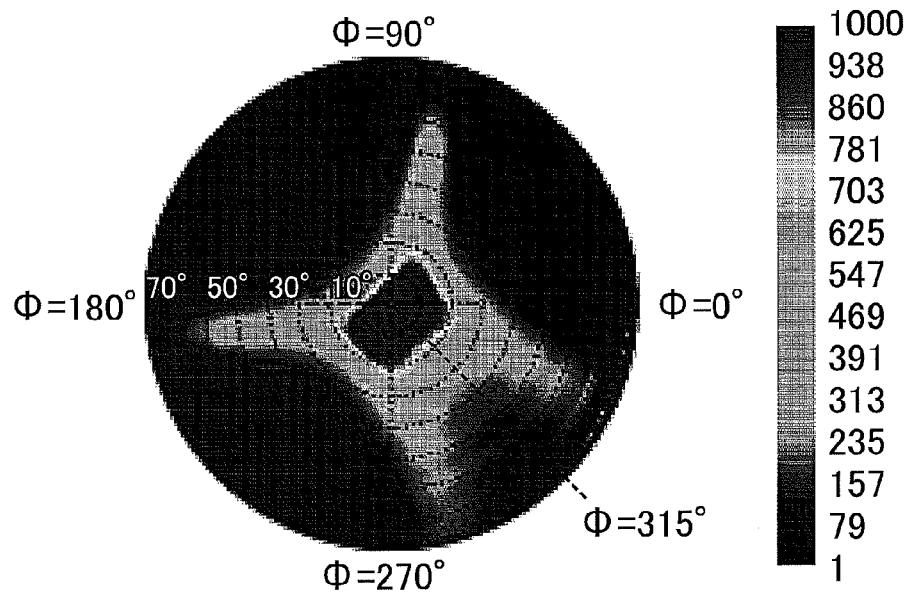
FIG. 22 is a graph showing the result of contrast (CR) characteristics of a TN cell when a TN cell is arranged in a front direction of an image display device, and shows the result of measurement of a right-eye liquid crystal cell.
Figure 23:
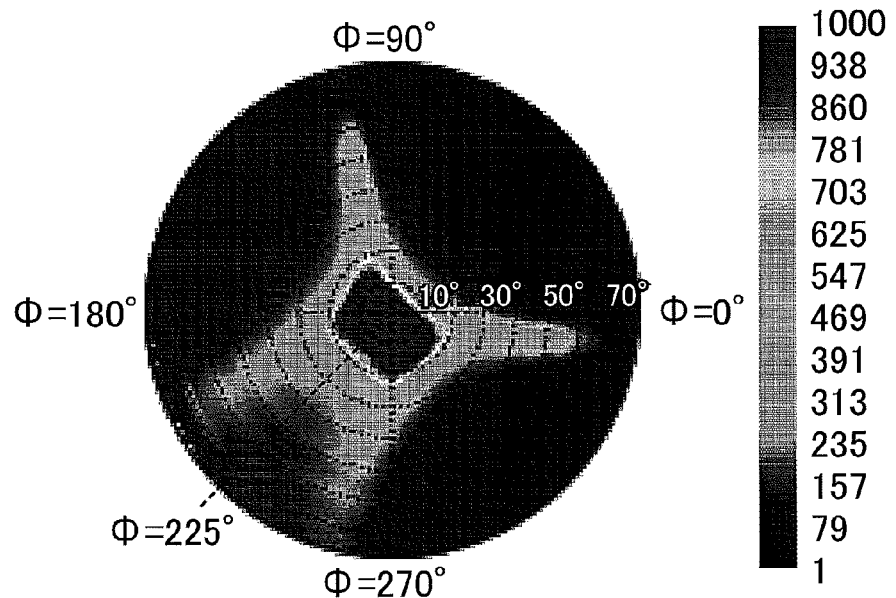
FIG. 23 is a graph showing the result of contrast (CR) characteristics of a TN cell when a TN cell is arranged in a front direction of an image display device, and shows the result of measurement of a left-eye liquid crystal cell.

The visual angle dependency of the active shutter glasses using a TN cell will be described. In a TN cell, the visual angle dependency differs at the respective azimuth angles due to the asymmetry of twist of the liquid crystal alignment. FIGS. 22 and 23 are graphs showing the result of contrast (CR) characteristics of a TN cell when a TN cell is arranged in a front direction of an image display device. FIG. 22 shows the result of measurement of the right-eye liquid crystal cell, and FIG. 23 shows the result of measurement of the left-eye liquid crystal cell.

The contrast ratio is calculated between during no voltage application and during application of 15 V, and is measured in a state where the active shutter glasses are arranged on a TV backlight in the front direction with respect to the surface of the TV backlight.

As shown in FIGS. 22 and 23, when a TN cell is arranged in the front direction with respect to the surface of the TV backlight, in both of the right-eye lens and the left-eye lens, an asymmetric contrast distribution is formed with a line passing through 0° azimuth and 180° azimuth as an axis, and an asymmetric contrast distribution is formed with a line passing through 90° azimuth and 270° azimuth as an axis. In regard to the right-eye lens, a substantially asymmetric contrast distribution is formed with a line passing through 135° azimuth and 315° azimuth as an axis, and in regard to the left-eye lens, a substantially symmetric contrast distribution is formed with a line passing through 45° azimuth and 225° azimuth as an axis.

However, as shown in FIG. 22, when a TN cell is arranged in the front direction with respect to the TV backlight, in the right-eye lens, the position having the maximum contrast ratio is not the center portion in the measurement direction, and is in the direction of the azimuth angle 315° and the polar angle 5°. As shown in FIG. 23, in the left-eye lens, the position having the maximum contrast ratio is not the center portion in the measurement direction, and is in the direction of the azimuth angle 225° and the polar angle 5°.

Accordingly, in the active shutter glasses of Embodiment 2, the directions of the lens surfaces of the right-eye lens 221R and the left-eye lens 221L are inclined such that, when putting on the active shutter glasses 220, the right-eye lens 221R and the left-eye lens 221L have the optimum contrast characteristics.

Figure 24:
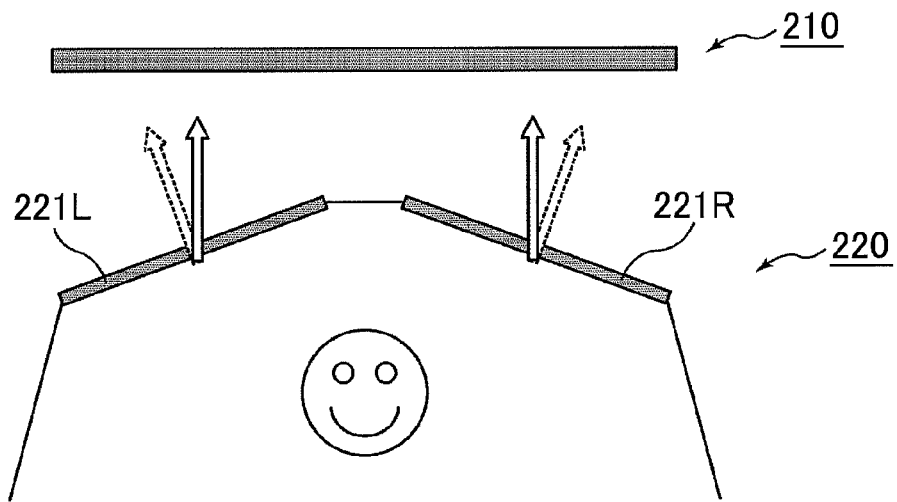
FIG. 24 is a schematic view of a display device and active shutter glasses constituting a three-dimensional image recognition unit of Embodiment 2 when viewed from the above.

FIG. 24 is a schematic view of a display device and active shutter glasses constituting the three-dimensional image recognition unit of Embodiment 2 when viewed from the above. As shown in FIG. 24, the surface of the 3D display device 210 and each of the left and right lens surfaces 221R and 221L of the active shutter glasses 220 are not parallel to each other, and are arranged at an angle. Both of the right-eye lens 221R and the left-eye lens 221L have an inclination with respect to a state where the lenses 221R and 121L are arranged on the same plane. The direction and angle of inclination of the right-eye lens 221R and the direction and angle of inclination of the left-eye lens 221L are set such that a more satisfactory contrast ratio is obtained. These contrast characteristics are determined by the liquid crystal cells in the right-eye lens 221R and the left-eye lens 221L, and the type of the image display device 210 is not particularly limited.

A broken-line arrow in FIG. 24 represents the vertical direction of each of the surfaces of the left and right lenses 221R and 121L of the active shutter glasses 220, and a solid-line arrow represents the direction in which each of the left and right lenses 221R and 221L of the active shutter glasses 120 has the maximum contrast ratio. In Embodiment 1, the liquid crystal cells in the right-eye lens 221R and the left-eye lens 221L of the active shutter glasses 220 are different from each other, and have the optimum contrast ratio in different left and right azimuths. For this reason, the azimuth of inclination of the right-eye lens 221R and the azimuth of inclination of the left-eye lens 221L in the active shutter glasses 220 are different from each other.

Specifically, as shown in FIG. 24, the right-eye lens 221R has the optimum contrast ratio in the left azimuth. For this reason, the right-eye lens 221R is inclined such that the right side of the right-eye lens 221R approaches the observer side. The left-eye lens 221L has the optimum contrast ratio in the right azimuth. For this reason, the left-eye lens 221L is inclined such that the left side of the left-eye lens 221L approaches the observer side.

Figure 25:
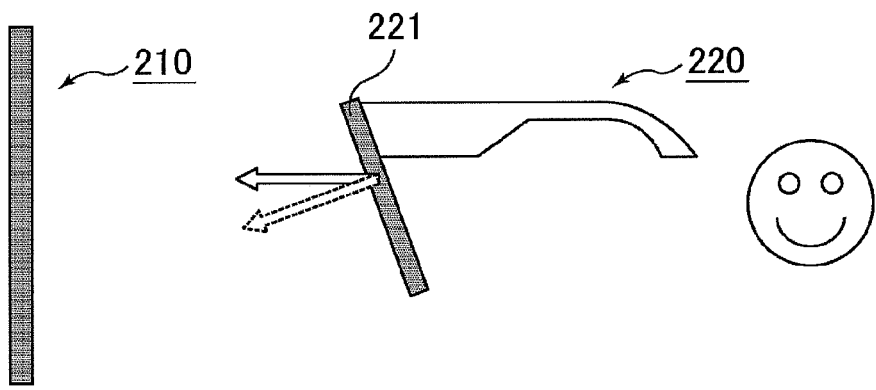
FIG. 25 is a schematic view of a display device and active shutter glasses constituting the three-dimensional image recognition unit of Embodiment 2 when viewed from the side.

FIG. 25 is a schematic view of a display device and active shutter glasses constituting the three-dimensional image recognition unit of Embodiment 2 when viewed from the side. As shown in FIG. 25, the surface of the image display device 210 and the surfaces of both lenses 221 of the active shutter glasses 220 are not parallel to each other, and are arranged at an angle. The azimuth and angle of inclination of the right-eye lens 221 and the azimuth and angle of inclination of the left-eye lens 221 in the active shutter glasses 220 such that a satisfactory contrast ratio is obtained.

A broken-line arrow in FIG. 25 represents the vertical direction of each of the surfaces of the left and right lenses 221 of the active shutter glasses 220, and a solid-line arrow represents the direction in which each lens of the active shutter glasses 220 has the maximum contrast ratio. Although in Embodiment 2, the liquid crystal cells in the right-eye lens 221 and the left-eye lens 221 of the active shutter glasses 220 are different from each other, the optimum contrast ratio is obtained in the same azimuth on the top and bottom. For this reason, the azimuth of inclination of the right-eye lens 221 and the azimuth of inclination of the left-eye lens 221 in the active shutter glasses 220 are the same.

In this way, according to the active shutter glasses of Embodiment 2, the right-eye lens and the left-eye lens are adjusted such that a higher contrast ratio is obtained, thereby obtaining 3D display with excellent contrast characteristics.

The liquid crystal cells 223R and 223L are not particularly limited insofar as it is possible to secure a response speed sufficient to be synchronized with the frame rate of the 3D display device 210. The mode of the liquid crystal cell 223 may be, for example, an STN mode, an OCB mode, a VA mode, an IPS mode, an FFS mode, an FLC mode, or the like, in addition to the TN mode.

Although in the above description, an example where the right-eye lens is inclined at the azimuth angle 315° at which the right-eye lens has the maximum contrast ratio at the polar angle 5° has been described, the right-eye lens may be inclined at any azimuth angle insofar as the azimuth angle is in a range of ±45° with respect to the azimuth angle 315°, that is, in a range of 270 to 360°. Although an example where the right-eye lens is inclined at the azimuth angle 225° at which the left-eye lens has the maximum contrast ratio at the polar angle 5° has been described, the right-eye lens may be inclined at any azimuth angle insofar as the azimuth angle is in a range of ±45° with respect to the azimuth angle 225°, that is, in a range of 180 to 270°.

In the above-described example, the direction of the polar angle 5° and the azimuth angle 315° of the right-eye lens is the direction, in which the maximum contrast ratio is obtained, in a specified range, and the direction of the polar angle 5° and the azimuth angle 225° of the left-eye lens is the direction, in which the maximum contrast ratio is obtained, in a specified range.

As the 3D display device 210, a plasma display, an organic or inorganic EL display, a CRT display, a device in which a projector and a screen are combined, or the like may be used, in addition to the liquid crystal display device.

Embodiment 3

A three-dimensional image recognition unit of Embodiment 3 is the same as Embodiment 1, except that the active shutter glasses have a different configuration. Embodiment 3 is different from Embodiment 1 in that a λ/4 is further provided in the linearly polarizing plate on the observer-side surface of the 3D display device to form a circularly polarizing plate.

Figure 26:
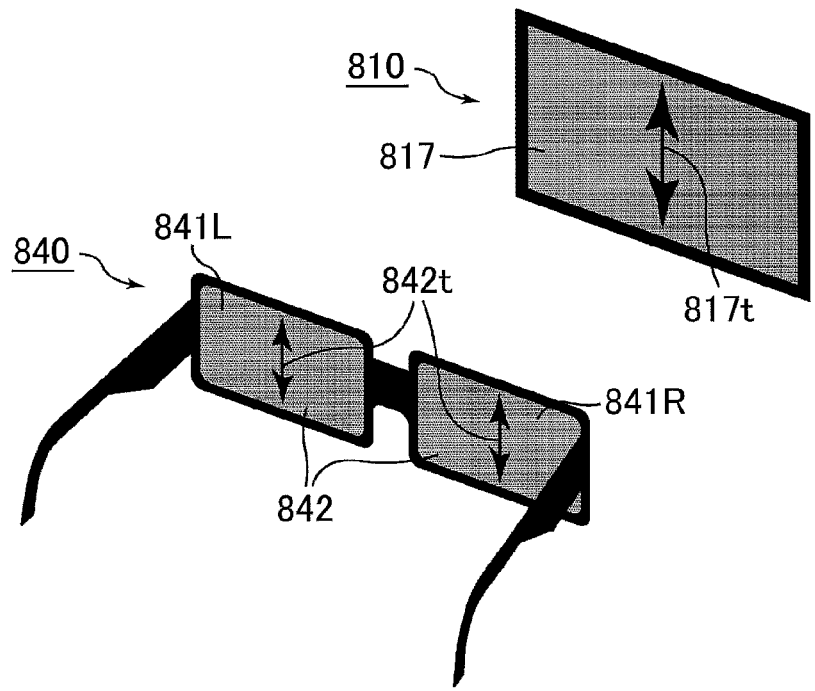
FIG. 26 is a schematic perspective view showing the arrangement relationship of a display device and active shutter glasses of a general three-dimensional image recognition unit.

FIG. 26 is a schematic perspective view showing the arrangement relationship of a display device and active shutter glasses of a general three-dimensional image recognition unit. In a liquid crystal display device for a recent television, a VA mode or an IPS mode is generally used. As shown in FIG. 26, it is designed such that, in a VA mode or an IPS mode, a transmission axis 817t of a linearly polarizing element 817 closer to the observer side than a liquid crystal cell in a liquid crystal display device 810 becomes a longitudinal direction. This is because, even when special treatment, such as new addition of a member, is not made, the observer who puts on the polarized glasses 840 can view the screen without degradation in brightness.

In general, the polarized glasses 840 are designed to absorb a polarized light component which vibrates in the horizontal direction with respect to the reflecting surface and transmit a polarized light component which vibrates in the vertical direction with respect to the reflecting surface. This is because, in general, with the Fresnel effect, an S wave (polarized light which vibrates vertically with respect to the incident surface (the surface orthogonal to the reflecting surface)) is dominant with reflected light intensity, and light which is emitted from a light source (sunlight, a fluorescent lamp, or the like) and reflected by a horizontal surface, such as a bed, a desk, or a water surface, is mostly vibrating in the horizontal direction. Accordingly, as shown in FIG. 26, a linearly polarizing element 842 is provided in each of left and right lenses 841R and 841L of the polarized glasses 840, and a transmission axis 842t of the linearly polarizing element 842 is generally set in the longitudinal direction in a state where the polarized glasses 840 are put on the observer in a general use form. As a result, the observer who puts on the polarized glasses 840 can observe the screen of the liquid crystal display device 810, which is designed such that the transmission axis 817t of the linearly polarizing element 817 becomes the longitudinal direction, without degradation in brightness.

However, when the liquid crystal display device 810 is used as a 3D display device, there is a possibility that brightness is degraded. This is because, when it is designed such that the transmission axis 842t of the linearly polarizing element 842 of the polarized glasses 840 should be arranged along a line connecting 135° azimuth and 315° azimuth, the angle between the transmission axis 817t of the linearly polarizing element 817 in the liquid crystal display device 810 and the transmission axis 842t of the linearly polarizing element 842 of the polarized glasses 840 becomes about 45°, and as a result, a bright three-dimensional image may not be visually recognized.

For example, in the transmission axis 842t of the linearly polarizing element 842 of the polarized glasses 840, if the observer turns the face (the polarized glasses 840), the screen brightness significantly changes. For example, if a scene in which the observer lies on a bed and views the screen is supposed, this unit is not suitable for practical use.

These causes result from the transmittance of two linearly polarizing element superimposed at a relative angle θ being in proportion to the second power of cos θ.

Accordingly, in Embodiment 3, a circularly polarizing plate is used as described below.

Figure 27:
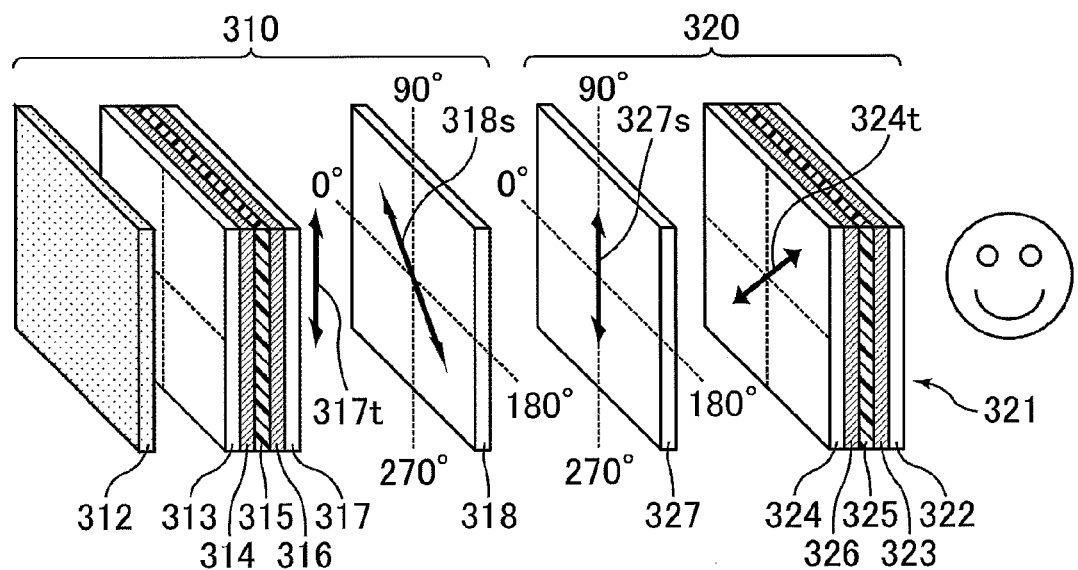
FIG. 27 is a schematic perspective view showing the configuration of a three-dimensional image recognition unit of Embodiment 3.

FIG. 27 is a schematic perspective view showing the configuration of the three-dimensional image recognition unit of Embodiment 3. As shown in FIG. 27, in Embodiment 3, a liquid crystal display device 310 has a front-side polarizing element (linearly polarizing element) 317 and a λ/4 plate 318 on the observation surface side of a liquid crystal cell 315. The λ/4 plate 318 of the liquid crystal display device 310 is attached on the front-side polarizing element 317 at about the relative angle 45° of the axis. Active shutter glasses 320 have a λ/4 plate 327 on the display side of a display-side polarizing element 324. The λ/4 plate 327 is attached on the display-side polarizing element 324 at about the relative angle 45° of the axis. In this way, an optical system including a pair of circularly polarizing plates is introduced in the three-dimensional image recognition unit of Embodiment 3.

Accordingly, light emitted from the liquid crystal cell 315 of the liquid crystal display device 310 first becomes linearly polarized light parallel to the transmission axis 317t of the front-side polarizing element 317, and is changed to circularly polarized light by the λ/4 plate 318. Circularly polarized light is reconverted to linearly polarized light parallel to the transmission axis 324t of the display-side polarizing element 324 by the λ/4 plate 327 of the active shutter glasses 320. Linearly polarized light is incident on the display-side polarizing element 324. In this way, since nonaxial circularly polarized light is incident on the λ/4 plate 327 of the active shutter glasses 320, unlike a case where the λ/4 plates 318 and 327 are not provided, even screen brightness is obtained independently of the relative azimuth of the liquid crystal display device 310 and the active shutter glasses 320. This applies the condition that, if two circularly polarizing plates having the same chirality are superimposed, transmittance becomes constant without depending on the relative angle of the axis.

The configuration of Embodiment 3 will be described in detail. As shown in FIG. 27, the liquid crystal display device 310 is a transmissive liquid crystal display device, and includes a backlight 312, a rear-side polarizing element 313, a viewing angle compensation film 314, a liquid crystal cell 315, a viewing angle compensation film 316, a front-side polarizing element 317, and a λ/4 plate 318 in this order from the rear side toward the observer side. The rear-side polarizing element 313 and the front-side polarizing element 317 are all linearly polarizing elements.

The transmission axes of the rear-side polarizing element 313 and the front-side polarizing element 317 are arranged in a cross-Nichol manner. That is, the angle between the transmission axis 313t of the rear-side polarizing element 313 and the transmission axis 317t of the front-side polarizing element 317 is set to about 90°. However, the arrangement relationship between the transmission axis of the rear-side polarizing element 313 and the transmission axis of the front-side polarizing element 317 may be appropriately set in accordance with the mode of the liquid crystal cell 315, and the transmission axis of the rear-side polarizing element 313 and the transmission axis of the front-side polarizing element 317 may be in a parallel Nichol manner.

The liquid crystal cell 315 of the liquid crystal display device 310 is not particularly limited, and for example, a liquid crystal cell of a display mode, such as a TN mode, an STN mode, an OCB mode, a VA mode, an IPS mode, an FFS mode, or an FLC mode, may be used. The liquid crystal cell 315 includes a pair of transparent substrates, a liquid crystal layer interposed between the pair of substrates, and a transparent electrode formed at least one of the pair of substrates. The drive system of the liquid crystal cell 315 is not particularly limited, and a passive matrix system, a plasma address system, or the like may be used, and of these, a plasma address system is preferably used.

As shown in FIG. 27, each of the left and right lenses 321 of the active shutter glasses 320 includes a λ/4 plate 327, a display-side polarizing element 324, a viewing angle compensation film 326, a liquid crystal cell 323, a viewing angle compensation film 325, and an observer-side polarizing element 322 in this order from the outside. In Embodiment 3, the direction of twist of the liquid crystal molecule group in the liquid crystal cell is not particularly limited, and may be the same or may differ between the right-eye cell and the left-eye cell.

When the angle of the transmission axis 324t of the display-side polarizing element 324 and an in-plane slow axis 327s of the λ/4 plate 327 is defined as φI, and the angle between the transmission axis 317t of the front-side polarizing element 317 and an in-plane slow axis 318s of the λ/4 plate 318 is defined as Expressions (1) and (2) or Expressions (3) and (4) are satisfied.

$$40° \leq \phi I \leq 50° \quad (1)$$

$$40° \leq \phi II \leq 50° \quad (2)$$

$$130° \leq \phi I \leq 140° \quad (3)$$

$$130° \leq \phi II \leq 140° \quad (4)$$

Figure 28:
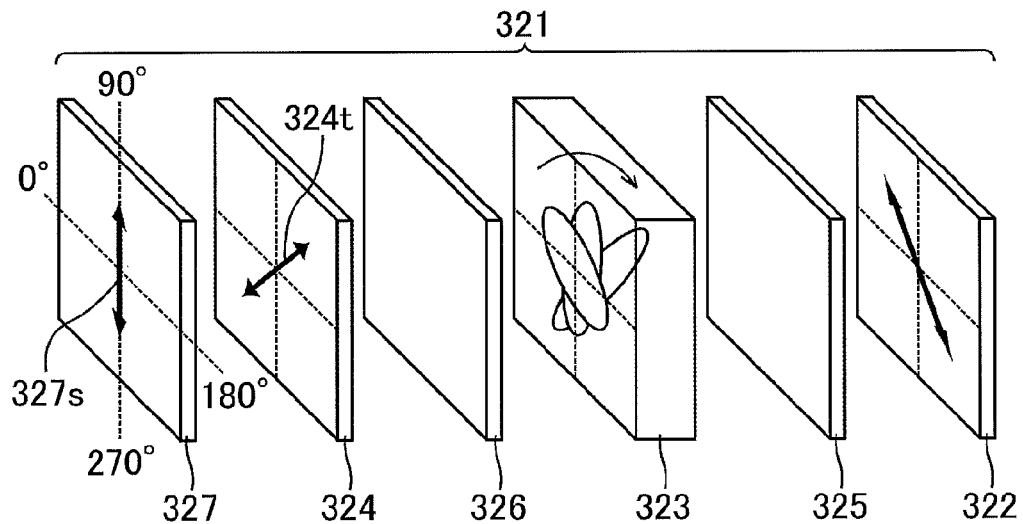
FIG. 28 is a schematic view showing the arrangement relationship of axes in active shutter glasses of Embodiment 3.
Figure 29:
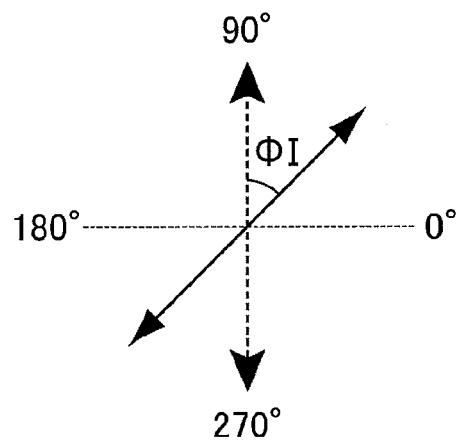
FIG. 29 is a schematic view showing the arrangement relationship of axes in the active shutter glasses of Embodiment 3.
Figure 30:
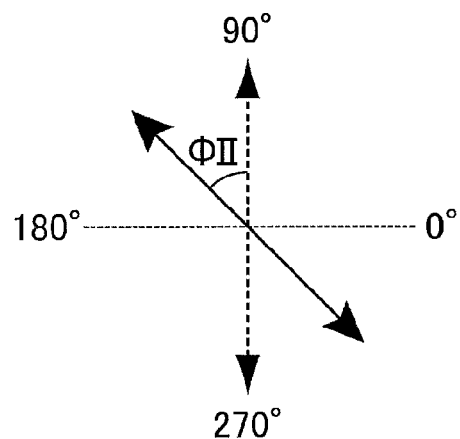
FIG. 30 is a schematic view showing the arrangement relationship of axes in the active shutter glasses of Embodiment 3.

FIG. 28 is a schematic perspective view showing the arrangement relationship of axes in the active shutter glasses of Embodiment 3. FIGS. 29 and 30 is a schematic view showing the arrangement relationship of axes in the active shutter glasses of Embodiment 3. As shown in FIG. 29, φI is measured from the λ/4 plate side (the display side), and is measured with the counterclockwise direction (rotation to the left) as positive based on the direction of the transmission axis of the display-side polarizing element. Similarly, as shown in FIG. 30, φII is measured from the λ/4 plate side (the observer side), and is measured with the counterclockwise direction (rotation to the left) as positive based on the direction of the transmission axis of the front-side polarizing element.

The range of φI is preferably 42°≤φI≤48° or 132°≤φI≤138°, and more preferably, 44°≤φI≤46° or 134°≤φI≤136°. The range of φII is preferably 42°≤φII≤48° or 132°≤φII≤138°, and more preferably, 44°≤φII≤46° or 134°≤φII≤136°.

As described above, according to Embodiment 3, a circularly polarizer (a laminate of the λ/4 plate 327 and the display-side polarizing element 324) is provided in the outermost surface of the active shutter glasses 320 so as to make transmittance constant independently of the polarization azimuth of incident light (circularly polarized light). In order to maximize the transmittance of the active shutter glasses 320, a circular polarizer (a laminate of the λ/4 plate 318 and the display-side polarizing element 324) is also provided in the outermost surface of the liquid crystal display device 310. Thus, the polarization state of light emitted from the liquid crystal display device 310 is optimized to circularly polarized light.

In this way, in Embodiment 3, circularly polarized light is emitted from the liquid crystal display device 310, and circularly polarized light is incident on the active shutter glasses 320. For this reason, even when the linearly polarizing elements 322 and 324 and the liquid crystal cell 323 are arranged in any directions, display is not darkened. That is, a bright three-dimensional image is constantly obtained without causing an increase in power consumption. Even when the observer rotates the head (the active shutter glasses 320), since display is not darkened, a bright three-dimensional image is constantly obtained without causing an increase in power consumption.

In Embodiment 3, a shutter function is obtained by the linearly polarizing element 322, the liquid crystal cell 323, and the linearly polarizing element 324 of the active shutter glasses 320, that is, the active shutter glasses 320 themselves. For this reason, a satisfactory shutter effect is constantly obtained independently of the relative positional relationship between the active shutter glasses 320 and the liquid crystal display device 310.

Each of the right-eye lens and the left-eye lens of the active shutter glasses functions as a liquid crystal shutter. The timing of transmission and blocking of light incident on the right-eye lens and the left-eye lens is alternately switched for every given period. Specifically, as shown in FIG. 2, the timing of switching is synchronized with the R signal and the L signal. Accordingly, since the right-eye image is projected onto the right eye of the observer and the left-eye image is projected onto the left eye, the observer can recognize a three-dimensional image.

Figure 31:
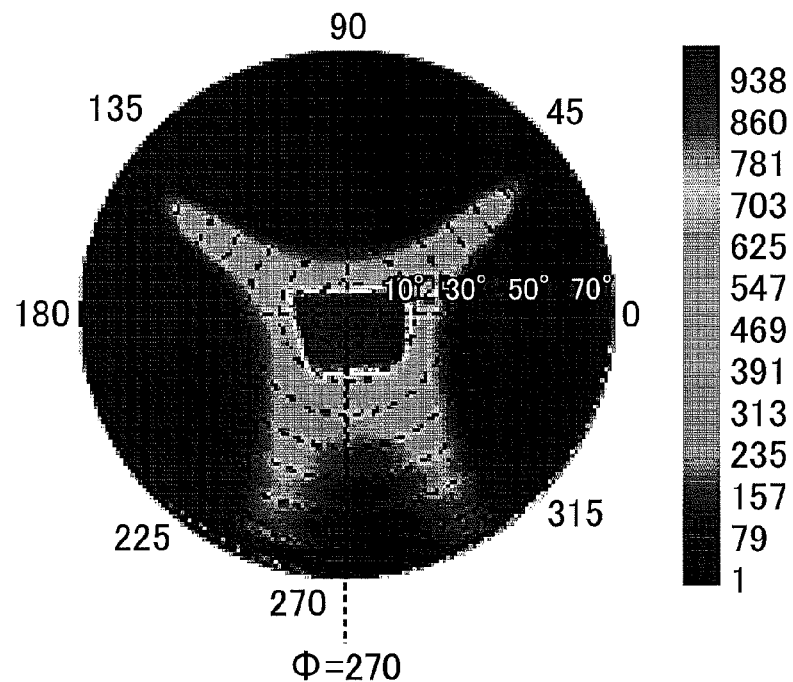
FIG. 31 is a graph showing the result of contrast (CR) characteristics of a TN cell when a TN cell is arranged in a front direction of an image display device, and shows the result of measurement of a right-eye liquid crystal cell.
Figure 32:
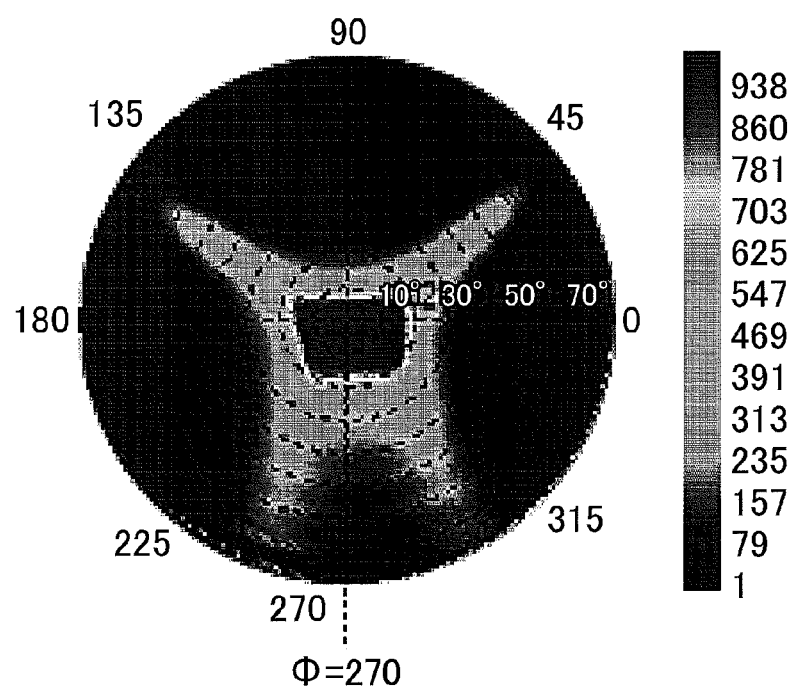
FIG. 32 is a graph showing the result of contrast (CR) characteristics of a TN cell when a TN cell is arranged in a front direction of an image display device, and shows the result of measurement of a left-eye liquid crystal cell.

The visual angle dependency of the active shutter glasses using a TN cell will be described. In a TN cell, the visual angle dependency differs at the respective azimuth angles due to the asymmetry of twist of the liquid crystal alignment. FIGS. 31 and 32 are graphs showing the result of contrast (CR) characteristics of a TN cell when a TN cell is arranged in a front direction of an image display device. FIG. 31 shows the result of measurement of the right-eye liquid crystal cell, and FIG. 32 shows the result of measurement of the left-eye liquid crystal cell.

The contrast ratio is calculated between during no voltage application and during application of 15 V, and is measured in a state where the active shutter glasses are arranged on a TV backlight in the front direction with respect to the surface of the TV backlight.

As shown in FIGS. 31 and 32, when a TN cell is arranged in the front direction with respect to the TV backlight, in both of the right-eye lens and the left-eye lens, a symmetric contrast distribution is formed with a line passing through 90° azimuth and 270° azimuth as an axis. In both of the right-eye lens and the left-eye lens, the position having the maximum contrast ratio is not the center portion in the measurement direction, and is in the direction of the azimuth angle 270° and the polar angle 5°.

Accordingly, in the active shutter glasses of Embodiment 3, the directions of the lens surfaces of the right-eye lens 321R and the left-eye lens 321L are inclined such that, when putting on the active shutter glasses 320, the right-eye lens 321R and the left-eye lens 321L have the optimum contrast characteristics.

Figure 33:
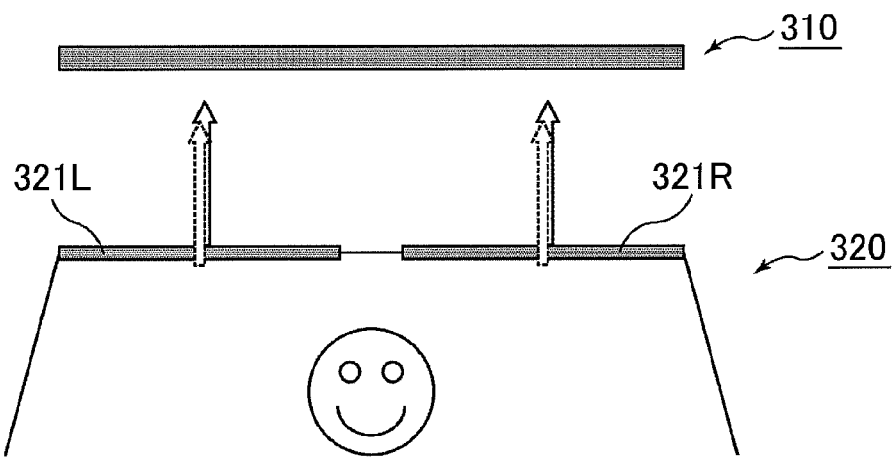
FIG. 33 is a schematic view of a display device and active shutter glasses constituting the three-dimensional image recognition unit of Embodiment 3 when viewed from the above.

FIG. 33 is a schematic view of a display device and active shutter glasses constituting the three-dimensional image recognition unit of Embodiment 3 when viewed from the above. As shown in FIG. 33, an arrangement is made such that the surface of the 3D display device 310 and both lens surfaces of the active shutter glasses 320 are parallel to each other. This is because the direction in which the active shutter glasses 320 have the optimum contrast ratio and the direction orthogonal to the surface of the 3D display device 310 are not consistent with each other. Accordingly, in Embodiment 3, it is not necessary to incline the left and right lens surfaces of the active shutter glasses 320 in the left-right direction.

Figure 34:
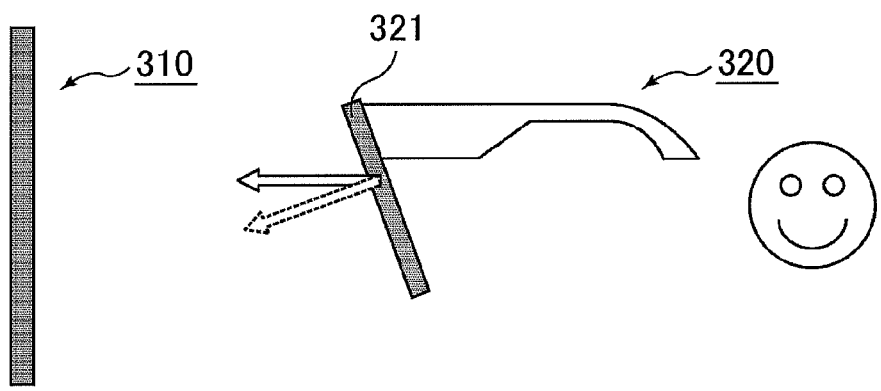
FIG. 34 is a schematic view of the display device and active shutter glasses constituting the three-dimensional image recognition unit of Embodiment 3 when viewed from the side.

FIG. 34 is a schematic view of a display device and active shutter glasses constituting the three-dimensional image recognition unit of Embodiment 3 when viewed from the side. As shown in FIG. 34, the surface of the 3D display device 310 and the lens surfaces 321R and 321L of the active shutter glasses 320 are not parallel each other, and are arranged at an angle. The azimuth and angle of inclination of the right-eye lens 321R and the azimuth and angle of the left-eye lens 321L in the active shutter glasses 320 are set such that a satisfactory contrast ratio is obtained.

A broken-line arrow in FIG. 34 represents the vertical direction of each of the surfaces of the left and right lenses 321R and 321L of the active shutter glasses 320, and a solid-line arrow represents the direction in which each of the left and right lenses of the active shutter glasses 320 has the maximum contrast ratio. Although in Embodiment 3, the liquid crystal cells in the right-eye lens 321R and the left-eye lens 321L of the active shutter glasses 320 are different from each other, the optimum contrast ratio is obtained in the same azimuth on the top and bottom. For this reason, the azimuth of inclination of the right-eye lens 321R and the azimuth of inclination of the left-eye lens 321L in the active shutter glasses 320 are the same.

In this way, according to the active shutter glasses of Embodiment 3, since the inclination of each of the right-eye lens and the left-eye lens is adjusted such that a higher contrast ratio is obtained, it is possible to visually recognize a 3D image with excellent contrast characteristics.

The liquid crystal cell 323 is not particularly limited insofar as it is possible to secure a response speed sufficient to be synchronized with the frame rate of the 3D display device 310. The mode of the liquid crystal cell 323 may be, for example, an STN mode, an OCB mode, a VA mode, an IPS mode, an FFS mode, an FLC mode, or the like, in addition to the TN mode.

In Embodiment 3, a center distribution representing the contrast characteristics is formed widely in the left-right direction (in 0° azimuth and 180° azimuth). Accordingly, the unit of Embodiment 3 is particularly suitable for a display device having a wide display region left and right, such as a TV or a theater screen.

Although in the above description, an example where the right-eye lens is inclined at the azimuth angle 270° at which the right-eye lens and the left-eye lens have the maximum contrast ratio at the polar angle 5°, the right-eye lens may be inclined at any azimuth angle insofar as the azimuth lens is in a range of ±45° with respect to the azimuth angle 270°, that is, in a range of 225 to 315°.

In the above-described example, the direction of the polar angle 5° and the azimuth angle 270° of the right-eye lens is the direction, in which the maximum contrast ratio is obtained, in a specified range.

As the 3D display device 310, a plasma display, an organic or inorganic EL display, a CRT display, a device in which a projector and a screen are combined, or the like may be used, in addition to the liquid crystal display device.

Embodiment 4

A three-dimensional image recognition unit of Embodiment 4 has the same configuration as in Embodiment 1, except that the alignment direction and the optical characteristics of the liquid crystal cell of the active shutter glasses are different. In Embodiment 4, the direction of twist of the liquid crystal molecule group in the right-eye liquid crystal cell and the direction of twist of the liquid crystal molecule group in the left-eye liquid crystal cell are different from each other. Specifically, while the direction of twist of the liquid crystal molecule group in the right-eye liquid crystal cell is the clockwise direction (rotation to the right) when viewed from the observer side, and the direction of twist of the liquid crystal molecule group in the left-eye liquid crystal cell is the counterclockwise direction (rotation to the left).

Figure 35:
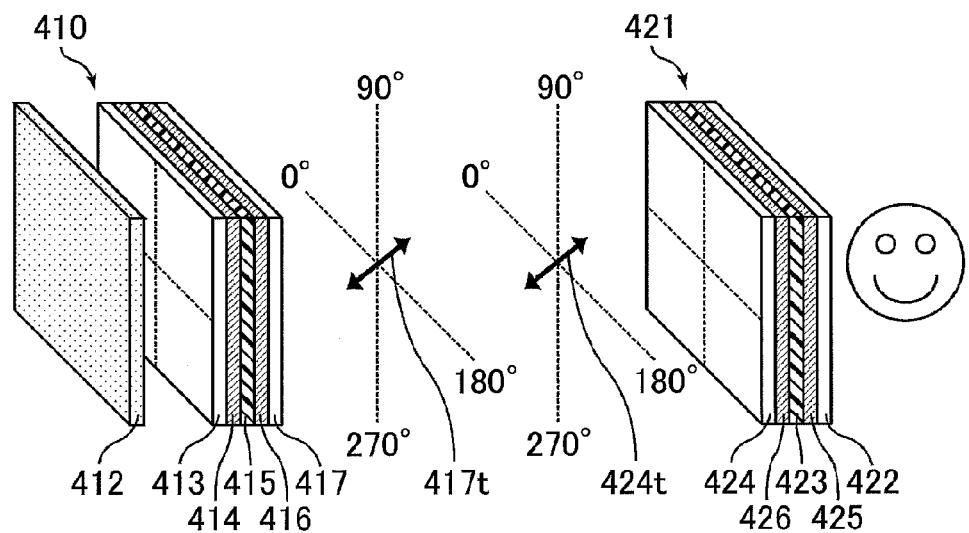
FIG. 35 is a schematic perspective view showing the configuration of a three-dimensional image recognition unit of Embodiment 4.

FIG. 35 is a schematic perspective view showing the configuration of the three-dimensional image recognition unit of Embodiment 4. As shown in FIG. 35, in each of left and right lenses 421 of active shutter glasses in Embodiment 1, an observer-side polarizing element 422, a viewing angle compensation film 425, a liquid crystal cell 423, a viewing angle compensation film 426, and a display-side polarizing element 424 are laminated in this order from the observer side. A 3D display device 410 in Embodiment 1 is a liquid crystal display device, and includes a backlight 412, a rear-side polarizing element 413, a viewing angle compensation film 414, a liquid crystal cell 415, a viewing angle compensation film 416, and a front-side polarizing element 417 in this order toward the observer side. The observer-side polarizing element 422, the display-side polarizing element 424, the rear-side polarizing element 413, and the front-side polarizing element 417 are all linearly polarizing elements.

A double-headed arrow in FIG. 35 represents the transmission axis of the linearly polarizing element. A transmission axis 422t of the observer-side polarizing element 422 and a transmission axis 424t of the display-side polarizing element 424 are in a cross-Nichol relation. Specifically, the cross-Nichol relation means that the angle between the transmission axis 422t of the observer-side polarizing element 422 and the transmission axis 424t of the display-side polarizing element 424 is set in a range of 90°±15° (preferably, ±5°). The transmission axis 422t of the observer-side polarizing element 422 is set in a range of ±15° (preferably, ±5°) from a line passing through 135° azimuth and 315° azimuth, and the transmission axis 424t of the display-side polarizing element 424 is set in a range of ±15° (preferably, ±5°) from a line passing through 135° azimuth and 315° azimuth.

Figure 36:
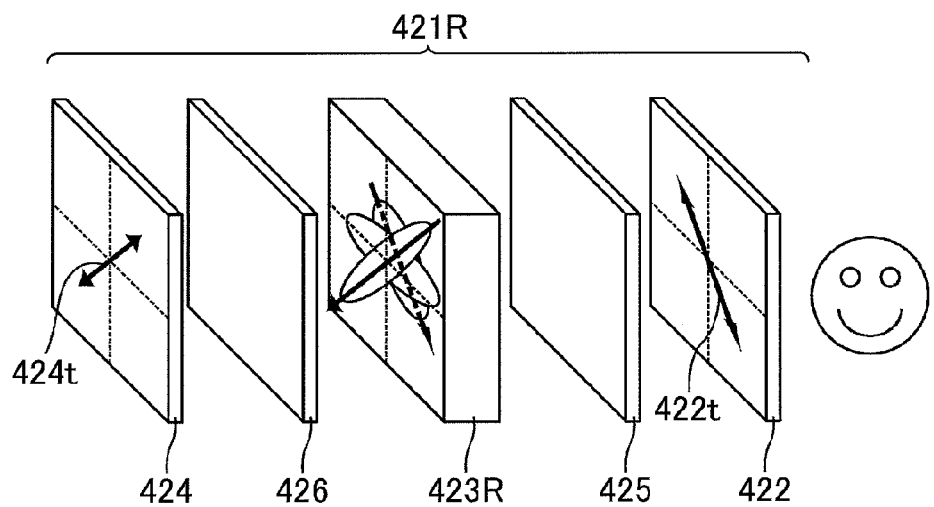
FIG. 36 is an exploded perspective view showing the structure of active shutter glasses of Embodiment 4, and shows the structure of a right-eye lens.
Figure 37:
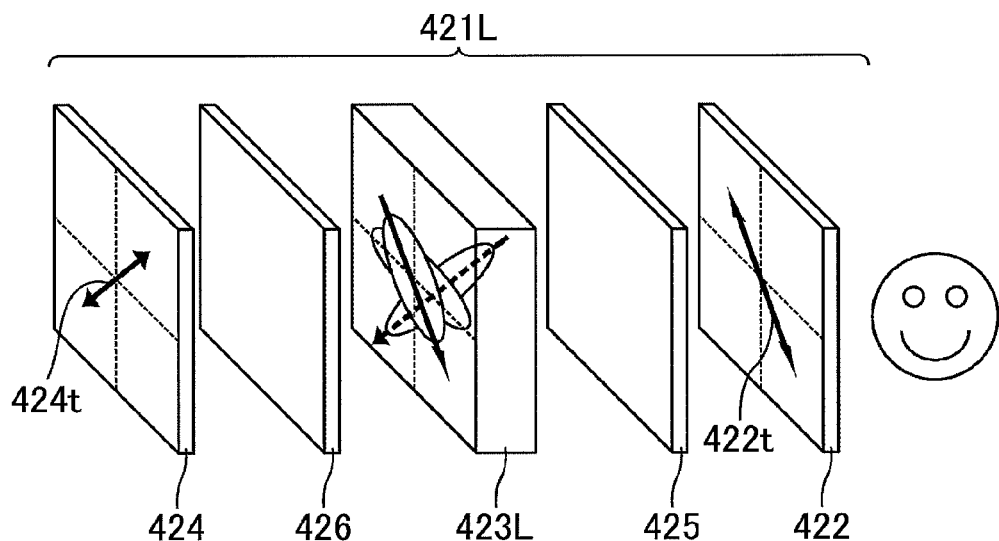
FIG. 37 is an exploded perspective view showing the structure of the active shutter glasses of Embodiment 4, and shows the structure of a left-eye lens.

FIGS. 36 and 37 are exploded perspective views showing the structure of active shutter glasses of Embodiment 4. FIG. 36 shows the structures of the right-eye lens, and FIG. 37 shows the structure of the left-eye lens. The active shutter glasses of Embodiment 4 have a right-eye lens 421R and a left-eye lens 421L. The transmission and blocking (opening and closing) of the right-eye lens 421R and the left-eye lens 421L are alternately switched. As shown in FIG. 2, the timing of switching is synchronized with the R signal and the L signal.

As shown in FIG. 36, the right-eye lens 421R includes an observer-side polarizing element 422, a viewing angle compensation film 425, a liquid crystal cell 423R, a viewing angle compensation film 426, and a display-side polarizing element 424 in this order from the observer side. As shown in FIG. 37, the left-eye lens 421L includes an observer-side polarizing element 422, a viewing angle compensation film 425, a liquid crystal cell 423L, a viewing angle compensation film 426, and a display-side polarizing element 424 in this order from the observer side. The observer-side polarizing element 422 and the display-side polarizing element 424 are all linearly polarizing elements.

A double-headed arrow in FIGS. 36 and 37 represents the transmission axis of the linearly polarizing element. The transmission axis 422t of the observer-side polarizing element 422 and the transmission axis 424t of the display-side polarizing element 424 are in a cross-Nichol relation. Specifically, the cross-Nichol relation means that the angle between the transmission axis 422t of the observer-side polarizing element 422 and the transmission axis 424t of the display-side polarizing element 424 is set in a range of 90°±15° (preferably, ±5°). The transmission axis 422t of the observer-side polarizing element 422 is set in a range of ±15° (preferably, ±5°) from a line passing through 45° azimuth and 225° azimuth, and the transmission axis 424t of the display-side polarizing element 424 is set in a range of ±15° (preferably, ±5°) from a line passing through 135° azimuth and 315° azimuth.

The viewing angle compensation films 425 and 426 have a function of compensating for the viewing angle during light blocking of the lenses 421R and 421L, and for example, a negative C plate, a biaxial film, a multi-view film, or the like may be used. The optical indicatrix of a negative C plate has a disc shape, and the negative C plate satisfies the relationship of nx≅ny>nz. The viewing angle compensation films 425 and 426 may not be arranged, and may be removed as necessary.

The right-eye liquid crystal cell 423R and the left-eye liquid crystal cell 423L are TN cells, and each includes a pair of substrates and a liquid crystal layer interposed between the pair of substrates. The pair of substrates respective include transparent electrodes. The liquid crystal layer includes nematic liquid crystal molecules having positive anisotropy of dielectric constant. In Embodiment 4, during no voltage application, the liquid crystal molecule group is aligned in the alignment treatment direction near the surfaces of the pair of substrates, and is aligned so as to be twisted at about 90° in the thickness direction of the liquid crystal layer. When each of the liquid crystal cells 423R and 423L is an STN cell, the liquid crystal molecule group is aligned so as to be tilted at about 270° in the thickness direction of the liquid crystal layer.

The direction of twist of the liquid crystal molecule group differs between the right-eye liquid crystal cell 423R and the left-eye liquid crystal cell 423L when the liquid crystal cells 423 are viewed from the observer side. While the direction of twist of the liquid crystal molecule group in the right-eye liquid crystal cell 423R is the clockwise direction (rotation to the right) when viewed from the observer side, the direction of twist of the liquid crystal molecule group in the left-eye liquid crystal cell 423L is the counterclockwise direction (rotation to the left) when viewed from the observer side.

A single-headed arrow in FIGS. 36 and 37 represents the alignment treatment (for example, rubbing) direction. The alignment treatment direction for the liquid crystal cell differs between the right-eye liquid crystal cell 423R and the left-eye liquid crystal cell 423L. In the right-eye liquid crystal cell 423R, the alignment treatment direction for the display-side substrate is from 45° azimuth to 225° azimuth when viewed from the observer side, and the alignment treatment direction for the observer-side substrate is from 135° azimuth and 315° azimuth when viewed from the observer side. In the left-eye liquid crystal cell 423L, the alignment treatment direction for the display-side substrate is from 135° azimuth to 315° azimuth when viewed from the observer side, and the alignment treatment direction for the observer-side substrate is from 45° azimuth to 225° azimuth when viewed from the observer side.

Accordingly, the alignment azimuth of the liquid crystal molecule (center molecule) at the center in the thickness direction of the liquid crystal cell 423 differs. In the right-eye liquid crystal cell 423R, the center molecules are aligned along a line passing through 0° azimuth and 180° azimuth when viewed from the observer side, and the azimuth angle is 180°. In the left-eye liquid crystal cell 423L, the center molecules are aligned along a line passing through 0° azimuth and 180° azimuth when viewed from the observer side, and the azimuth angle is 0°. That is, the alignment azimuth of the center molecules of the right-eye liquid crystal cell 423R and the alignment azimuth of the center molecules of the left-eye liquid crystal cell 423L are substantially symmetrical based on the symmetric surface which bisects the active shutter glasses on the left and right. The liquid crystal alignment in the right-eye liquid crystal cell 423R and the liquid crystal alignment in the left-eye liquid crystal cell 423L have symmetric twist based on the symmetric surface which bisects the active shutter glasses 420 on the left and right.

In this way, when comparing the right-eye lens 421R and the left-eye lens 421L, while the right-eye lens 421R and the left-eye lens 421L are different from each other from the viewpoint of the alignment of the liquid crystal molecules, that is, the optical characteristics, other portions are common, and as the arrangement configuration of members constituting the right-eye lens 421R and the left-eye lens 421L, a substantially symmetric structure based on a symmetric surface which bisects the active shutter glasses on the left and right is made.

Figure 38:
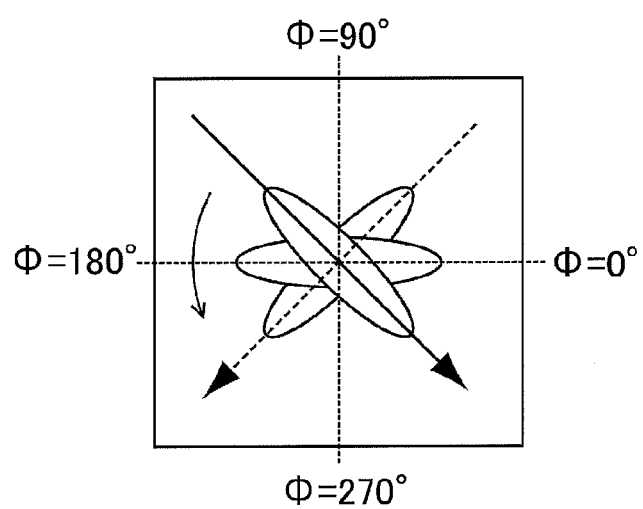
FIG. 38 is a schematic view showing the relationship between an alignment treatment direction and an alignment direction of liquid crystal molecules in the active shutter glasses of Embodiment 4, and shows a right-eye lens.
Figure 39:
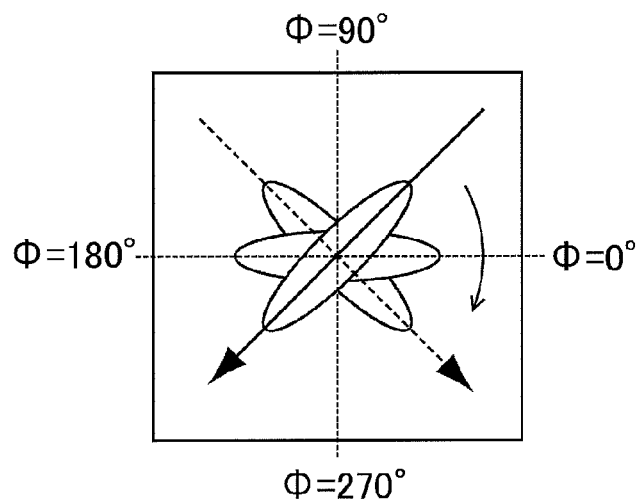
FIG. 39 is a schematic view showing the relationship between an alignment treatment direction and an alignment direction of liquid crystal molecules in the active shutter glasses of Embodiment 4, and shows a left-eye lens.

FIGS. 38 and 39 are schematic views showing the relationship between an alignment treatment direction and an alignment direction of liquid crystal molecules in the active shutter glasses of Embodiment 4. FIG. 38 shows the right-eye lens, and FIG. 39 shows the left-eye lens. FIGS. 38 and 39 are plan views in a state where no voltage is applied, and show a state when a liquid crystal cell is viewed from the observer side.

As shown in FIGS. 38 and 39, the liquid crystal molecule group is twisted at 90° when the liquid crystal cell is viewed in front view. This is because alignment treatment is performed each of a pair of substrates, and the alignment treatment directions for the substrates are orthogonal to each other.

As shown in FIG. 38, in the right-eye lens, the direction (broken-line arrow) of rubbing of the display-side substrate is from 45° azimuth to 225° azimuth, and the direction (solid-line arrow) of rubbing of the observer-side substrate is from 135° azimuth to 315° azimuth. As shown in FIG. 39, in the left-eye lens, the direction (broken-line arrow) of rubbing of the display-side substrate is from 135° azimuth to 315° azimuth, and the direction (solid-line arrow) of rubbing of the observer-side substrate is from 45° azimuth to 225° azimuth.

In the right-eye lens, the liquid crystal molecule (center molecule) at the center in the thickness direction of the liquid crystal cell are aligned in a direction indicated by a dotted line of FIG. 38, that is, along a line passing through 0° azimuth and 180° azimuth. In the left-eye lens, the liquid crystal molecule (center molecule) at the center in the thickness direction of the liquid crystal cell are aligned in a direction indicated by a dotted line of FIG. 39, that is, along a line passing through 0° azimuth and 180° azimuth.

The azimuth angle of the liquid crystal molecule (center molecule) at the center in the thickness direction of the liquid crystal cell in the right-eye lens is 0°, and the azimuth angle of the liquid crystal molecule (center molecule) at the center in the thickness direction of the liquid crystal cell in the right-eye lens is 180°.

In this way, while the direction of twist of the liquid crystal molecule group is the same in the right-eye liquid crystal cell 423R and the left-eye liquid crystal cell 423L, since the alignment treatment direction which defines the direction of the initial alignment differs, the right-eye liquid crystal cell 423R and the left-eye liquid crystal cell 423L have different optical characteristics.

Accordingly, in the active shutter glasses of Embodiment 4, the directions of the lens surfaces of the right-eye lens 421R and the left-eye lens 421L are inclined such that, when putting on the active shutter glasses 420, the right-eye lens 421R and the left-eye lens 421L have the optimum contrast characteristics.

Figure 40:
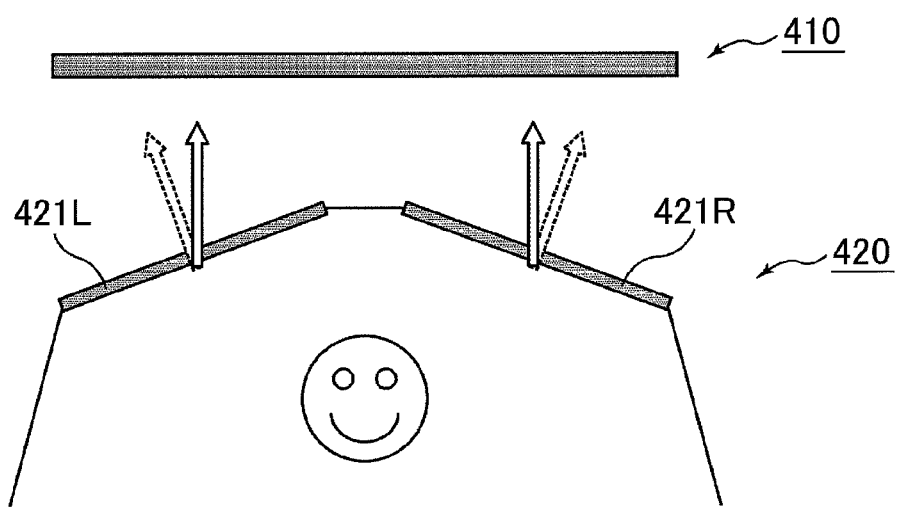
FIG. 40 is a schematic view of a display device and active shutter glasses constituting the three-dimensional image recognition unit of Embodiment 4 when viewed from the above.

FIG. 40 is a schematic view of a display device and active shutter glasses constituting the three-dimensional image recognition unit of Embodiment 4 when viewed from the above. As shown in FIG. 40, the surface of the 3D display device 410 and each of the left and right lens surfaces 421R and 421L of the active shutter glasses 420 are not parallel to each other, and are arranged at an angle. Both of the right-eye lens 421R and the left-eye lens 421L have an inclination with respect to a state where the lenses 421R and 421L are arranged on the same plane. The direction and angle of inclination of the right-eye lens 421R and the direction and angle of inclination of the left-eye lens 421L are set such that a more satisfactory contrast ratio is obtained. That is, inclination is made at the azimuth angle of the center molecules in each of the left and right liquid crystal cells such that the outer edge of the lens approaches the observer side. This is because the contrast characteristics are determined by the liquid crystal cells in the right-eye lens 421R and the left-eye lens 421L, and the type of the image display device 410 is not particularly limited.

A broken-line arrow in FIG. 40 represents the vertical direction of each of the left and right lens surfaces 421R and 421L of the active shutter glasses 420, and a solid-line arrow represents the direction in which each of the left and right lenses 421R and 421L of the active shutter glasses 420 has the maximum contrast ratio. In Embodiment 4, the liquid crystal cells in the right-eye lens 421R and the left-eye lens 421L of the active shutter glasses 420 are different from each other, and have the optimum contrast ratio indifferent left and right azimuths. For this reason, the azimuth of inclination of the right-eye lens 421R and the azimuth of inclination of the left-eye lens 421L in the active shutter glasses 420 are different from each other.

Specifically, as shown in FIG. 40, the right-eye lens 421R is inclined in 0° azimuth, that is, such that the right side of the right-eye lens 421R approaches the observer side. The left-eye lens 421L is inclined in 180° azimuth, that is, such that the left side of the left-eye lens 421L approaches the observer side.

Figure 41:
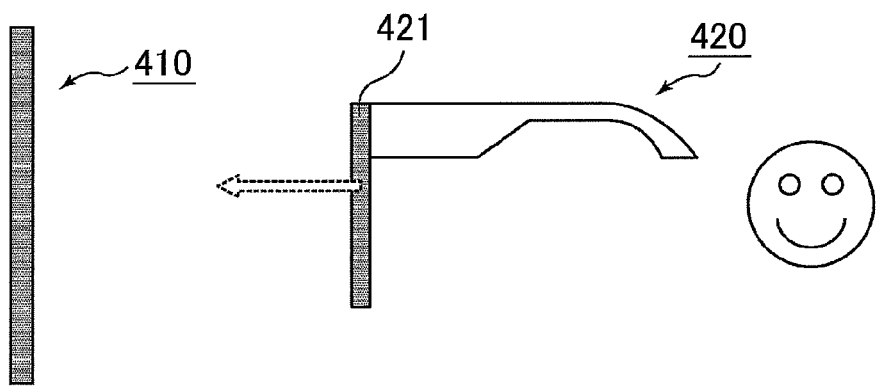
FIG. 41 is a schematic view of the display device and the active shutter glasses constituting the three-dimensional image recognition unit of Embodiment 4 when viewed from the side.
Figure 42:
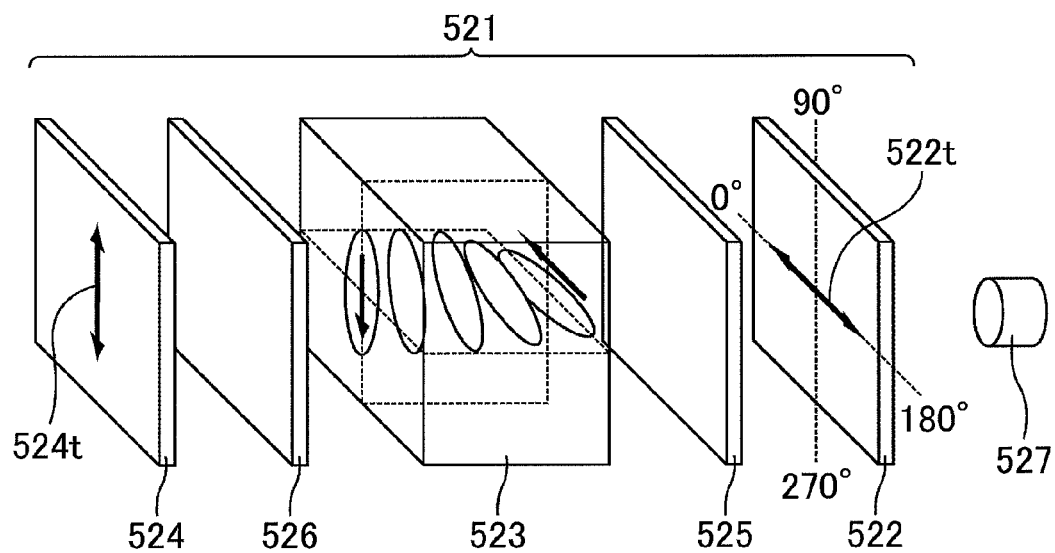
FIG. 42 is a schematic perspective view showing a mode in which the display characteristics of active shutter glasses of the related art are verified.
Figure 43:
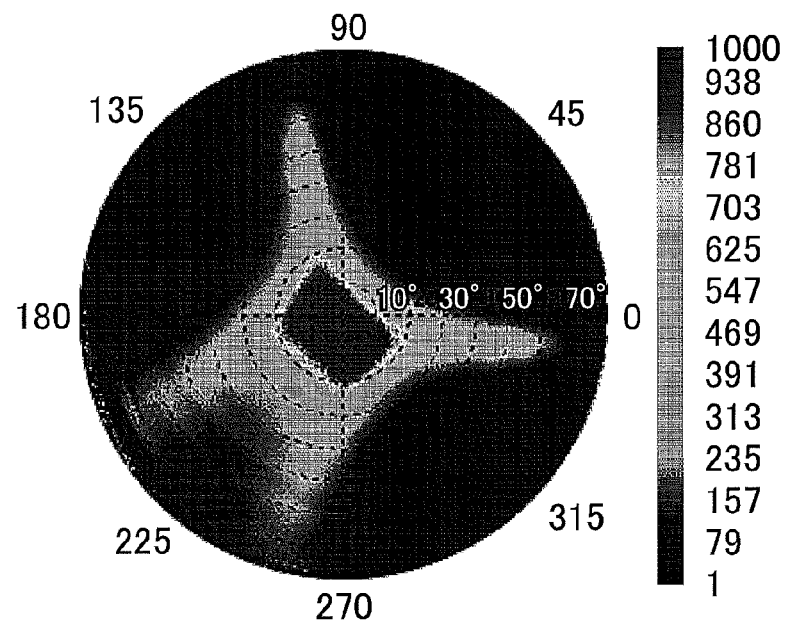
FIG. 43 is a graph showing the result of the contrast characteristics by the measurement method shown in FIG. 42 when the image display device is viewed through the lenses of the active shutter glasses of the related art.
Figure 44:
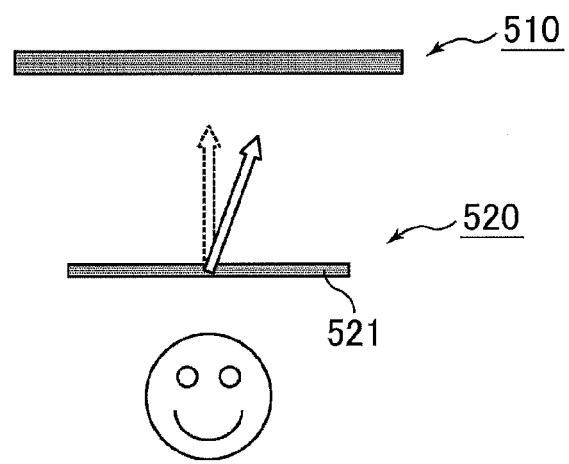
FIG. 44 is a schematic view of a display device and active shutter glasses constituting the three-dimensional image recognition unit of the related art when viewed from the above.

FIG. 41 is a schematic view of a display device and active shutter glasses constituting the three-dimensional image recognition unit of Embodiment 4 when viewed from the side. As shown in FIG. 41, an arrangement is made such that the surface of the 3D display device 410 and both lens surfaces of the active shutter glasses 420 are parallel to each other. This is because the direction in which the active shutter glasses 420 have the optimum contrast ratio and the direction orthogonal to the surface of the 3D display device 410 are not consistent with each other. Accordingly, in Embodiment 4, it is not necessary to incline both lens surfaces of the active shutter glasses 420 in the up-down direction.

In this way, according to the active shutter glasses of Embodiment 4, the right-eye lens and the left-eye lens are adjusted such that a higher contrast ratio is obtained, thereby obtaining 3D display with excellent contrast characteristics.

The liquid crystal cells 423R and 423L are not particularly limited insofar as it is possible to secure a response speed sufficient to be synchronized with the frame rate of the 3D display device 410. The mode of the liquid crystal cell 423 may be, for example, an STN mode, an OCB mode, a VA mode, an IPS mode, an FFS mode, an FLC mode, or the like, in addition to the TN mode.

Although in the above description, an example where the right-eye lens is inclined at the azimuth angle 0°, the right-eye lens may be inclined at any azimuth angle insofar as the azimuth angle is in a range of ±45° with respect to the azimuth angle 0°, that is, in a range of 0 to 45° and 315 to 360°. Although an example where the left-eye lens is inclined at the azimuth angle 180°, the left-eye lens may be inclined at any azimuth angle insofar as the azimuth angle is in a range of ±45° with respect to the azimuth angle 180°, that is, in a range of 135 to 225°.

As the 3D display device 410, a plasma display, an organic or inorganic EL display, a CRT display, a device in which a projector and a screen are combined, or the like may be used, in addition to the liquid crystal display device.

Hereinafter, the common constituent members in Embodiments 1 to 4 will be described in detail.

As a linearly polarizing element, a polarizing element in which an anisotropic material, such as a dichroic iodine complex, is absorbed and aligned into a polyvinyl alcohol (PVA) film may be used. In order to secure mechanical strength or moisture and heat resistance, it is preferable that a protective film, such as a triacetylcellulose (TAC) film, is laminated on both sides of a PVA film.

A material for a birefringent layer, such as a λ/4 plate, is not particularly limited, and for example, a stretched polymer film may be used. Examples of the polymer include polycarbonate, polysulfone, polyethersulfone, polyethylene telephthalate, polyethylene, polyvinyl alcohol, norbornene, triacetylcellulose, diacetylcellulose, and the like.

A method of forming a λ/4 plate is not particularly limited, and a λ/4 plate may be laminated on a linearly polarizing element such that the slow axis has a predetermined angle with respect to the transmission axis of the linearly polarizing element. Accordingly, it is preferable that the λ/4 plate is formed using an oblique stretching method which allows stretch alignment in an oblique direction with respect to the flow direction of a roll film.

It is preferable that no birefringent layer is provided between the λ/4 plate and the linearly polarizing element. Accordingly, it is possible to more easily convert the polarization state of linearly polarized light to a desired state. That is, it is preferable that the λ/4 plate is in contact with the linearly polarizing element, or a film arranged between the λ/4 plate and the linearly polarizing element is an isotropic film. Even when a birefringent layer is provided between the λ/4 plate and the linearly polarizing element, the slow axis of the birefringent layer is set in a direction substantially parallel to or orthogonal to the transmission axis of the linearly polarizing element, whereby the polarization conversion function by the birefringent layer can be substantially invalidated, and the same effects as when a birefringent layer is not provided between the λ/4 plate and the linearly polarizing element can be obtained.

The birefringent layer is a layer having optical anisotropy, and the birefringent layer means that one of the absolute value of an in-plane phase difference R and the absolute value of a thickness-direction phase difference Rth is equal to or greater than 10 nm, and preferably, is equal to or greater than 20 nm.

An isotropic film means that both of the absolute value of the in-plane phase difference R and the absolute value of the thickness-direction phase difference Rth are equal to or smaller than 10 nm, and preferably, are equal to or smaller than 5 nm.

Hereinafter, a preferred form common to Embodiments 1 to 3 will be described.

It is preferable that the amount of light leakage in 270° azimuth is smaller than the amount of light leakage in 90° azimuth. Accordingly, the viewing angles of the left and right lenses can be set in accordance with the effective field of view of a person, thereby realizing more excellent display quality.

It is preferable that, when the transmittance when the right-eye lens is in the light blocking state is measured at multiple azimuth angles selected from integers equal to or greater than 8 evenly divided in the omniazimuth (360°) at a predetermined polar angle, the average of transmittance (the amount of light leakage) in −45° to 45° azimuth and/or 135° to 225° azimuth (more preferably, in −45° to 45° azimuth and 135° to 225° azimuth) is smaller than the average of transmittance (the amount of light leakage) in 45° to 135° azimuth and 225° to 315° azimuth.

It is preferable that, when the transmittance when the left-eye lens is in the light blocking state is measured at multiple azimuth angles selected from integers equal to or greater than 8 evenly divided in the omniazimuth (360°) at a predetermined polar angle, the average of transmittance (the amount of light leakage) in −45° to 45° azimuth and/or 135° to 225° azimuth (more preferably, in −45° to 45° azimuth and 135° to 225° azimuth) is smaller than the average of transmittance (the amount of light leakage) in 45° to 135° azimuth and 225° to 315° azimuth.

Accordingly, a clean three-dimensional image with little double image can be visually recognized over the entire screen.

In these forms, it is preferable that the average of the amount of light leakage in 225° to 315° azimuth is smaller than the average of the amount of light leakage in 45° to 135° azimuth. Accordingly, the viewing angles of the left and right lenses can be set in accordance with the effective field of view of a person, thereby realizing more excellent display quality.

It is preferable that, when the contrast ratio of the right-eye lens is measured at multiple azimuth angles selected from integers equal to greater than 4 evenly divided in the omniazimuth (360°) at a predetermined polar angle, the contrast ratio in 0° azimuth and 180° azimuth is higher than the average of the contrast ratios at multiple azimuth angles selected from the integers equal to or greater than 4, and the contrast ratio in 90° azimuth and/or 270° azimuth (more preferably, in 90° azimuth and 270° azimuth) is lower than the average of the contrast ratios at multiple azimuth angles selected from the integers equal to or greater than 4.

It is preferable that, when the contrast ratio of the left-eye lens is measured at multiple azimuth angles selected from integers equal to or greater than 4 evenly divided in the omniazimuth (360°) at a predetermined polar angle, the contrast ratio in 0° azimuth and 180° azimuth is higher than the average of the contrast ratios at multiple azimuth angles selected from the integers equal to or greater than 4, and the contrast ratio in 90° azimuth and/or 270° azimuth (more preferably, in 90° azimuth and 270° azimuth) is lower than the average of the contrast ratios at multiple azimuth angles selected from the integers equal to or greater than 4.

Accordingly, a clean three-dimensional image with little double image can be visually recognized over the entire screen.

In these forms, it is preferable that the contrast ratio in 270° azimuth is higher than the contrast ratio in 90° azimuth. Accordingly, the viewing angles of the left and right lenses can be set in accordance with the effective field of view of a person, thereby realizing more excellent display quality.

It is preferable that, when the contrast ratio of the right-eye lens is measured at multiple azimuth angles selected from integers equal to or greater than 8 evenly divided in the omniazimuth (360°) at a predetermined polar angle, the average of the contrast ratios in −45° to 45° azimuth and/or 135° to 225° azimuth (more preferably, in −45° to 45° azimuth and 135° to 225° azimuth) is higher than the average of the contrast ratios in 45° to 135° azimuth and 225° to 315° azimuth.

It is preferable that, when the contrast ratio of the left-eye lens is measured at multiple azimuth angles selected from integers equal to or greater than 8 evenly divided in the omniazimuth (360°) at a predetermined polar angle, the average of the contrast ratios in −45° to 45° azimuth and/or 135° to 225° azimuth (more preferably, in −45° to 45° azimuth and 135° to 225° azimuth) is higher than the average of the contrast ratios in 45° to 135° azimuth and 225° to 315° azimuth.

Accordingly, a clean three-dimensional image with little double image can be visually recognized over the entire screen.

In these forms, it is preferable that the average of the contrast ratios in 225° to 315° azimuth is higher than the average of the contrast ratios in 45° to 135° azimuth. Accordingly, the viewing angles of the left and right lenses can be set in accordance with the effective field of view of a person, thereby realizing more excellent display quality.

It is preferable that, when change in tinge when the right-eye lens is practically driven is measured at multiple azimuth angles selected from integers equal to or greater than 4 evenly divided in the omniazimuth (360°) at a predetermined polar angle, change in tinge in 0° azimuth and 180° azimuth is smaller than the average of changes in tinge at multiple azimuth angles selected from the integers equal to or greater than 4, and change in tinge in 90° azimuth and/or 270° azimuth (more preferably, in 90° azimuth and 270° azimuth) is greater than the average of changes in tinge at multiple azimuth angles selected from the integers equal to or greater than 4.

It is preferable that, when change in tinge when the left-eye lens is practically driven is measured at multiple azimuth angles selected from integers equal to or greater than 4 evenly divided in the omniazimuth (360°) at a predetermined polar angle, change in tinge in 0° azimuth and 180° azimuth is smaller than the average of changes in tinge at multiple azimuth angles selected from the integers equal to or greater than 4, and change in tinge in 90° azimuth and/or 270° azimuth (more preferably, in 90° azimuth and 270° azimuth) is greater than the average of changes in tinge at multiple azimuth angles selected from the integers equal to or greater than 4.

Accordingly, a clean three-dimensional image with little change in tinge can be visually recognized over the entire screen.

In these forms, it is preferable that change in tinge in 270° is smaller than change in tinge in 90° azimuth. Accordingly, the viewing angles of the left and right lenses can be set in accordance with the effective field of view of a person, thereby realizing more excellent display quality.

It is preferable that, when change in tinge when the right-eye lens is practically driven is measured at multiple azimuth angles selected from integers equal to or greater than 8 evenly divided in the omniazimuth (360°) at a predetermined polar angle, the average of changes in tinge in −45° to 45° azimuth and/or 135° to 225° azimuth (more preferably, in −45° to 45° azimuth and 135° to 225° azimuth) is smaller than the average of changes in tinge in 45° to 135° azimuth and 225° to 315° azimuth.

It is preferable that, when change in tinge when the left-eye lens is practically driven is measured at multiple azimuth angles selected from integers equal to or greater than 8 evenly divided in the omniazimuth (360°) at a predetermined polar angle, the average of changes in tinge in −45° to 45° azimuth and/or 135° to 225° azimuth (more specifically, in −45° to 45° azimuth and 135° to 225° azimuth) is smaller than the average of changes in tinge in 45° to 135° azimuth and 225° to 315° azimuth.

Accordingly, a clean three-dimensional image with little change in tinge can be visually recognized over the entire screen.

In these forms, it is preferable that the average of changes in tinge in 225° to 315° azimuth is smaller than the average of changes in tinge in 45° to 135° azimuth. Accordingly, the viewing angles of the left and right lenses can be set in accordance with the effective field of view of a person, thereby realizing more excellent display quality.

The four or more azimuths are preferably eight or more azimuths, and the eight or more azimuths are more preferably 12 or more azimuths, and still more preferably, 24 or more azimuths.

The predetermined polar angle is not particularly limited, is normally determined in a range greater than 0° and smaller than 90°, and preferably, in a range of 5° to 45° (more preferably, 8° to 30°, and still more preferably, 2° to 17°).

When the liquid crystal mode of the liquid crystal cell is a TN mode or an STN mode, the center molecules may be aligned in the transverse direction. Accordingly, a clean three-dimensional image with little change in tinge can be visually recognized over the entire screen.

Although the alignment direction of the center molecules is not exactly consistent with the transverse direction, the angle between these directions is preferably equal to or smaller than 15°, and more preferably equal to or smaller than 5°.

As the display characteristics which can be evaluated in the invention, the following characteristics are exemplified.

Light leakage when the shutter unit is in the light blocking state

Change in tinge when the shutter unit is the light transmitting state

Transmittance characteristic when the shutter unit is in the light transmitting state CR ratio between the light transmitting state and the light blocking state of the shutter unit Change in tinge when the shutter unit is practically driven Transmittance when the shutter unit is practically driven Crosstalk amount when the shutter unit is practically driven As the change in tinge, specifically, for example, a color difference, such as $\Delta u'v'$ or $\Delta C^*ab$, is used. $\Delta u'v'$ is calculated from change in coordinates ($=((u'-u'_0)^2+(v'-v'_0)^2)^{0.5}$) in the chromaticity diagram based on the 1976 CIE UCS color specification system. $\Delta C^*ab$ is calculated from change in coordinates ($=((\Delta a^*)^2+(\Delta b^*)^2)^{0.5}$) in the chromaticity diagram based on the L*a*b* color specification system.

In particular, when evaluating a unit in which eight-eye and left-eye image are displayed in a time division manner and a three-dimensional image is visually recognized, it is preferable to evaluate the display characteristics in a state where the active shutter glasses are practically driven.

Hereinafter, an embodiment in which respective characteristics are optimized will be described on the basis of the result of practical measurement.

Embodiment 5

Each lens of the active shutter glasses in the three-dimensional image recognition unit of Embodiment 5 has the same configuration as the left-eye lens in Embodiment 1. That is, in Embodiment 5, each lens has the same optical characteristics as the left-eye lens in the active shutter glasses of Embodiment 1.

That is, in both of the left and right lenses of the active shutter glasses in Embodiment 5, an observer-side polarizing element, a viewing angle compensation film, a liquid crystal cell, a viewing angle compensation film, and a display-side polarizing element are laminated in this order from the observer side.

The liquid crystal cell is a TN cell, and includes a pair of substrates and a liquid crystal layer interposed between the pair of substrates. The pair of substrates respective include transparent electrodes. The liquid crystal layer includes nematic liquid crystal molecules having positive anisotropy of dielectric constant. In Embodiment 5, during no voltage application, the liquid crystal molecule group is aligned in the alignment treatment direction near the surfaces of the pair of substrates, and is aligned so as to be twisted at about 90° in the thickness direction of the liquid crystal layer.

In regard to the alignment treatment direction for the liquid crystal cell, the alignment treatment direction for the display-side substrate is from 90° azimuth to 270° azimuth when viewed from the observer side, and the alignment treatment direction for the observer-side substrate is from 180° azimuth to 0° azimuth when viewed from the observer side.

Meanwhile, the direction of inclination of each lens surface in Embodiment 5 differs from the direction of the left-eye lens in Embodiment 1.

Table 1 shows the result of measurement of the amount (transmittance) of light leakage during light blocking of the left and right lenses of the active shutter glasses of Embodiment 5. The transmittance was measured in a state where the active shutter glasses are arranged on a TV backlight with a diffuser in the front direction with respect to the surface of the TV backlight.

TABLE 1

| | | Transmittance (%) during light blocking (%) Polar angle (°) | | | |
|---|---|---|---|---|---|
| | | 0 | 5 | 10 | 15 |
| | Omniazimuth average | 1.39 | 2.20 | 3.65 | 6.37 |
| Azimuth angle (°) | 0 | 1.39 | 2.21 | 3.68 | 5.51 |
| | 15 | 1.39 | 2.05 | 4.46 | 8.45 |
| | 30 | 1.39 | 2.21 | 5.31 | 11.70 |
| | 45 | 1.39 | 2.33 | 6.03 | 12.83 |
| | 60 | 1.39 | 2.27 | 5.27 | 11.97 |
| | 75 | 1.39 | 2.37 | 4.24 | 8.55 |
| | 90 | 1.39 | 1.61 | 3.00 | 5.11 |
| | 105 | 1.39 | 1.85 | 2.76 | 3.36 |
| | 120 | 1.39 | 1.79 | 2.39 | 3.40 |
| | 135 | 1.39 | 1.73 | 2.35 | 4.14 |
| | 150 | 1.39 | 1.85 | 2.84 | 5.29 |
| | 165 | 1.39 | 1.99 | 3.36 | 5.49 |
| | 180 | 1.39 | 2.61 | 3.20 | 6.01 |
| | 195 | 1.39 | 2.41 | 4.14 | 6.74 |
| | 210 | 1.39 | 2.88 | 4.73 | 7.14 |

TABLE 1-continued

| | Transmittance (%) during light blocking (%) Polar angle (°) | | | |
|---|---|---|---|---|
| | 0 | 5 | 10 | 15 |
| 225 | 1.39 | 2.51 | 4.91 | 7.88 |
| 240 | 1.39 | 2.82 | 4.40 | 7.52 |
| 255 | 1.39 | 2.61 | 4.26 | 6.64 |
| 270 | 1.39 | 2.49 | 4.04 | 5.71 |
| 285 | 1.39 | 2.23 | 3.12 | 4.57 |
| 300 | 1.39 | 1.61 | 2.17 | 4.04 |
| 315 | 1.39 | 2.31 | 2.33 | 3.68 |
| 330 | 1.39 | 1.95 | 1.91 | 3.34 |
| 345 | 1.39 | 2.05 | 2.65 | 3.80 |

As a result, for example, change in transmittance with respect to transmittance in the front direction at each azimuth angle in the direction of the polar angle 5° is smallest in 90° azimuth and 300° azimuth. For this reason, in the active shutter glasses of Embodiment 4, inclination at the polar angle 5° is made at any azimuth angle in a range of ±45° with respect to the azimuth angle 90°, that is, in a range of 45 to 135°, or inclination at the polar angle 5° is made at any azimuth angle in a range of ±45° with respect to the azimuth angle 300°, that is, in a range of 255 to 345°.

The direction of the polar angle 5° and the azimuth angle 90° or 300° of the right-eye lens is the direction with the smallest change in transmittance in the measured range.

The mode of the liquid crystal cell in Embodiment 5 may be, for example, an STN mode, an OCB mode, a VA mode, an IPS mode, an FFS mode, an FLC mode, or the like, in addition to the TN mode.

Embodiment 6

Each lens of the active shutter glasses in the three-dimensional image recognition unit of Embodiment 6 has the same configuration as the left-eye lens in Embodiment 1. That is, in Embodiment 6, each lens has the same optical characteristics as the left-eye lens in the active shutter glasses of Embodiment 1.

That is, in both of the left and right lenses of the active shutter glasses in Embodiment 6, an observer-side polarizing element, a viewing angle compensation film, a liquid crystal cell, a viewing angle compensation film, and a display-side polarizing element are laminated in this order from the observer side.

The liquid crystal cell is a TN cell, and includes a pair of substrates and a liquid crystal layer interposed between the pair of substrates. The pair of substrates respective include transparent electrodes. The liquid crystal layer includes nematic liquid crystal molecules having positive anisotropy of dielectric constant. In Embodiment 6, during no voltage application, the liquid crystal molecule group is aligned in the alignment treatment direction near the surfaces of the pair of substrates, and is aligned so as to be twisted at about 90° in the thickness direction of the liquid crystal layer.

In regard to the alignment treatment direction for the liquid crystal cell, the alignment treatment direction for the display-side substrate is from 90° azimuth to 270° azimuth when viewed from the observer side, and the alignment treatment direction for the observer-side substrate is from 180° azimuth to 0° azimuth when viewed from the observer side.

Meanwhile, the direction of inclination of each lens surface in Embodiment 6 differs from the direction of the left-eye lens in Embodiment 1.

Table 2 shows the result of measurement of change in tinge during practical driving of the left and right lenses of the active shutter glasses of Embodiment 6. The change in tinge was measured in a state where the active shutter glasses are arranged on a TV backlight with a diffuser in the front direction with respect to the surface of the TV backlight. Here, Δu'v' was measured as change in tinge.

TABLE 2

|  |  | Change in tinge during practical driving Polar angle (°) | | | |
| --- | --- | --- | --- | --- | --- |
|  |  | 0 | 5 | 10 | 15 |
|  | Omniazimuth average | 0.0000 | 0.0029 | 0.0061 | 0.0090 |
| Azimuth angle (°) | 0 | 0.0000 | 0.0020 | 0.0068 | 0.0092 |
|  | 15 | 0.0000 | 0.0019 | 0.0051 | 0.0073 |
|  | 30 | 0.0000 | 0.0026 | 0.0063 | 0.0094 |
|  | 45 | 0.0000 | 0.0030 | 0.0073 | 0.0091 |
|  | 60 | 0.0000 | 0.0034 | 0.0067 | 0.0092 |
|  | 75 | 0.0000 | 0.0056 | 0.0079 | 0.0097 |
|  | 90 | 0.0000 | 0.0046 | 0.0103 | 0.0110 |
|  | 105 | 0.0000 | 0.0050 | 0.0099 | 0.0107 |
|  | 120 | 0.0000 | 0.0049 | 0.0105 | 0.0123 |
|  | 135 | 0.0000 | 0.0065 | 0.0095 | 0.0126 |
|  | 150 | 0.0000 | 0.0052 | 0.0090 | 0.0125 |
|  | 165 | 0.0000 | 0.0036 | 0.0068 | 0.0111 |
|  | 180 | 0.0000 | 0.0010 | 0.0067 | 0.0098 |
|  | 195 | 0.0000 | 0.0005 | 0.0036 | 0.0058 |
|  | 210 | 0.0000 | 0.0019 | 0.0013 | 0.0047 |
|  | 225 | 0.0000 | 0.0026 | 0.0015 | 0.0026 |
|  | 240 | 0.0000 | 0.0014 | 0.0011 | 0.0043 |
|  | 255 | 0.0000 | 0.0009 | 0.0020 | 0.0059 |
|  | 270 | 0.0000 | 0.0016 | 0.0050 | 0.0074 |
|  | 285 | 0.0000 | 0.0028 | 0.0044 | 0.0095 |
|  | 300 | 0.0000 | 0.0029 | 0.0057 | 0.0095 |
|  | 315 | 0.0000 | 0.0022 | 0.0069 | 0.0107 |
|  | 330 | 0.0000 | 0.0018 | 0.0057 | 0.0113 |
|  | 345 | 0.0000 | 0.0023 | 0.0064 | 0.0102 |

As a result, for example, change in tinge with respect to tinge in the front direction at each azimuth angle in the direction of the polar angle 5° is smallest in 195° azimuth. For this reason, the active shutter glasses of Embodiment 6 are in the form of being inclined at a polar angle 5° at any azimuth angle in a range of ±45° with respect to the azimuth angle 195°, that is, in a range of 150 to 240°.

The direction of the polar angle 5° and the azimuth angle 195° of the right-eye lens is the direction with the smallest change in tinge in the measured range.

The mode of the liquid crystal cell in Embodiment 6 may be, for example, an STN mode, an OCB mode, a VA mode, an IPS mode, an FFS mode, an FLC mode, or the like, in addition to the TN mode.

The present application claims priority to Patent Application No. 2010-155942 filed in Japan on Jul. 8, 2010 under the Paris Convention and provisions of national law in a designated State, the entire contents of which are hereby incorporated by reference.

REFERENCE SIGNS LIST 110, 210, 310, 410, 510, 610, 710, 810: 3D display device (image display device)
112, 312, 412: backlight
113, 313, 413: linearly polarizing element (rear-side polarizing element)
114, 116, 125, 126, 225, 226, 314, 316, 323, 326, 414, 416, 423, 425, 426, 525, 526: viewing angle compensation film
115, 315, 415: liquid crystal cell (inside liquid crystal display device)
117, 317, 417: linearly polarizing element (front-side polarizing element)
117t, 122t, 124t, 222t, 224t, 317t, 324t, 417t, 424t, 522t, 524t, 8175, 842t: transmission axis
120, 220, 320, 420, 520, 540, 620, 720: active shutter glasses
121, 221, 321, 421, 521: lens
121R, 221R, 321R, 421R, 621R, 721R, 841R: right-eye lens
121L, 221L, 321L, 421L, 621L, 721L, 841L: left-eye lens
122, 222, 322, 422, 522: linearly polarizing element (observer-side polarizing element)
123, 325, 523: liquid crystal cell (inside active shutter glasses)
123R, 223R, 423R: right-eye liquid crystal cell
123L, 223L, 423L: left-eye liquid crystal cell
124, 224, 324, 424, 524: linearly polarizing element (display-side polarizing element)
141R: right temple
141L: left temple
318, 327: λ/4 plate
318s, 327s: in-plane slow axis
410: display screen
527: measuring device
817, 840: polarized glasses
842: linearly polarizing plate

The invention claimed is:

1. Active shutter glasses for three-dimensional image recognition, the active shutter glasses comprising:
a right temple;
a left temple;
a right-eye lens; and
a left-eye lens,
wherein the right-eye lens and the left-eye lens comprise liquid crystal cells,
the right-eye lens and the left-eye lens have an inclination with respect to a state where the right-eye lens and the left-eye lens are arranged on the same plane, and are arranged on a surface orthogonal to a horizontal surface including the top surfaces of the right temple and the left temple,
the direction of inclination of the right-eye lens is the direction in which the outer edge of the right-eye lens approaches an observer side at an azimuth angle .phi..sub.2 in a range of .+-.45.degree. with respect to an azimuth angle.phi..sub.1, at which a contrast ratio has a maximum value, at a polar angle.theta..sub.1 having an angle difference in a range of 2 to 17.degree. from a line normal to the surface of the right-eye lens when not inclined,
the direction of inclination of the left-eye lens is the direction in which the outer edge of the left-eye lens approaches the observer side at an azimuth angle .phi..sub.4 in a range of .+-.45.degree. with respect to an azimuth angle.phi..sub.3, at which a contrast ratio has a maximum value, at a polar angle.theta..sub.2 having an angle difference in a range of 2 to 17.degree. from a line normal to the surface of the left-eye lens when not inclined, and
the right-eye lens and the left-eye lens are inclined from a vertical plane.

2. The active shutter glasses according to claim 1, wherein the azimuth angle $\phi_1$ at which the contrast ratio of the right-eye lens has a maximum value is in a range of 270±90°, and the azimuth angle $\phi_3$ at which the contrast ratio of the left-eye lens has a maximum value is in a range of 270±90°.

3. The active shutter glasses according to claim 1, wherein the azimuth angle $\phi_1$ at which the contrast ratio of the right-eye lens has a maximum value is in a range of 0±90°, and
the azimuth angle $\phi_3$ at which the contrast ratio of the left-eye lens has a maximum value is in a range of 180±90°.

4. The active shutter glasses according to claim 1, wherein the azimuth angle $\phi_1$ at which the contrast ratio of the right-eye lens has a maximum value is in a range of 315±45°, and
the azimuth angle $\phi_3$ at which the contrast ratio of the left-eye lens has a maximum value is in a range of 225±45°.

5. The active shutter glasses according to claim 1, wherein each of the right-eye lens and the left-eye lens includes a λ/4 plate and a linearly polarizing plate, and
the λ/4 plate is arranged on a surface of the linearly polarizing plate opposite to the observer side.

6. The active shutter glasses according to claim 1, wherein the right-eye lens and the left-eye lens substantially have a symmetric structure based on a symmetric surface which bisects the active shutter glasses on the left and right.

7. The active shutter glasses according to claim 1, wherein the liquid crystal alignment in the liquid crystal cell of the right-eye lens and the liquid crystal alignment in the liquid crystal cell of the left-eye lens during no voltage application substantially have symmetric twist based on the symmetric surface which bisects the active shutter glasses on the left and right.

8. The active shutter glasses according to claim 1, wherein the contrast distribution of the right-eye lens and the contrast distribution of the left-eye lens during no voltage application are substantially symmetrical based on the symmetric surface which bisects the active shutter glasses on the left and right.

9. The active shutter glasses according to claim 1, wherein a liquid crystal material in the liquid crystal cell of the right-eye lens and a liquid crystal material in the liquid crystal cell of the left-eye lens are the same.

10. The active shutter glasses according to claim 1, wherein the polar angle $\phi_1$ and the polar angle $\phi_2$ are substantially the same.

11. The active shutter glasses according to claim 1, wherein the polar angle $\phi_1$ is the angle including the maximum contrast ratio in all directions.

12. The active shutter glasses according to claim 1, wherein the polar angle $\theta_2$ is the angle including the maximum contrast ratio in all directions.

13. The active shutter glasses according to claim 1, wherein, when the right-eye lens and the left-eye lens are viewed in front view during no voltage application, the liquid crystal molecule group in the liquid crystal cell of the right-eye lens is aligned so as to be twisted at about 90° or about 270°, and the liquid crystal molecule group in the liquid crystal cell of the left-eye lens is aligned so as to be twisted at about 90° or about 270°.

14. The active shutter glasses according to claim 13, wherein the alignment azimuth of a liquid crystal molecule at the center in the thickness direction in the liquid crystal cell of the right-eye lens and the alignment azimuth of a liquid crystal molecule at the center in the thickness direction in the liquid crystal cell of the left-eye lens during no voltage application are substantially symmetrical based on the symmetric surface which bisects the active shutter glasses on the left and right.

15. The active shutter glasses according to claim 13, wherein both of the azimuth angle of a liquid crystal molecule at the center in the thickness direction in the liquid crystal cell of the right-eye lens and the azimuth angle of a liquid crystal molecule at the center in the thickness direction in the liquid crystal cell of the left-eye lens during no voltage application are in a range of 270±90°.

16. The active shutter glasses according to claim 13, wherein, during no voltage application, the azimuth angle of a liquid crystal molecule at the center in the thickness direction in the liquid crystal cell of the right-eye lens is in a range of 0±90°, and
the azimuth angle of a liquid crystal molecule at the center in the thickness direction in the liquid crystal cell of the left-eye lens is in a range of 90 to 270°.

17. The active shutter glasses according to claim 13, wherein, during no voltage application, the azimuth angle of a liquid crystal molecule at the center in the thickness direction in the liquid crystal cell of the right-eye lens is in a range of 315±45°, and
the azimuth angle of a liquid crystal molecule at the center in the thickness direction in the liquid crystal cell of the left-eye lens is in a range of 225±45°.

18. The active shutter glasses according to claim 13, wherein each of the right-eye lens and the left-eye lens comprises a pair of linearly polarizing plates on both sides of the liquid crystal cell,
the transmission axes of the pair of linearly polarizing plates are in a cross-Nichol relation, and
both of the average value of the azimuth angles of liquid crystal molecules in the liquid crystal cell of the right-eye lens and the average value of the azimuth angles of liquid crystal molecules in the liquid crystal cell of the left-eye lens during no voltage application are in a range of the 270±90°.

19. The active shutter glasses according to claim 13, wherein each of the right-eye lens and the left-eye lens comprises a pair of linearly polarizing plates on both sides of the liquid crystal cell,
the transmission axes of the pair of linearly polarizing plates are in a cross-Nichol relation,
the average value of the azimuth angles of liquid crystal molecules in the liquid crystal cell of the right-eye lens during no voltage application is in a range of 0±90°, and
the average value of the azimuth angles of liquid crystal molecules in the liquid crystal cell of the left-eye lens during no voltage application is in a range of 180±90°.

20. The active shutter glasses according to claim 13, wherein each of the right-eye lens and the left-eye lens comprises a pair of linearly polarizing plates on both sides of the liquid crystal cell,
the transmission axes of the pair of linearly polarizing plates are in a cross-Nichol relation,
the average value of the azimuth angles of liquid crystal molecules in the liquid crystal cell of the right-eye lens during no voltage application is in a range of 315±45°, and
the average value of the azimuth angles of liquid crystal molecules in the liquid crystal cell of the left-eye lens during no voltage application is in a range of 225±45°.

* * * * *